US008386390B2

(12) United States Patent
Oho et al.

(10) Patent No.: US 8,386,390 B2
(45) Date of Patent: Feb. 26, 2013

(54) RIGHT MANAGEMENT DEVICE, TERMINAL DEVICE, AND RIGHT MANAGEMENT SYSTEM

(75) Inventors: Masahiro Oho, Katano (JP); Masaya Yamamoto, Hirakata (JP)

(73) Assignee: Panasonic Corporation, Osaka (JP)

( * ) Notice: Subject to any disclaimer, the term of this patent is extended or adjusted under 35 U.S.C. 154(b) by 1009 days.

(21) Appl. No.: 10/587,432

(22) PCT Filed: Mar. 24, 2005

(86) PCT No.: PCT/JP2005/005416
§ 371 (c)(1),
(2), (4) Date: Jul. 27, 2006

(87) PCT Pub. No.: WO2005/093583
PCT Pub. Date: Oct. 6, 2005

(65) Prior Publication Data
US 2007/0174203 A1    Jul. 26, 2007

(30) Foreign Application Priority Data
Mar. 29, 2004  (JP) .................................. 2004-095646

(51) Int. Cl.
G06F 21/00 (2006.01)
H04N 7/167 (2011.01)
(52) U.S. Cl. .......................................... 705/59; 705/51
(58) Field of Classification Search ...................... 705/59
See application file for complete search history.

(56) References Cited

U.S. PATENT DOCUMENTS

| | | | |
|---|---|---|---|
| 5,260,999 A * | 11/1993 | Wyman ............................ 705/59 |
| 5,629,980 A * | 5/1997 | Stefik et al. ...................... 705/54 |
| 5,870,467 A | 2/1999 | Imai et al. |
| 5,892,900 A * | 4/1999 | Ginter et al. ..................... 726/26 |
| 6,226,618 B1 * | 5/2001 | Downs et al. .................... 705/51 |
| 6,343,283 B1 | 1/2002 | Saito et al. |
| 2003/0005135 A1 | 1/2003 | Inoue et al. |
| 2004/0003251 A1 | 1/2004 | Narin et al. |
| 2004/0003269 A1 | 1/2004 | Waxman et al. |
| 2004/0003270 A1 | 1/2004 | Bourne et al. |
| 2004/0034786 A1 | 2/2004 | Okamoto et al. |

FOREIGN PATENT DOCUMENTS

| | | |
|---|---|---|
| EP | 1 376 307 | 1/2004 |
| EP | 1 376 309 | 1/2004 |
| EP | 1 378 811 | 1/2004 |
| JP | 8-137686 | 5/1996 |
| JP | 8-329011 | 12/1996 |

(Continued)

Primary Examiner — Calvin L Hewitt, II
Assistant Examiner — Zeshan Qayyum
(74) Attorney, Agent, or Firm — Wenderoth, Lind & Ponack, L.L.P.

(57) ABSTRACT

A service provider (SP) receives an original license including an edit condition that shows designation of a range of a usage condition from a content provider (CP) license management server of a CP. On the basis of the received original license, a sales license generation tool of the SP generates a sales license which includes the usage condition that shows a condition for allowing the usage of the content and from which a content key has been deleted. A content key insertion processing unit of an SP license management server judges whether or not the usage condition included in the generated license information is within the range of the edit condition, and inserts the content key into the generated license information only when the usage condition is within the range of the edit condition.

18 Claims, 49 Drawing Sheets

FOREIGN PATENT DOCUMENTS

| | | |
|---|---|---|
| JP | 2003-131751 | 5/2003 |
| JP | 2004-38974 | 2/2004 |
| JP | 2004-46809 | 2/2004 |
| JP | 2004-46856 | 2/2004 |
| JP | 2004-56794 | 2/2004 |
| WO | 02/101524 | 12/2002 |
| WO | 2003/098512 | 11/2003 |

* cited by examiner

FIG. 28

| | | |
|---|---|---|
| ORIGINAL LICENSE ID | 0A0000000000000000000000000001 | D2802 |
| CONTENT ID | 0B0000000000000000000000000001 | D2803 |
| CONTENT KEY | 0102030405060708090A0B0C0D0E0F | D2804 |

SALES CONDITION

ALLOWED NUMBER OF SALES UP TO AND INCLUDING [100]

SALES VALIDITY PERIOD  FROM [2003] YEAR [3] MONTH [1] DAY [0] HOURS [0] MINUTES [0] SECONDS
TO [2003] YEAR [3] MONTH [31] DAY [0] HOURS [0] MINUTES [0] SECONDS   — D2805

EDIT CONDITION

| ALLOWED REPRODUCTION PERIOD | EDITABILITY | [EDITABLE] | [NO LIMIT] | | |
|---|---|---|---|---|---|
| ALLOWED REPRODUCTION TIMES | EDITABILITY | [EDITABLE] | [0] TO [10] TIMES | | |
| ALLOWED REPRODUCTION DURATION | EDITABILITY | [EDITABLE] | [0] MINUTES TO [60] MINUTES | | |
| AREA FOR REPRODUCTION | EDITABILITY | [NON-EDITABLE] | [JAPAN] | | |
| REPRODUCTION QUALITY | EDITABILITY | [NON-EDITABLE] | [STANDARD] | | |
| MEDIA WRITING | EDITABILITY | [NON-EDITABLE] | [EDITABLE] | | |

D2806

(GENERATION)

LICENSE ID OF CONTRACT LICENSE: 0A0000000000000000000000000000001
CONTENT ID:                     0B0000000000000000000000000000001
LICENSE ID OF SALES LICENSE: [          ]

ALLOWED REPRODUCTION PERIOD: CURRENTLY SET AT NO LIMIT. FREE TO EDIT.
○ EDIT      FROM [-] YEAR [-] MONTH [-] DAY [-] HOURS [-] MINUTES [-] SECONDS
● NOT EDIT  TO   [-] YEAR [-] MONTH [-] DAY [-] HOURS [-] MINUTES [-] SECONDS

ALLOWED REPRODUCTION TIMES: CURRENTLY SET AT 0. EDITABLE BETWEEN 0 AND
10 TIMES.
○ EDIT      [   ] TIMES
● NOT EDIT

ALLOWED REPRODUCTION DURATION: CURRENTLY SET AT 0. EDITABLE BETWEEN 0
AND 60 MINUTES.
○ EDIT      [   ] MINUTES
● NOT EDIT

AREA FOR REPRODUCTION : CURRENTLY SET AT JAPAN. NOT EDITABLE.
REPRODUCTION QUALITY: CURRENTLY SET AT STANDARD. NOT EDITABLE.
MEDIA WRITING: CURRENTLY SET AT ALLOWED. NOT EDITABLE.

(GENERATION)

FIG. 39

LICENSE ID OF CONTRACT LICENSE: 0A000000000000000000000000000001
CONTENT ID: 0B00000000000000000000000000000001
LICENSE ID OF SALES LICENSE: 0AB0000000000000000000000000000001 —D3901

ALLOWED REPRODUCTION PERIOD: CURRENTLY SET AT NO LIMIT. FREE TO EDIT.
● EDIT FROM [2003] YEAR [3] MONTH [1] DAY [0] HOURS [0] MINUTES [0] SECONDS
○ NOT EDIT TO [2003] YEAR [4] MONTH [31] DAY [0] HOURS [0] MINUTES [0] SECONDS
— D3902

ALLOWED REPRODUCTION TIMES: CURRENTLY SET AT 0. EDITABLE BETWEEN 0 AND 10 TIMES.
● EDIT [5] TIMES
○ NOT EDIT
— D3903

ALLOWED REPRODUCTION DURATION: CURRENTLY SET AT 0. EDITABLE BETWEEN 0 AND 60 MINUTES.
○ EDIT [—] MINUTES
● NOT EDIT
— D3904

AREA FOR REPRODUCTION: CURRENTLY SET AT JAPAN. NOT EDITABLE.
REPRODUCTION QUALITY: CURRENTLY SET AT STANDARD. NOT EDITABLE.
MEDIA WRITING: CURRENTLY SET AT ALLOWED. NOT EDITABLE.

D3701

D3905 (GENERA-TION)

RIGHT MANAGEMENT DEVICE, TERMINAL DEVICE, AND RIGHT MANAGEMENT SYSTEM

BACKGROUND OF THE INVENTION

1. Field of the Invention

The present invention relates to a content distribution system whereby digital content data such as video and music produced by a content provider is distributed from a server device of a service provider via communication or a broadcast so that a terminal device of an end user uses the digital content. Hereafter, this content distribution system may be referred to as a B2B2C (Business to Business to Consumer) system according to the circumstances. As mentioned above, the B2B2C system is an abbreviation indicating a relation among a content provider (Business) that creates products, a service provider (Business) that sells them, and an end user (Consumer) that purchases them. The present invention particularly relates to a right management terminal that is used for copyright protection for content in the B2B2C system.

2. Description of the Related Art

In recent years, content distribution service, by which the digital content such as video and music (simply referred to as content, hereafter) is distributed from the server device to the terminal device via communication or a broadcast so that the terminal device uses the content, is entering its commercial stage. Meanwhile, it becomes easy to make unauthorized duplication of content due to the development of digital equipment. This increases problems associated with copyright infringement. On account of this, the content distribution service employs a copyright protection technology (DRM: Digital Rights Management) for the purpose of preventing the unauthorized usage of content. Using the cryptographic technology and the authentication technology, the copyright protection technology allows only an authorized user to use content within a predetermined range. To be more specific, the server device of the content provider encrypts the content, then distributes the encrypted content to the terminal device of the end user. Moreover, the terminal device obtains a sales license that includes a content key to decrypt the encrypted content and a usage condition of the content (such as the number of usage times and a period of validity) from the server device of the service provider. In accordance with the usage condition included in the received sales license, the terminal device decrypts the encrypted content to use the content. By means of the method described so far, the content is protected and the unauthorized usage of the content is prevented.

Here, since the above-mentioned sales license is generated by the server device of the service provider, the information inside the license such as the content key and the usage condition is set by the service provider. Meanwhile, because the service provider needs to use the content key that was made by the content provider in the encryption processing performed on the content, the content key can be considered as the information that can be substantially controlled by the content provider. In addition, by means of the method as disclosed in Japanese Application Patent Publication No. 8-329011, even though the content provider controls the content key, the service provider can edit the content received from the content provider and distribute the edited, encrypted content to the terminal device of the end user.

SUMMARY OF THE INVENTION

Problems that Invention is to Solve

As to the usage condition, there are contractual limitations in writing between the content provider and the service provider. However, the usage condition is information that is basically set by the service provider. Therefore, the content provider cannot control the details of the usage condition set by the service provider.

The present invention was conceived in view of the problem described above and has an object of providing a right management device that allows a sales license to be sold to the end user only when the usage condition is set within the range approved by the content provider.

Means to Solve the Problems

In order to achieve the above object, a right management system of the present invention is a right management system for managing license information that allows usage of content, being made up of: a license information generation unit operable to generate the license information including a usage condition that shows a condition for allowing the usage; a range designation obtainment unit operable to obtain information showing range designation of the usage condition from a content provider that produces the content; a usage condition judgment unit operable to judge whether or not the usage condition included in the generated license information is within the designated range; and a validation unit operable to validate the generated license information only when the usage condition is judged to be within the range as a result of the judgment.

Moreover, in order to achieve the above object, a right management device of the present invention is a right management device for managing license information that allows usage of content, being made up of: a license information generation unit operable to generate the license information including a usage condition that shows a condition for allowing the usage; a range designation reception unit operable to receive information showing a range of the usage condition from a right management device provided for a content provider that produces the content; a usage condition judgment unit operable to judge whether or not the usage condition included in the generated license information is within the designated range; and a validation unit operable to validate the generated license information only when the usage condition is judged to be within the range as a result of the judgment.

As described, the right management device of the service provider has a function of validating the license information only when the usage condition satisfies the designated range. Accordingly, the content provider can control the details of the usage condition of the sales license generated by the service provider.

Furthermore, in order to achieve the above object, the terminal device of the present invention is a terminal device of an end user for reproducing content in accordance with license information that allows usage of the content, being made up of: a request unit operable to request the license information used for reproducing a specific content from a right management device of a service provider; a license information obtainment unit operable to obtain in response to the request: the license information including a usage condition that shows a condition for allowing the usage of the content; and range designation information designating a range of the usage condition; a usage condition judgment unit operable to judge whether or not the usage condition included in the obtained license information is within the range designated in the range designation information; and an abandon unit operable to abandon the obtained license information when the usage condition is judged not to be within the range designated in the range designation information as a result of the judgment.

In addition, since the terminal device of the end user also abandons the license information that does not satisfy the designated range, the end user cannot use the content by utilizing such license information. Accordingly, double checking is conducted by the service provider and the end user. This allows the content provider to more reliably control the details of the usage condition of the license information generated by the service provider.

It should be noted here that the present invention may be realized not only as the right management device and the terminal device, but also as: a right management program that causes a computer to realize the characteristic units provided in such a right management device and a terminal device as its function; a right management method that has steps corresponding to the characteristic units provided in such a right management device and a terminal device; and a medium that includes data used by the characteristic units provided in such a right management device and a terminal device. Also, it should be understood that such a program can be distributed via a record medium such as a CD-ROM, or via a transmission medium such as the Internet.

Effects of the Invention

The present invention allows the content provider to set such a condition as to edit the details of the usage condition of the sales license generated by the service provider. Also, the present invention eliminates the problem that the service provider may sell a sales license in which the content provider has no intention and the end user ends up using such a sales license.

BRIEF DESCRIPTION OF THE DRAWINGS

FIG. 28 shows an entry screen of a user entry I/F (Interface) of the original license generation tool shown in FIG. 4.

FIG. 37 shows an entry screen of the sales license generation tool shown in FIG. 2.

FIG. 39 is a diagram showing a screen in which an edit condition is inputted in the entry screen of the sales license generation tool shown in FIG. 2.

Figure 1:
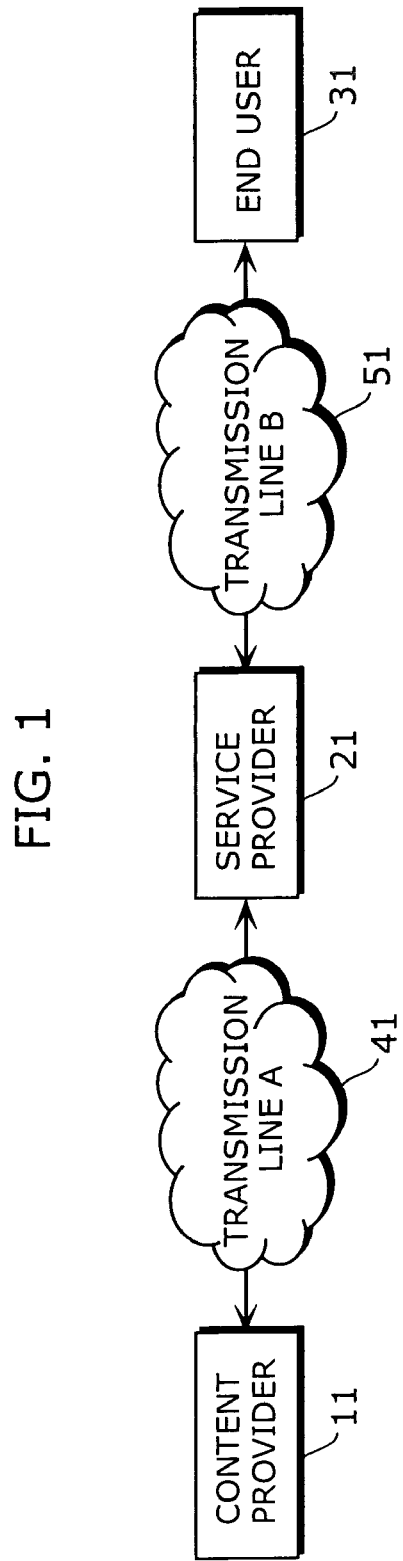
FIG. 1 is a schematic diagram showing an entire structure of a B2B2C system of the present embodiment.

NUMERICAL REFERENCES 11 content provider
21 service provider
31 end user
41 transmission line A
51 transmission line B
111 original license generation tool
112 content encryption tool
113 CP license contract server
114 CP license management server
115 CP membership management server
116 CP content management server
211 sales license generation tool
212 SP terminal application program
213 SP license sales server
214 SP license management server
215 SP membership management server
216 SP content distribution server
480 EU terminal device
481 communication processing unit
482 control unit
483 contract condition comparison unit
484 DB I/F
485 license DB
1111 user entry I/F
1112 control unit
1113 original license generation processing unit
1114 DB registration I/F
1121 user entry I/F
1122 control unit
1123 content encryption processing unit
1124 DB registration I/F
1131 DB I/F
1132 contract DB
1133 communication processing unit
1134 control unit
1135 DB registration I/F
1141 DB I/F
1142 user DB
1143 license DB
1144 communication processing unit
1145 control unit
1146 license processing unit
1151 DB I/F
1152 membership DB
1153 communication processing unit
1154 control unit
1155 DB registration I/F
1161 DB I/F
1162 content DB
1163 communication processing unit
1164 control unit
2111 user entry I/F
2112 control unit
2113 sales license generation processing unit
2114 DB registration I/F
2121 user entry I/F
2122 control unit
2123 communication processing unit
2124 processing request I/F
2131 DB I/F
2132 sales DB
2133 communication processing unit
2134 control unit
2135 DB registration I/F
2141 processing request I/F
2142 CP-side control unit
2143 CP-side communication processing unit
2144 content key insertion processing unit
2145 DB I/F
2146 license DB
2147 user DB
2148 EU-side communication processing unit
2149 EU-side control unit
214A license processing unit
214B registration-purpose DB I/F
2151 DB I/F
2152 membership DB
2153 communication processing unit
2154 control unit
2155 DB registration I/F
2161 processing request I/F
2162 CP-side control unit
2163 CP-side communication processing unit
2164 DB I/F
2165 content DB
2166 EU-side communication processing unit
2167 EU-side control unit

DETAILED DESCRIPTION OF THE INVENTION

The following is a detailed explanation of an embodiment of the present invention, with reference to the drawings.

(Explanation of Rough Entire Structure)

FIG. 1 is a schematic diagram showing an entire structure of a B2B2C system related to the embodiment of the present invention. As shown in FIG. 1, the present B2B2C system is composed of a content provider 11, a service provider 21, and an end user 31. The content provider 11 and the service provider 21 are connected via a transmission line A41. The service provider 21 and a terminal device owned by the end user 31 are connected via a transmission line B51.

Here, the content provider 11 refers to a provider that produces content. The service provider 21 refers to a provider that obtains the content from the content provider 11 under a contract and sells the content to the end user 31. The end user 31 refers to a consumer who purchases the content from the service provider 21 and uses it.

The present invention relates primarily to processing performed between the content provider 11 and the service provider 21 of this B2B2C system. Thus, in the following description, detailed explanations are given as to the content provider 11 and the service provider 21.

(Explanation of System Structure)

Figure 2:
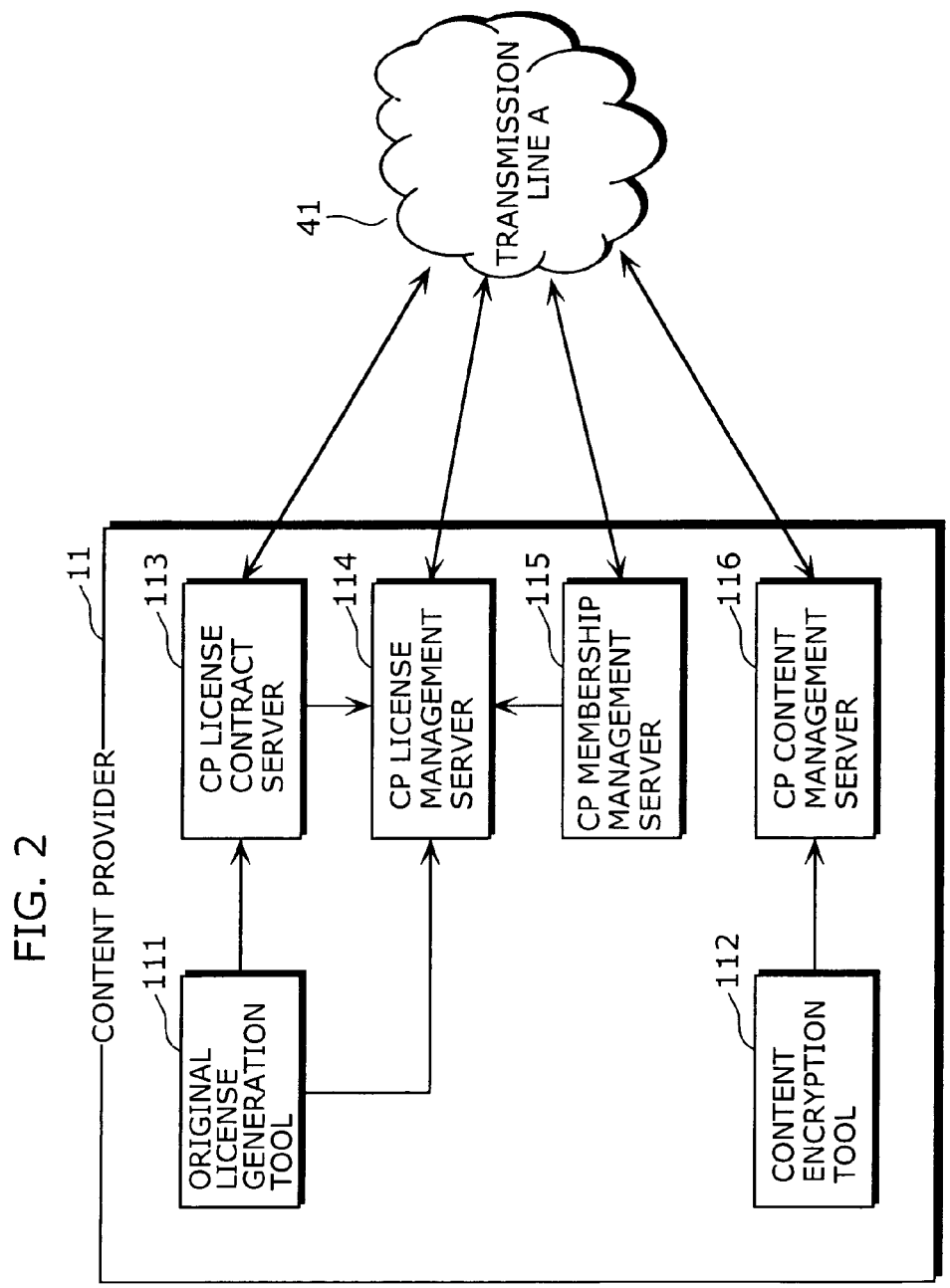
FIG. 2 is a diagram showing a system structure of a content provider shown in FIG. 1.
Figure 3:
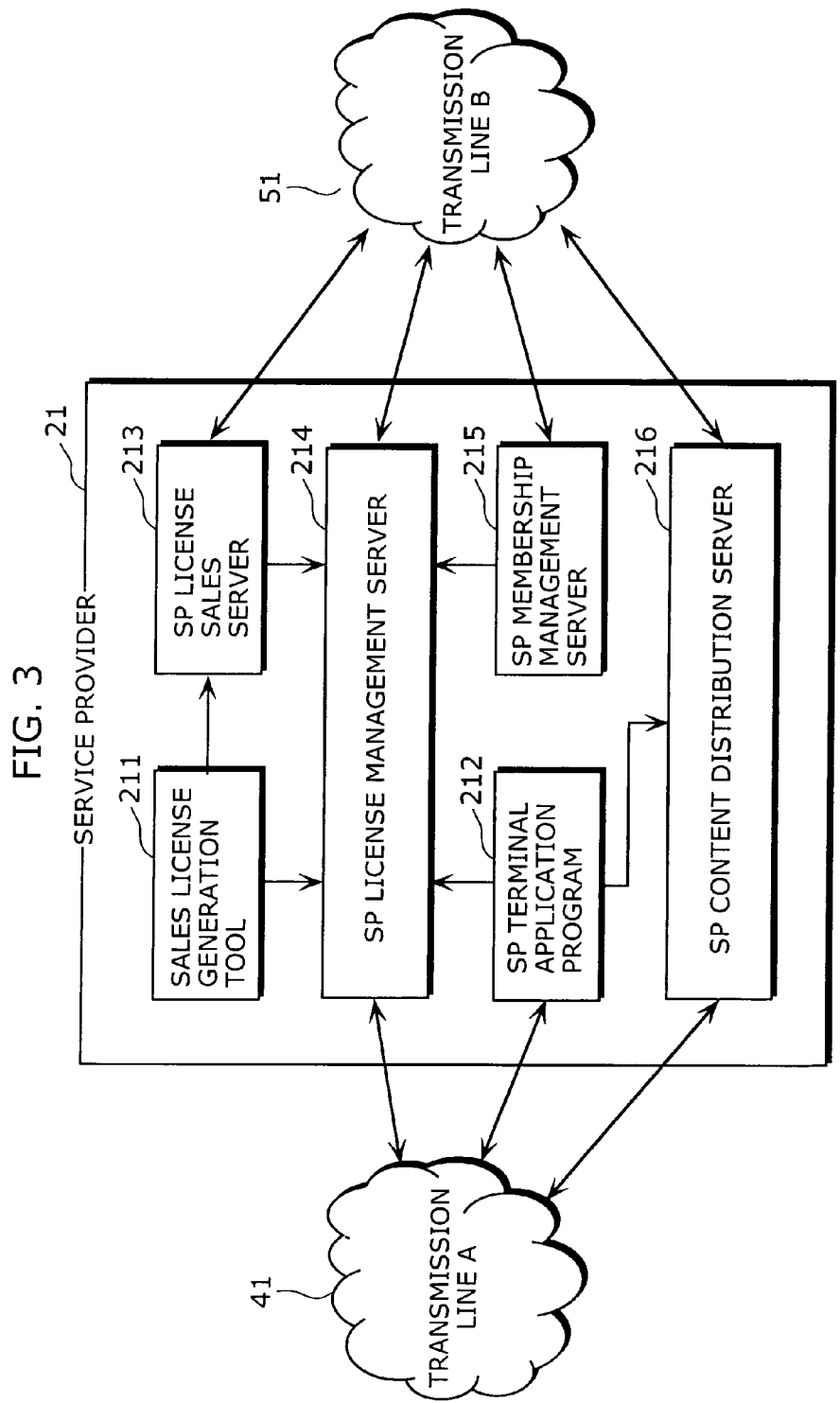
FIG. 3 is a diagram showing a system structure of a service provider shown in FIG. 1.

First, system structures of respective subsystems of the content provider 11 and the service provider 21 are shown using FIGS. 2 and 3.

(System Structure of Subsystem of Content Provider 11)

FIG. 2 is a diagram showing the system structure of the subsystem of the content provider 11. As shown in FIG. 2, the subsystem of the content provider 11 is composed of an original license generation tool 111, a content encryption tool 112, a CP license contract server 113, a CP license management server 114, a CP membership management server 115, and a CP content management server 116.

Here, the original license generation tool 111 is a tool that generates an original license (referred to as a "contract license" in Claims) to be provided for the service provider 21 after signing a license contract with the service provider 21. The content encryption tool 112 is a tool that performs the encryption processing on non-encrypted content using a designated content key to generate the encrypted content. The CP license contract server 113 is a server that plays a role in receiving a license contract request from the service provider 21, performing processing relating to the license contract, and returning a response to show whether or not the license contract is allowed. The CP license management server 114 is a server that plays a role in receiving a license obtainment request from the service provider 21 and returning the appropriate original license. The CP membership management server 115 is a server that plays a role in receiving a service sign-up request from the service provider 21, performing processing relating to the service sign-up, and returning a response to show whether or not the sign-up is allowed. Finally, the CP content management server 116 is a server that plays a role in receiving an encrypted content obtainment request from the service provider 21 and returning the appropriate encrypted content.

It should be noted that the above-mentioned original license is data that is composed of: a content key to be used for decrypting the encrypted content; a template of a sales license with which the service provider 21 provides the end user 31; an edit condition based on which the template of the sales license can be edited; and a sales condition relating to the edited sales license. An example of a data structure of the original license will be explained in detail later on with reference to the drawing.

(System Structure of Subsystem of Service Provider 21)

FIG. 3 is a diagram showing the system structure of the subsystem of the service provider 21. As shown in FIG. 3, the subsystem of the service provider 21 is composed of a sales license generation tool 211, an SP terminal application program 212, an SP license sales server 213, an SP license management server 214, an SP membership management server 215, and an SP content distribution server 216.

Here, the sales license generation tool 211 is a tool that edits the template of the sales license included in the original license in accordance with the details instructed by the user of the present tool and that generates a sales license (having no content key) that includes no content key. The SP terminal application program 212 is an application program that sends requests for a service sign-up and a license contract to the content provider 11 and that directs the SP license management server 214 and the SP content distribution server 216 to respectively obtain the original license and the encrypted content from the content provider 11. The SP license sales server 213 is a server that plays a role in receiving a license purchase request from the end user 31, performing processing relating to the license purchase, and returning a response to show whether or not the license purchase is allowed. The SP license management server 214 is a server that plays a role in comparing the usage condition of the sales license (having no content key) generated by the sales license generation tool 211 with the edit condition of the original license based on which the present sales license (having no content key) was generated and, only when judging that the usage condition is within the range of the edit condition, inserting a content key into the sales license (having no content key) to generate a sales license (having a content key). Moreover, the SP license management server 214 plays a role in returning the appropriate sales license (having a content key) in response to a license obtainment request from the end user 31. The SP membership management server 215 is a server that plays a role in receiving a service sign-up request from the end user 31, performing processing relating to the service sign-up, and returning a response to show whether or not the service sign-up is allowed. Finally, the SP content distribution server 216 is a server that plays a role in obtaining the encrypted content from the content provider 11 and returning the appropriate encrypted content in response to an encrypted content obtainment request from the end user 31.

It should be noted that an example of a data structure of the above-mentioned sales license will be explained in detail later on, with reference to the drawings.

(Explanation of Module Structure)

Next, the module structure of each tool and each server included in the subsystem of the content provider 11 shown in FIG. 2 is explained with reference to FIGS. 4 to 14.

(Module Structure of Original License Generation Tool 111)

Figure 4:
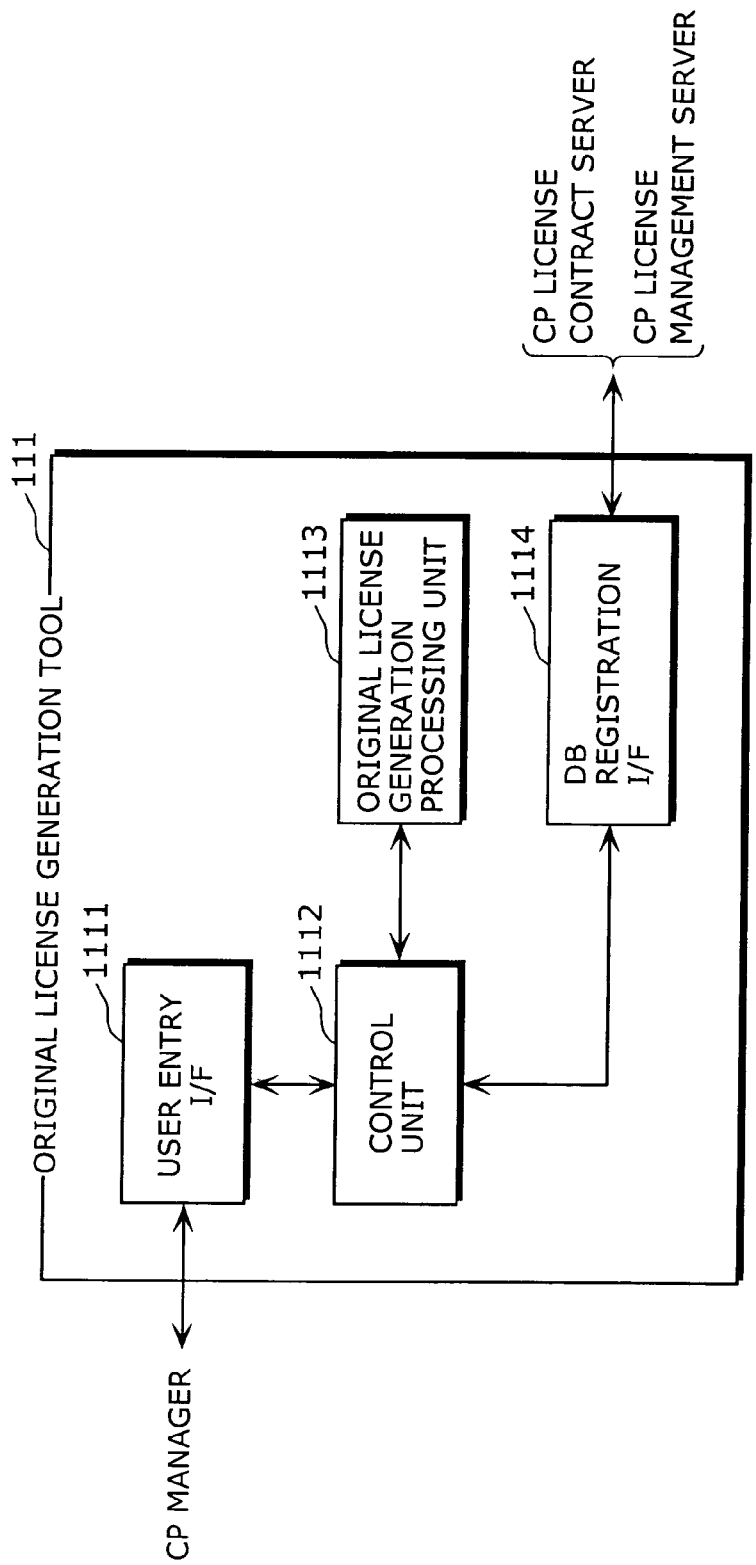
FIG. 4 is a diagram showing a module structure of an original license generation tool shown in FIG. 2.

First, FIG. 4 is a diagram showing the module structure of the original license generation tool 111. As shown in FIG. 4, the original license generation tool 111 is composed of a user entry I/F 1111, a control unit 1112, an original license generation processing unit 1113, and a DB registration I/F 1114.

Here, the user entry I/F 1111 plays a role in receiving a request from a user (assumed to be a system manager or an operator of the content provider 11) of the original license generation tool 111. The control unit 1112 is a module that controls the processing to be performed in response to the request received by the user entry I/F 1111. The original license generation processing unit 1113 is a module that generates an original license in accordance with the condition designated by the control unit 1112. Finally, the DB registration I/F 1114 is a module that requests the generated original license should be registered into a database (simply referred to as a DB hereafter) of the CP license management server 114. Moreover, the DB registration I/F 1114 plays a role in requesting that an original license ID which is an identifier to uniquely identify the original license and meta information which shows the sales condition and the edit condition of the original license should be registered into the DB of the CP license contract server 113.

(Module Structure of Content Encryption Tool 112)

Figure 5:
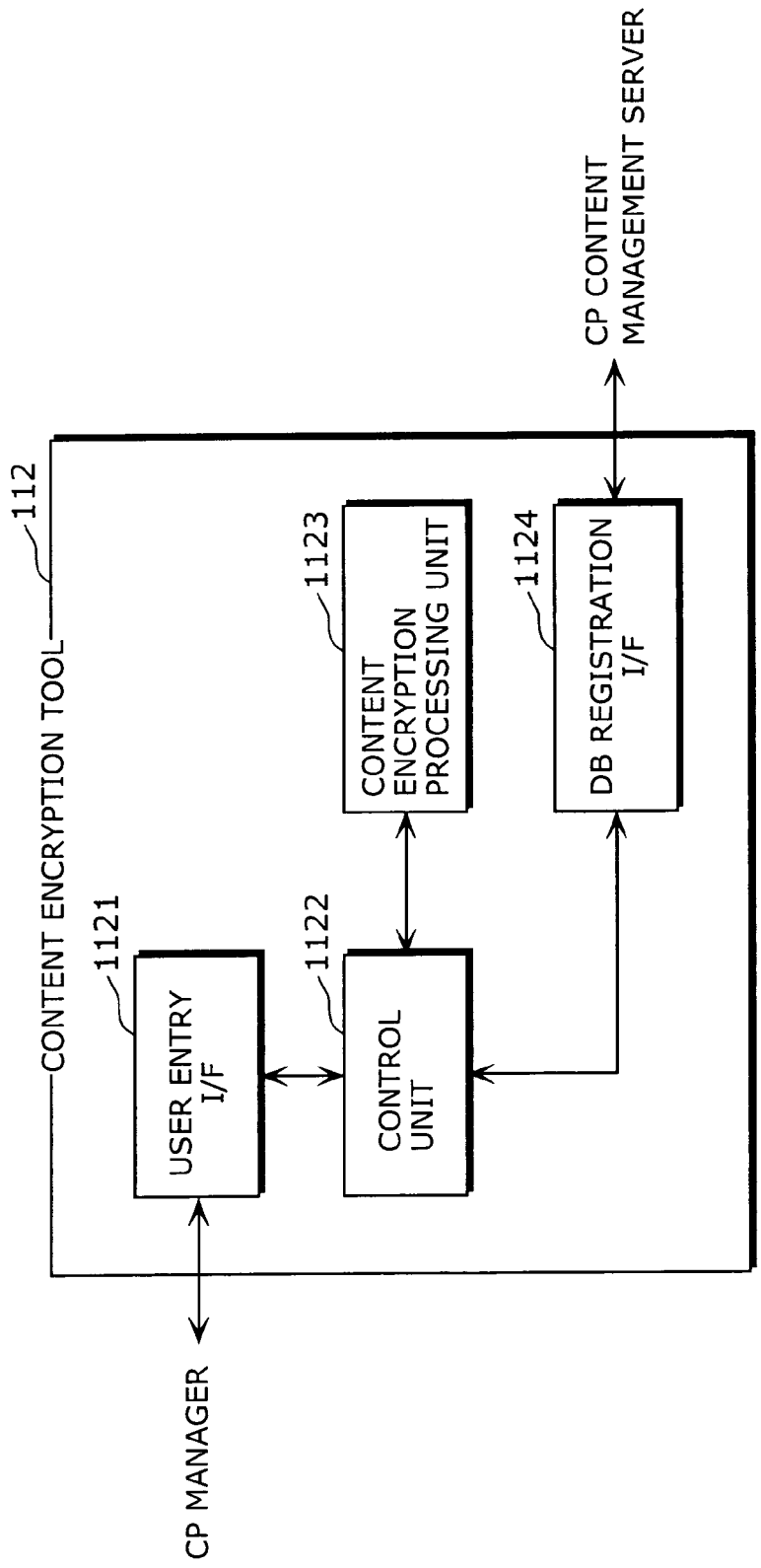
FIG. 5 is a diagram showing a module structure of a content encryption tool shown in FIG. 2.

FIG. 5 is a diagram showing the module structure of the content encryption tool 112. As shown in FIG. 5, the content encryption tool 112 is composed of a user entry I/F 1121, a control unit 1122, a content encryption processing unit 1123, and a DB registration I/F 1124.

Here, the user entry I/F 1121 plays a role in receiving a request from the user (assumed to be the system manager or the like of the content provider 11) of the content encryption tool 112. The control unit 1122 is a module that controls the processing to be performed in response to the request received by the user entry I/F 1121. The content encryption processing unit 1123 is a module that performs the encryption processing on the non-encrypted content using the content key designated by the control unit 1122 to generate the encrypted content. Finally, the DB registration I/F 1124 is a module that requests the encrypted content, a content ID uniquely identifying the encrypted content, and the meta information showing a title of the content and so forth should be registered into a DB of the CP content management server 116.

(Module Structure of CP License Contract Server 113)

Figure 6:
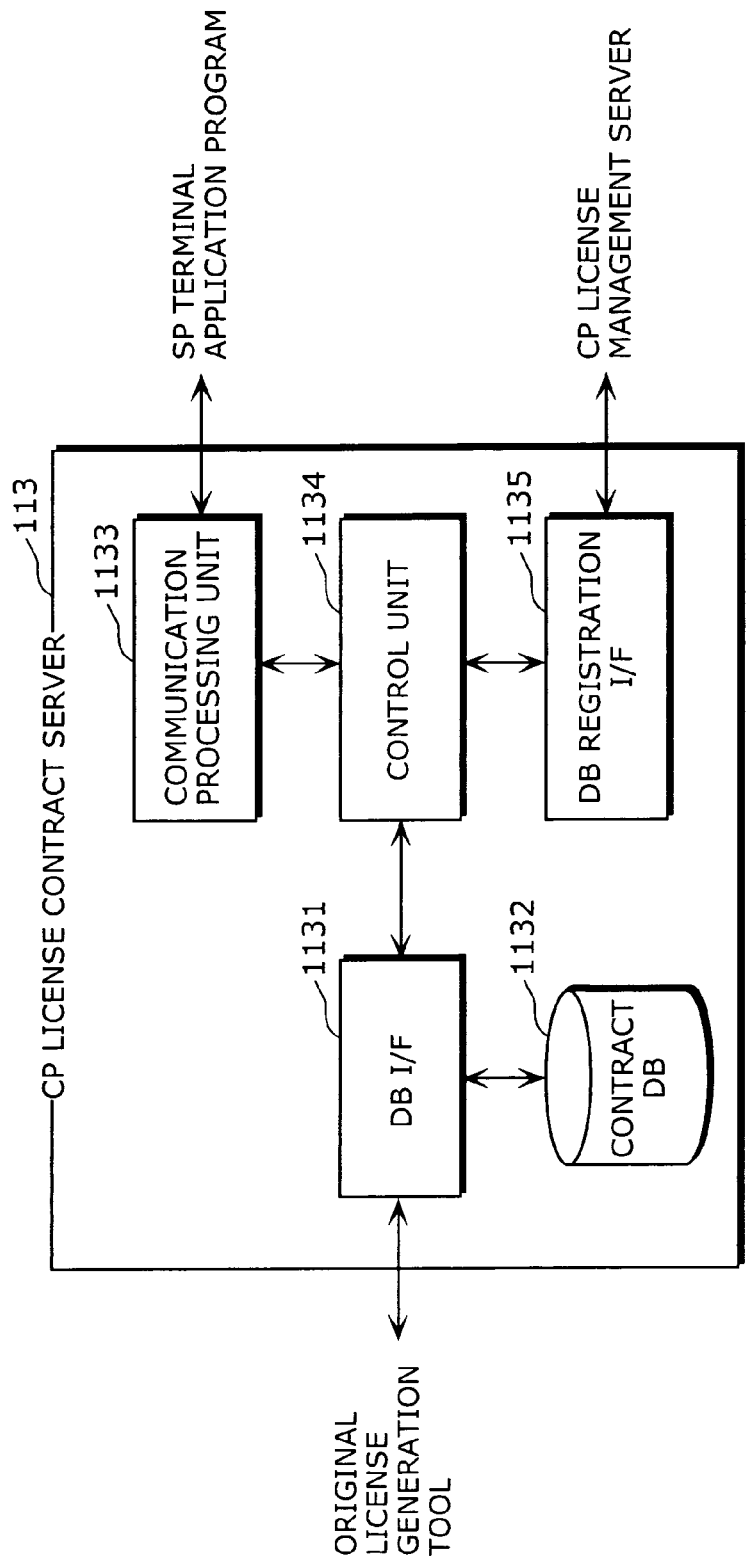
FIG. 6 is a diagram showing a module structure of a CP license contract server shown in FIG. 2.

FIG. 6 is a diagram showing the module structure of the CP license contract server 113. As shown in FIG. 6, the CP license contract server 113 is composed of a DB I/F 1131, a contract DB 1132, a communication processing unit 1133, a control unit 1134, and a DB registration I/F 1135.

Figure 7:
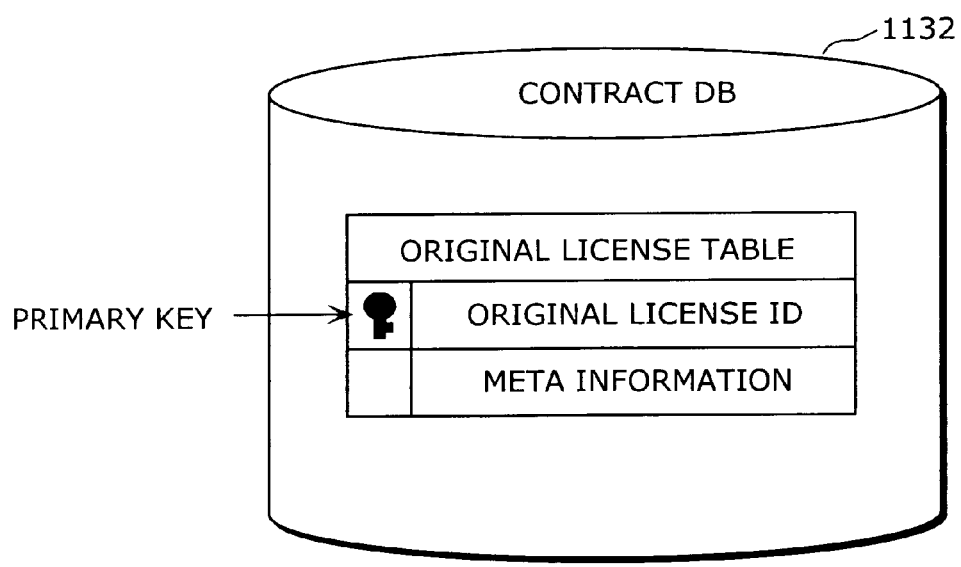
FIG. 7 is a diagram showing a table structure of a contract DB (Database) shown in FIG. 6.

Here, the DB I/F 1131 is a module that manipulates the appropriate data stored in the contract DB 1132 in accordance with DB manipulation requests (such as data registration and data search) from the control unit 1134 and the original license generation tool 111. FIG. 7 is a diagram showing a table structure of the contract DB shown in FIG. 6. The contract DB 1132 is a DB that has the table structure as shown in FIG. 7 and manages the original license ID and the meta information relating to the sales condition of the original license. Note that the primary key refers to, for example, an original license ID that is uniquely set in the contract DB 1132 shown in the present figure. The primary key is the same in the other figures. The communication processing unit 1133 is a module that receives a license contract request from the SP terminal application program 212 of the service provider 21 and returns a license contract response. The control unit 1134 is a module that controls the processing to be performed in response to the license contract request received by the communication processing unit 1133. Finally, the DB registration I/F 1135 is a module that requests the original license ID concerned with the license contract and the user ID uniquely identifying the service provider 21 that signed the contract should be registered into the DB of the CP license management server 114.

(Module Structure of CP License Management Server 114)

Figure 8:
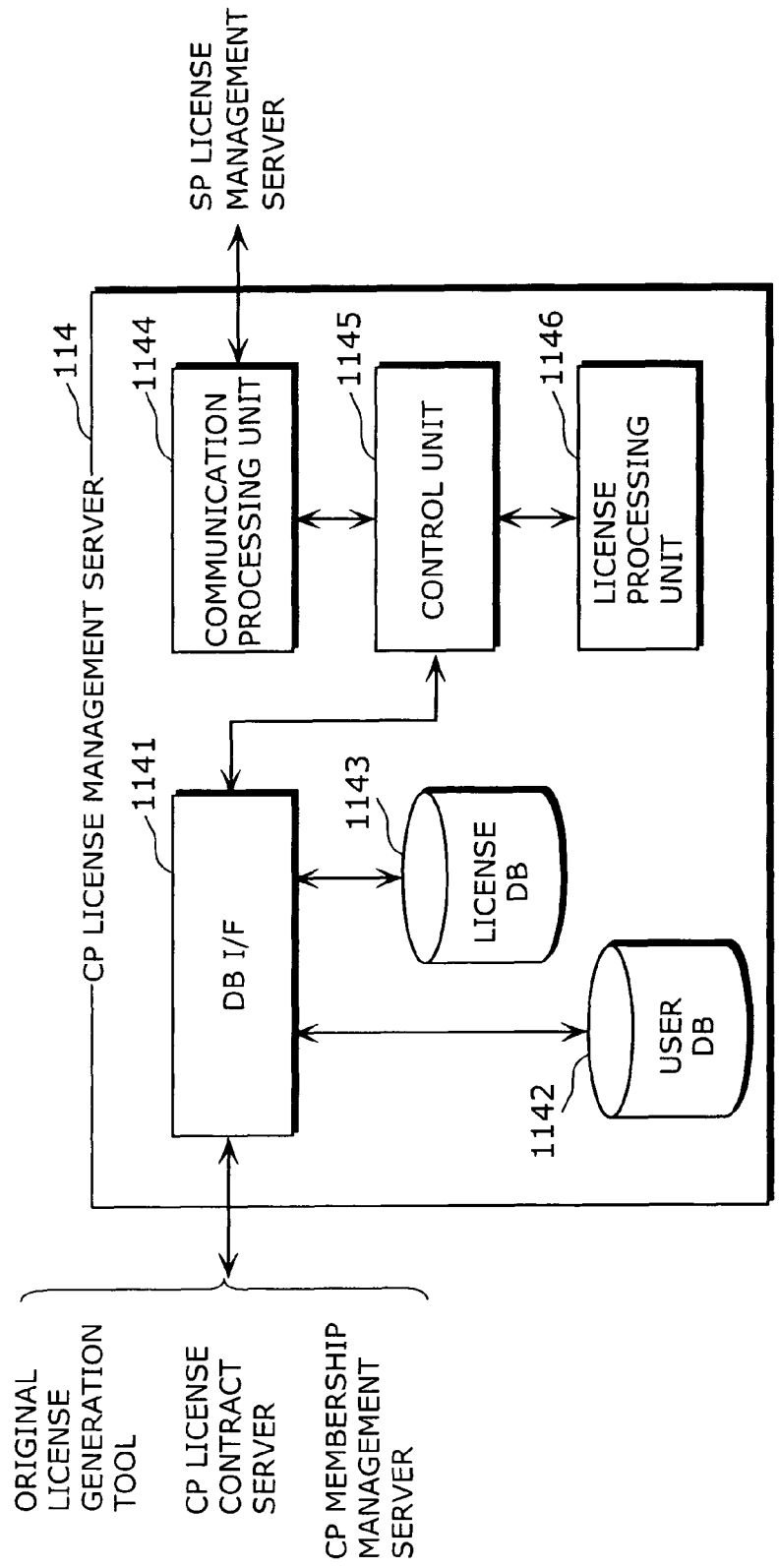
FIG. 8 is a diagram showing a module structure of a CP license management server shown in FIG. 2.

FIG. 8 is a diagram showing the module structure of the CP license management server 114. As shown in FIG. 8, the CP license management server 114 is composed of a DB I/F 1141, a user DB 1142, a license DB 1143, a communication processing unit 1144, a control unit 1145, and a license processing unit 1146.

Figure 9:
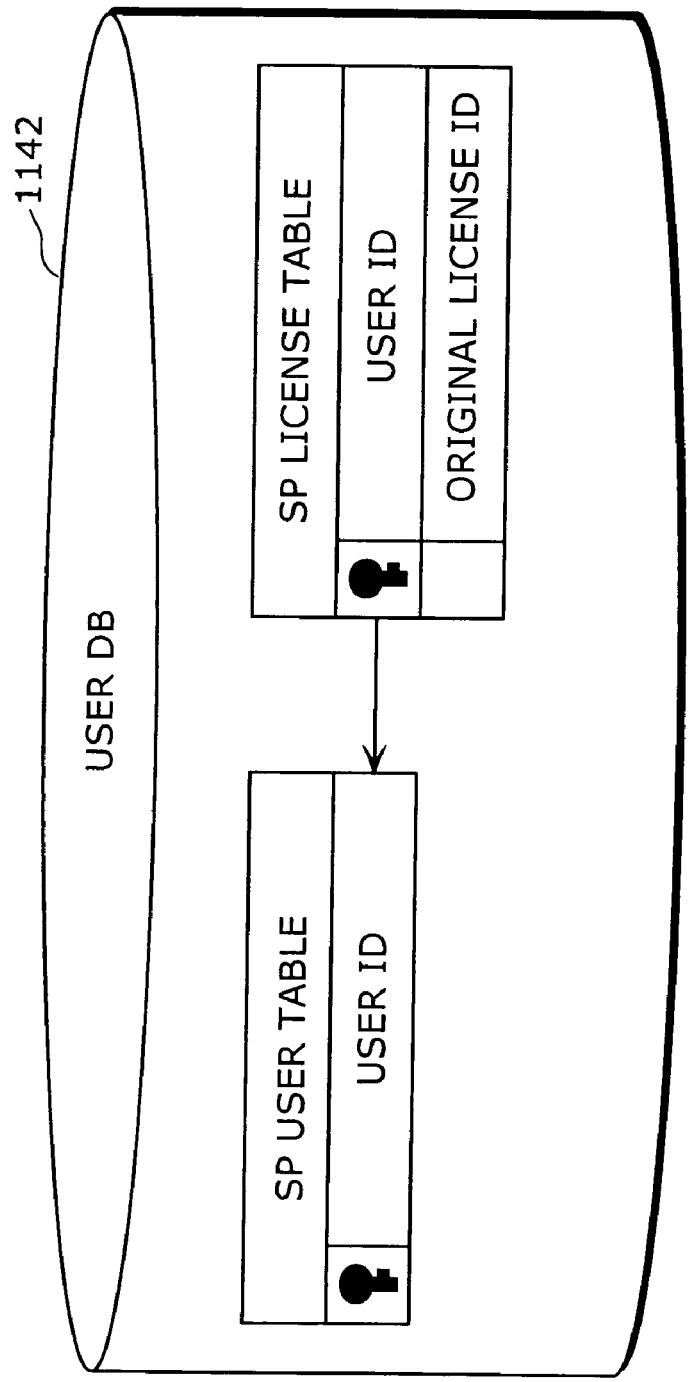
FIG. 9 is a diagram showing a table structure of a user DB shown in FIG. 8.
Figure 10:
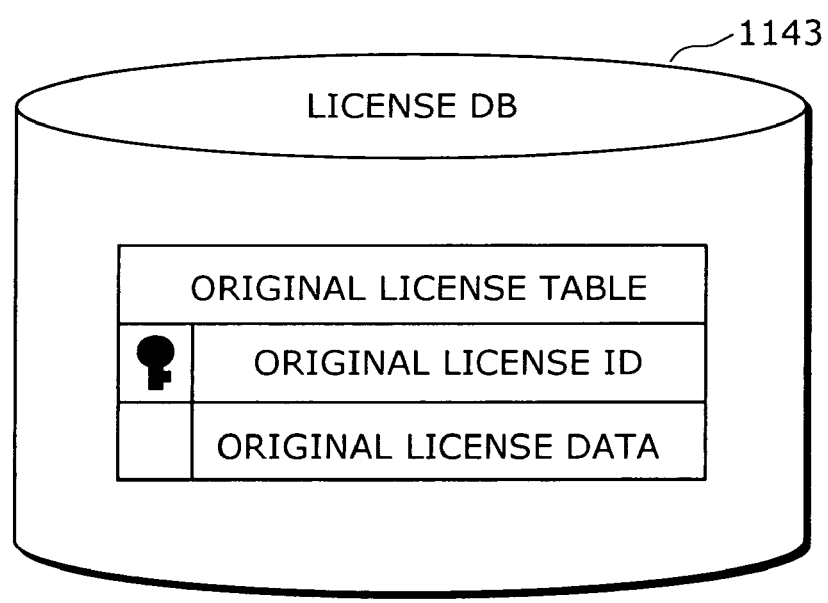
FIG. 10 is a diagram showing a table structure of a license DB shown in FIG. 8.

Here, the DB I/F 1141 plays a role in manipulating the appropriate data stored in the user DB 1142 and the license DB 1143 in accordance with DB manipulation requests from the control unit 1134, the original license generation tool 111, the CP license contract server 113, and the CP membership management server 115. FIG. 9 is a diagram showing a table structure of the user DB shown in FIG. 8. The user DB 1142 is a DB that has the table structure as shown in FIG. 9 and manages the user ID uniquely identifying the service provider 21 and the original license ID for which the service provider 21 signed up. FIG. 10 is a diagram showing a table structure of the license DB shown in FIG. 8. Meanwhile, the license DB 1143 is a DB that has the table structure as shown in FIG. 10 and manages the original license data corresponding to the original license ID. The communication processing unit 1144 is a module that receives a license obtainment request from the SP license management server 214 of the service provider 21 and returns a license obtainment response including the appropriate original license. The control unit 1145 is a module that controls the processing to be performed in response to the license obtainment request received by the communication processing unit 1144. Finally, the license processing unit 1146 is a module that attaches a signature of the CP license management server 114 to the original license to be issued to the SP license management server 214 and that encrypts the part of the content key.

(Module Structure of CP Membership Management Server 115)

Figure 11:
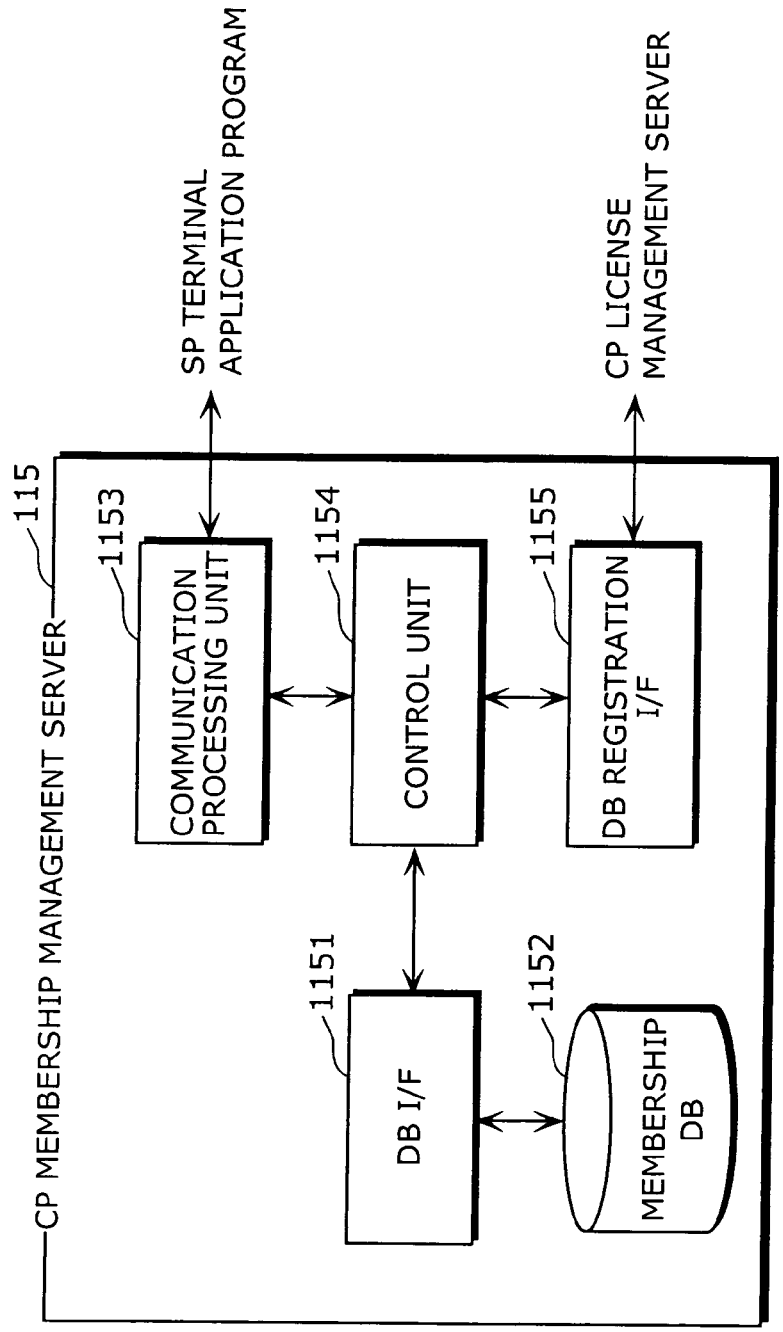
FIG. 11 is a diagram showing a module structure of a CP membership management server shown in FIG. 2.

FIG. 11 is a diagram showing the module structure of the CP membership management server 115. As shown in FIG. 11, the CP membership management server 115 is composed of a DB I/F 1151, a membership DB 1152, a communication processing unit 1153, a CP license management server 114, and a DB registration I/F 1155.

Figure 12:
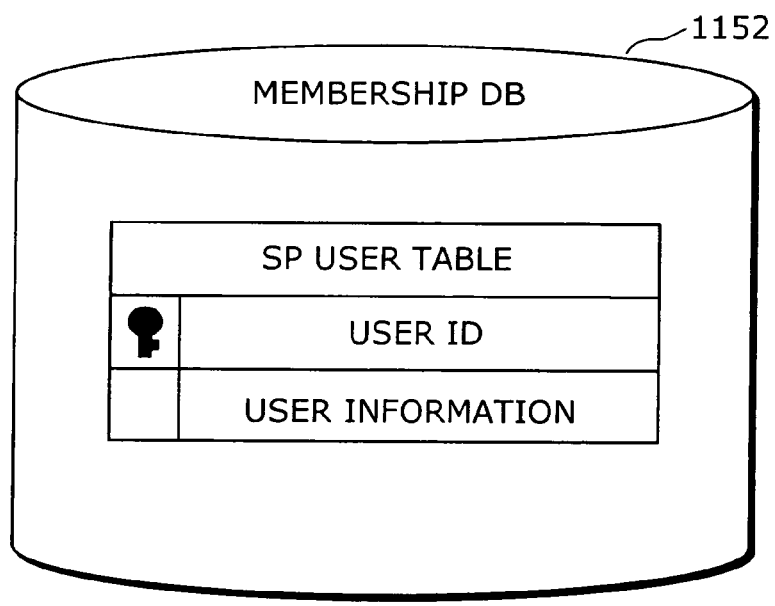
FIG. 12 is a diagram showing a table structure of a membership DB shown in FIG. 11.

Here, the DB I/F 1151 plays a role in manipulating the appropriate data stored in the membership DB 1152 in accordance with a DB manipulation request from the control unit 1154. FIG. 12 is a diagram showing a table structure of the membership DB shown in FIG. 11. The membership DB 1152 is a DB that has the table structure as shown in FIG. 12 and manages the user ID uniquely identifying the service provider 21 and the associated user information. Here, the user information refers to information that includes an account ID, a password, and a name and an address of the service provider. The communication processing unit 1153 is a module that receives a service sign-up request from the SP terminal application program 212 of the service provider 21 and returns a service sign-up response. The control unit 1154 is a module that controls the processing to be performed in response to the service sign-up request received by the communication processing unit 1153. Finally, the DB registration I/F 1155 is a module that requests the user ID of the service provider 21 completing the sign-up should be registered into the DB of the CP license management server 114.

(Module Structure of CP Content Management Server 116)

Figure 13:
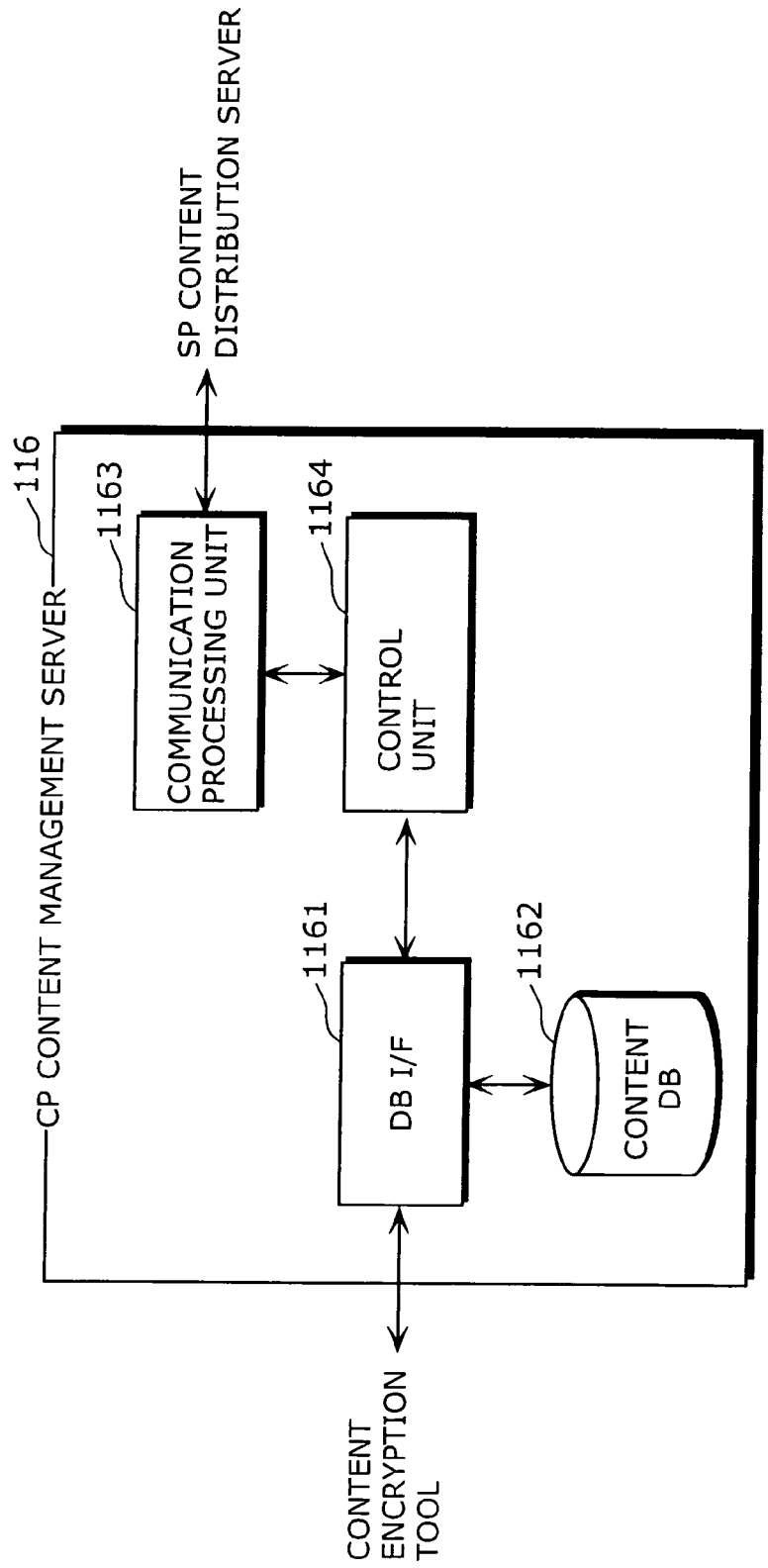
FIG. 13 is a diagram showing a module structure of a CP content management server shown in FIG. 2.

FIG. 13 is a diagram showing a module structure of the CP content management server 116. As shown in FIG. 13, the CP content management server 116 is composed of a DB I/F 1161, a content DB 1162, a communication processing unit 1163, and a control unit 1164.

Figure 14:
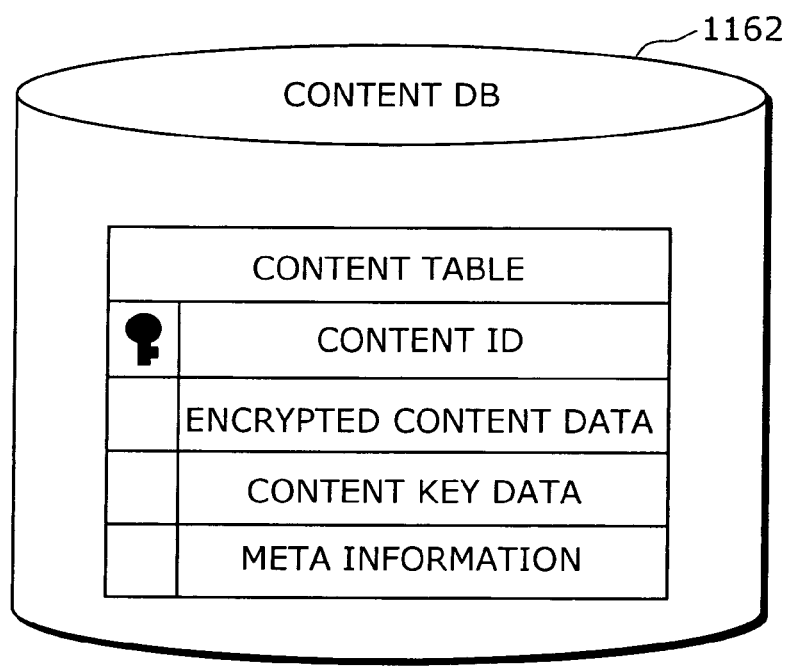
FIG. 14 is a diagram showing a table structure of a content DB shown in FIG. 13.

Here, the DB I/F 1161 plays a role in manipulating the appropriate data stored in the content DB 1162 in accordance with DB manipulation requests from the control unit 1164 and the content encryption tool 112. FIG. 14 is a diagram showing a table structure of the content DB shown in FIG. 13. The content DB 1162 is a DB that has the table structure as shown in FIG. 14 and manages the content ID uniquely identifying the content, the encrypted content data, the content key data, and the meta information showing a title of the content and so forth. The communication processing unit 1163 is a module that receives an encrypted content obtainment request from the SP content distribution server 216 of the service provider 21 and returns an encrypted content obtainment response including the appropriate encrypted content. Finally, the control unit 1164 is a module that controls the processing to be performed in response to the encrypted content obtainment request received by the communication processing unit 1163.

Following the explanation about the module structure of each tool and each server of the subsystem of the service provider 21, the module structure of each tool and each server of the subsystem of the service provider 21 shown in FIG. 3 is shown with reference to FIGS. 15 to 25.

(Module Structure of Sales License Generation Tool 211)

Figure 15:
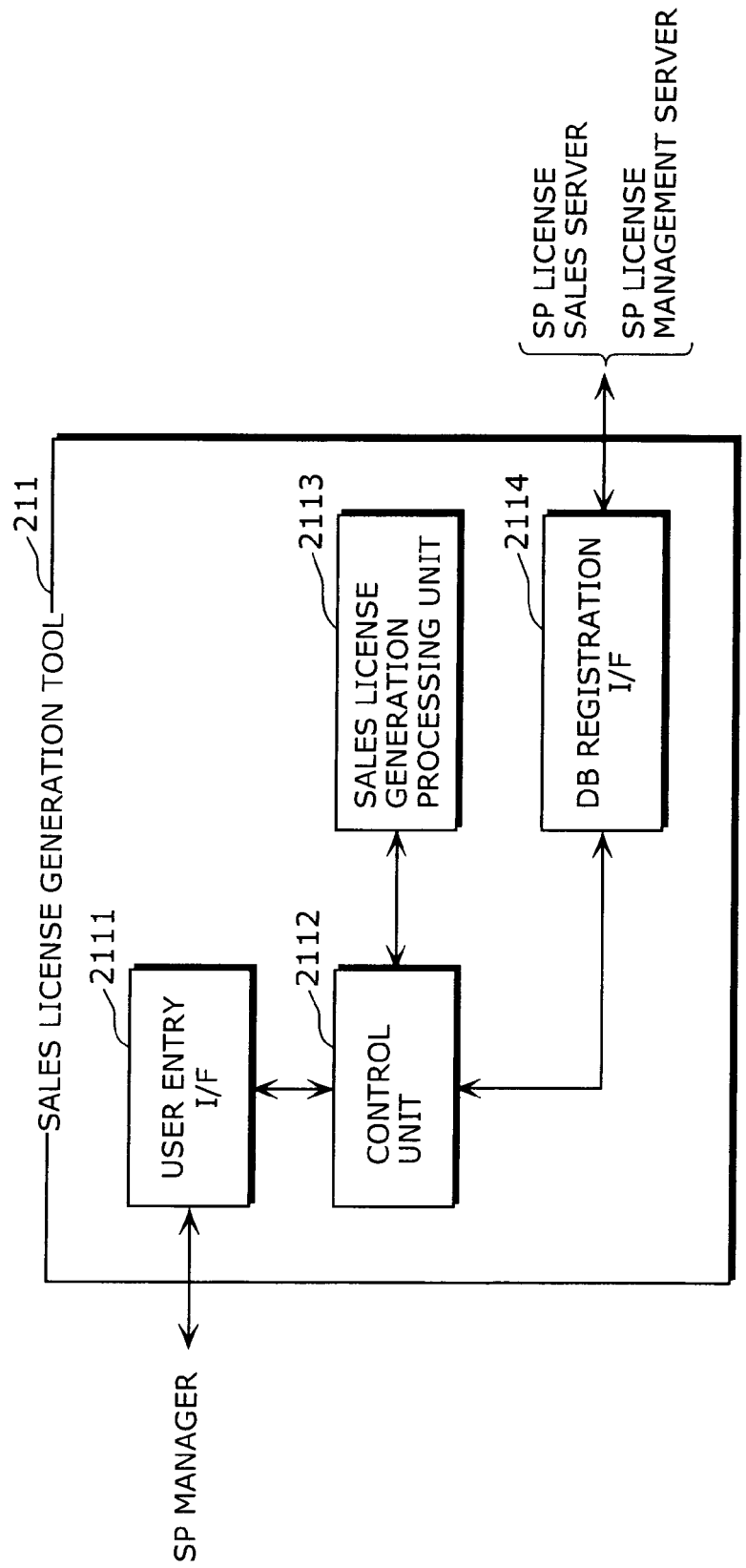
FIG. 15 is a diagram showing a module structure of a sales license generation tool shown in FIG. 3.

First, FIG. 15 is a diagram showing the module structure of the sales license generation tool 211. As shown in FIG. 15, the sales license generation tool 211 is composed of a user entry I/F 2111, a control unit 2112, a sales license generation processing unit 2113, and a DB registration I/F 2114.

Here, the user entry I/F 2111 plays a role in receiving a request from a user (assumed to be a system manager or the like of the service provider 21) of the sales license generation tool 211. The control unit 2112 is a module that controls the processing to be performed in response to the request received by the user entry I/F 2111. The sales license generation processing unit 2113 is a module that edits the template of the sales license included in the appropriate original license in accordance with the instructions from the control unit 2112 to generate a sales license (having no content key) that includes no content key. Finally, the DB registration I/F 2114 is a module that requests the generated sales license (having no content key) should be registered into the DB of the SP license management server 214. Moreover, the DB registration I/F 2114 plays a role in requesting that a sales license ID which is an identifier uniquely identifying the sales license and the meta information which shows the usage condition of the sales license and so forth should be registered into the DB of the SP license sales server 213.

(Module Structure of SP Terminal Application Program 212)

Figure 16:
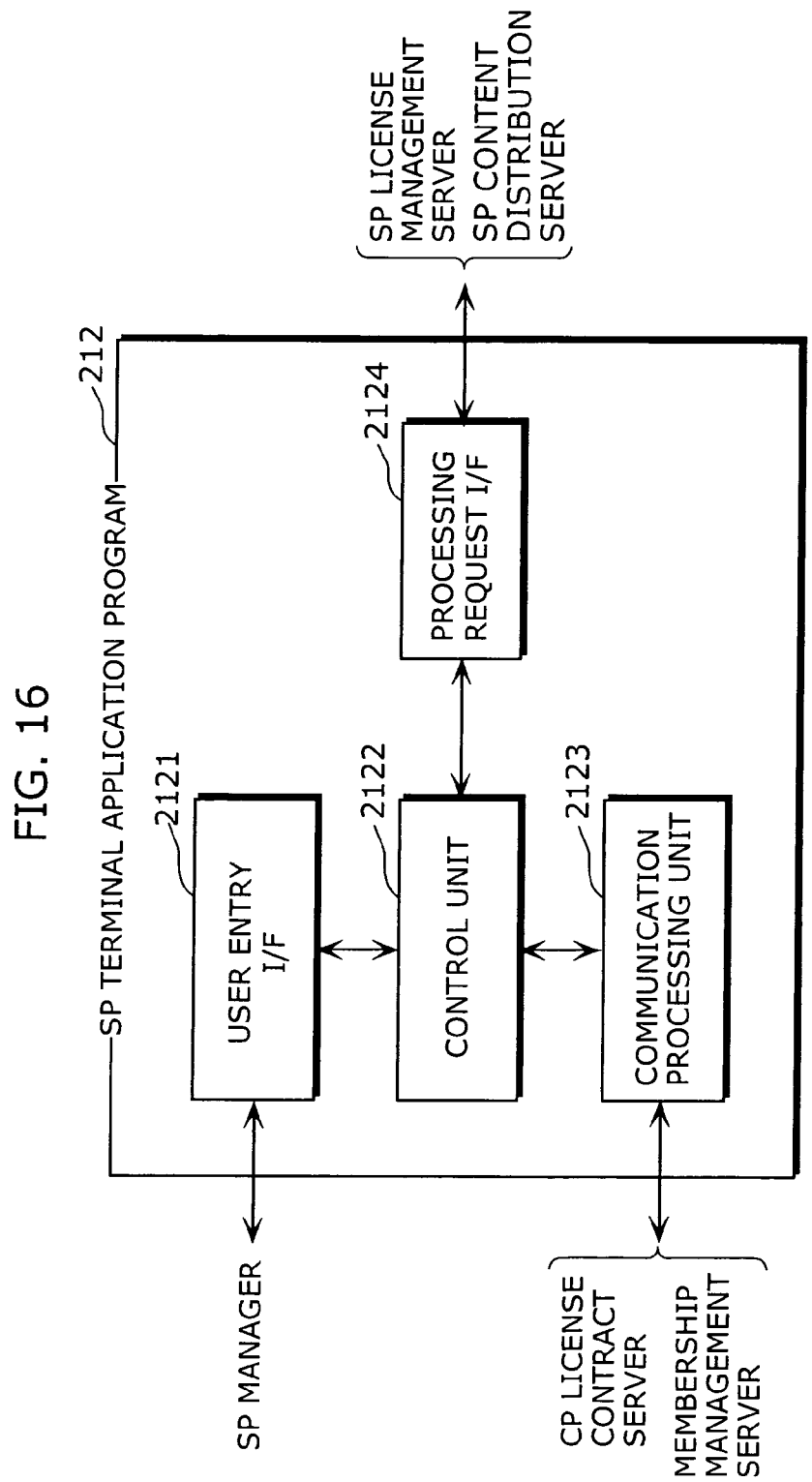
FIG. 16 is a diagram showing a module structure of an SP terminal application program shown in FIG. 3.

FIG. 16 is a diagram showing the module structure of the SP terminal application program 212. As shown in FIG. 16, the SP terminal application program 212 is composed of a user entry I/F 2121, a control unit 2122, a communication processing unit 2123, and a processing request I/F 2124.

Here, the user entry I/F 2121 plays a role in receiving a request from the SP terminal application program 212 (assumed to be the system manager or the like of the service provider 21). The control unit 2122 is a module that controls the processing to be performed in response to the request received by the user entry I/F 2121. The communication processing unit 2123 is a module that issues requests for a license contract and a service sign-up respectively to the CP license contract server 113 and the CP membership management server 115. Finally, the processing request I/F 2124 is a module that directs the SP license sales server 213 and the SP content distribution server 216 respectively to obtain the original license for which the license contract was signed and to obtain the encrypted content.

(Module Structure of SP License Sales Server 213)

Figure 17:
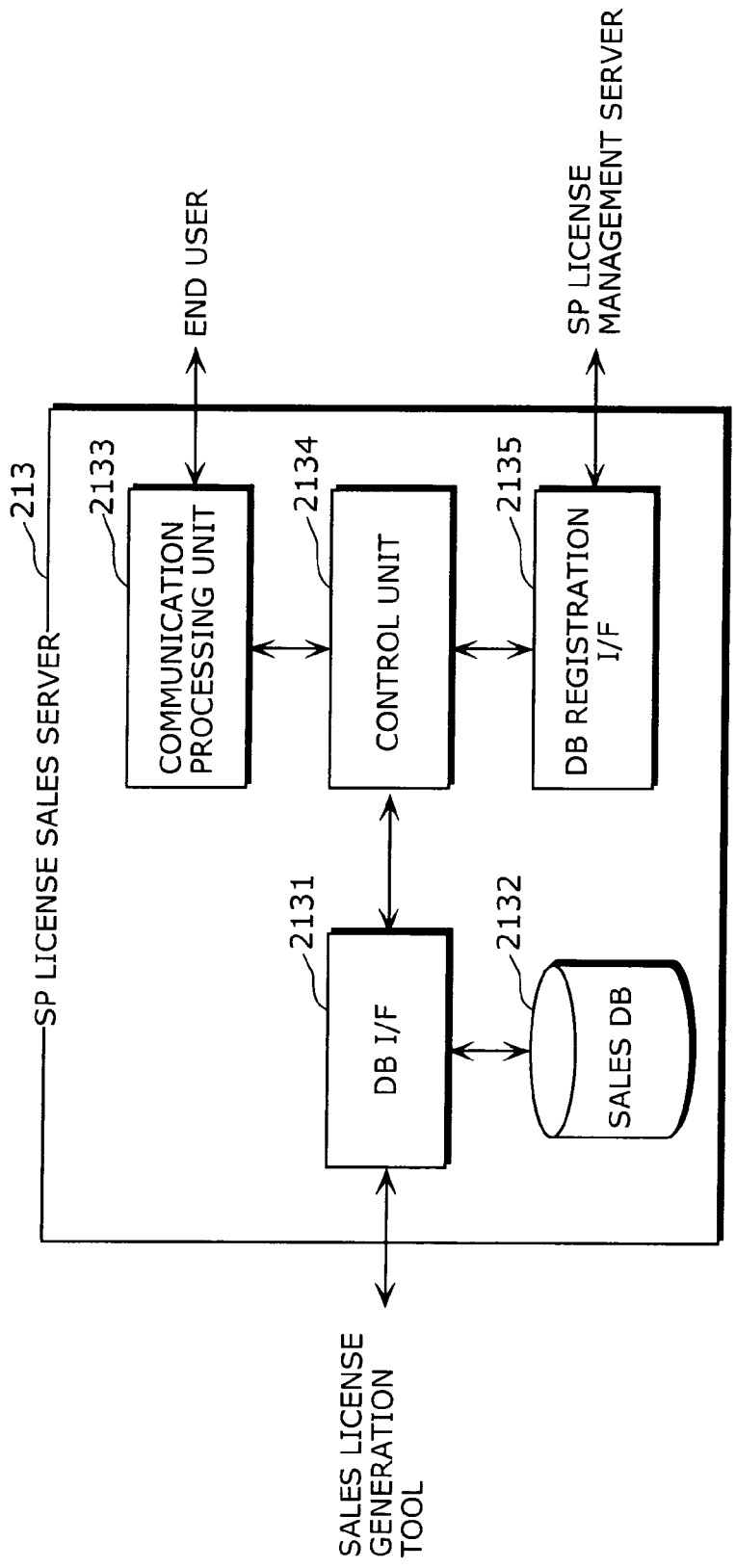
FIG. 17 is diagram showing a module structure of an SP license sales server shown in FIG. 3.

FIG. 17 is a diagram showing the module structure of the SP license sales server 213. As shown in FIG. 17, the SP license sales server 213 is composed of a DB I/F 2131, a sales DB 2132, a communication processing unit 2133, a control unit 2134, and a DB registration I/F 2135.

Figure 18:
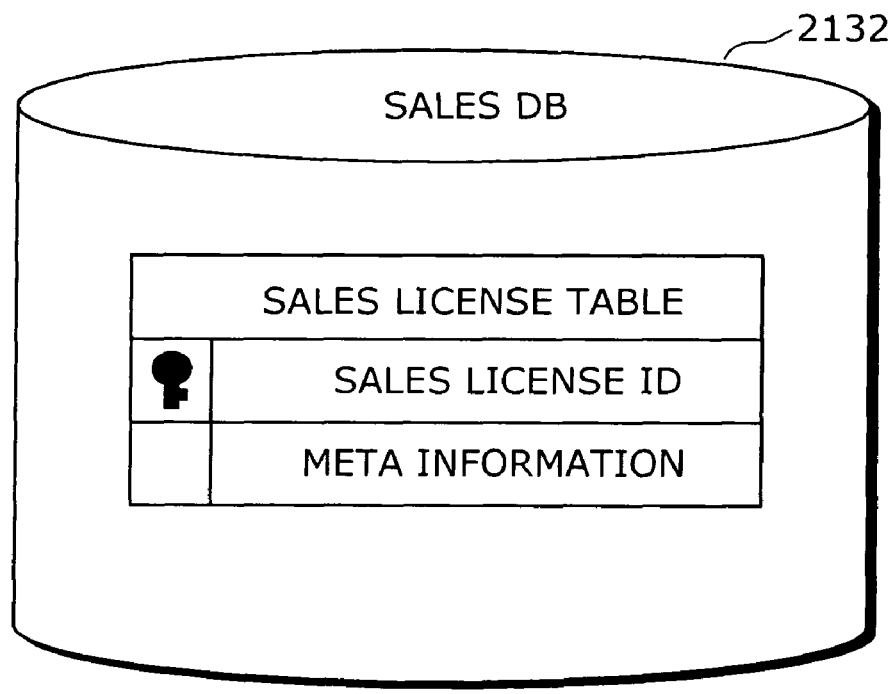
FIG. 18 is a diagram showing a table structure of a sales DB shown in FIG. 17.

Here, the DB I/F 2131 plays a role in manipulating the appropriate data stored in the sales DB 2132 in accordance with DB manipulation requests from the control unit 2134 and the sales license generation tool 211. FIG. 18 is a diagram showing a table structure of the sales DB shown in FIG. 17. The sales DB 2132 is a DB that has the table structure as shown in FIG. 18 and manages the sales license ID and the meta information relating to the usage condition of the sales license and so forth. The communication processing unit 2133 is a module that receives a license purchase request from the end user 31 and returns a license purchase response. The control unit 2134 is a module that controls the processing to be performed in response to the license purchase request received by the communication processing unit 2133. Finally, the DB registration I/F 2135 is a module that requests the sales license ID concerned with the license purchase and the user ID uniquely identifying the end user 31 who purchased the license should be registered into the DB of the SP license management server 214.

(Module Structure of SP License Management Server 214)

Figure 19:
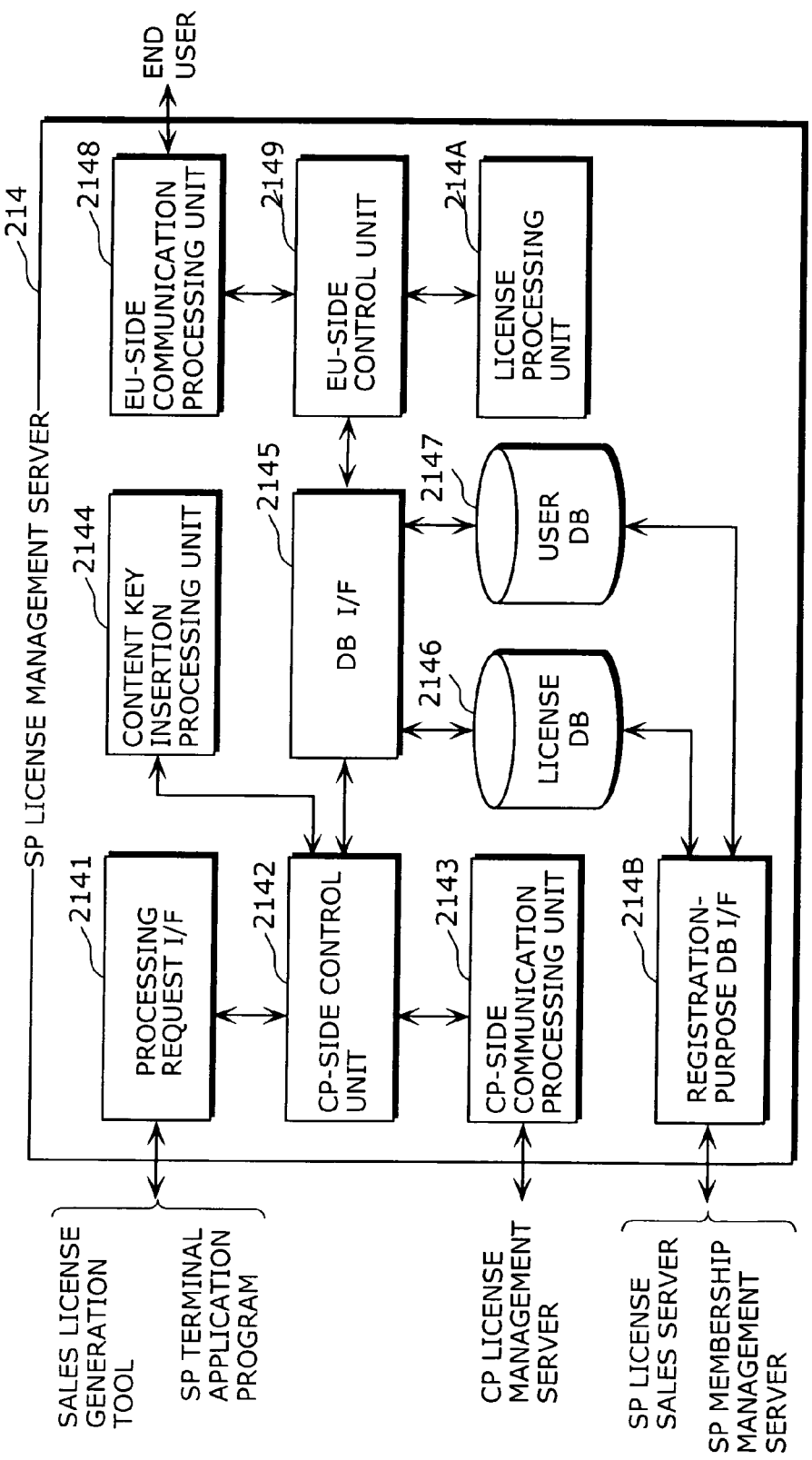
FIG. 19 is a diagram showing a module structure of an SP license management server shown in FIG. 3.

FIG. 19 is a diagram showing the module structure of the SP license management server 214 shown in FIG. 3. As shown in FIG. 19, the SP license management server 214 is composed of a processing request I/F 2141, a CP-side control unit 2142, a CP-side communication processing unit 2143, a content key insertion processing unit 2144, a DB I/F 2145, a license DB 2146, a user DB 2147, an EU-side communication processing unit 2148, an EU-side control unit 2149, a license processing unit 214, and a registration-purpose DB I/F 214B.

Figure 20:
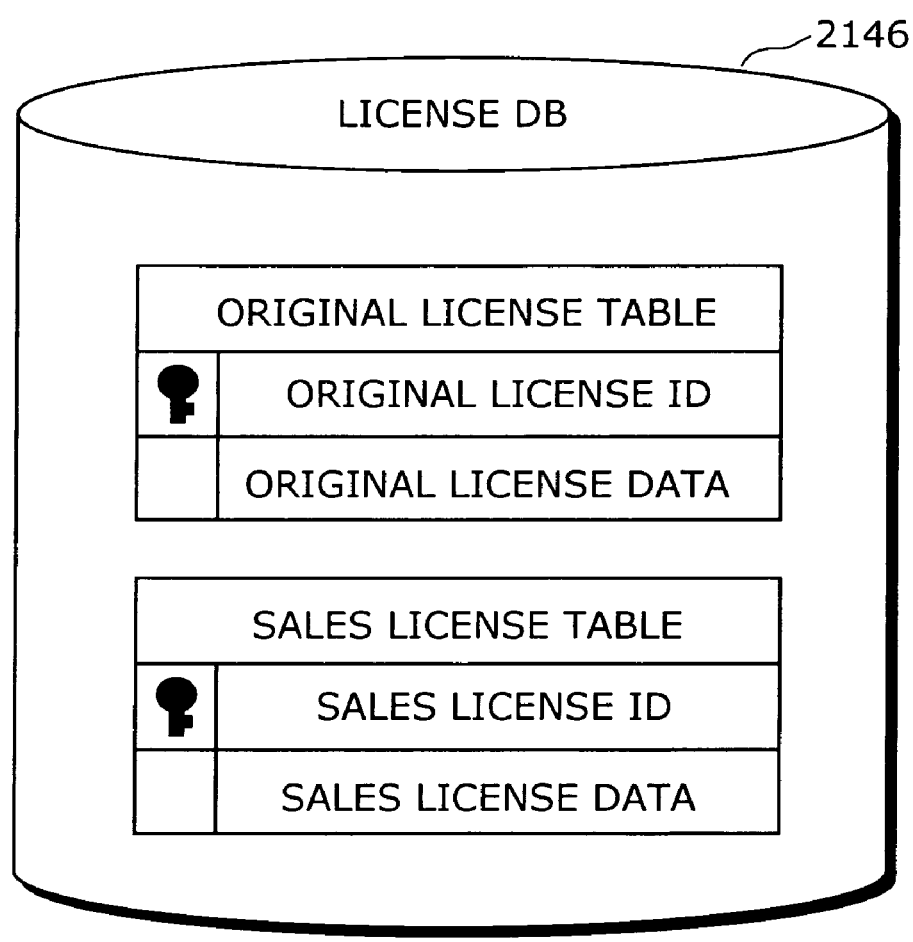
FIG. 20 is a diagram showing a table structure of a license DB shown in FIG. 19.
Figure 21:
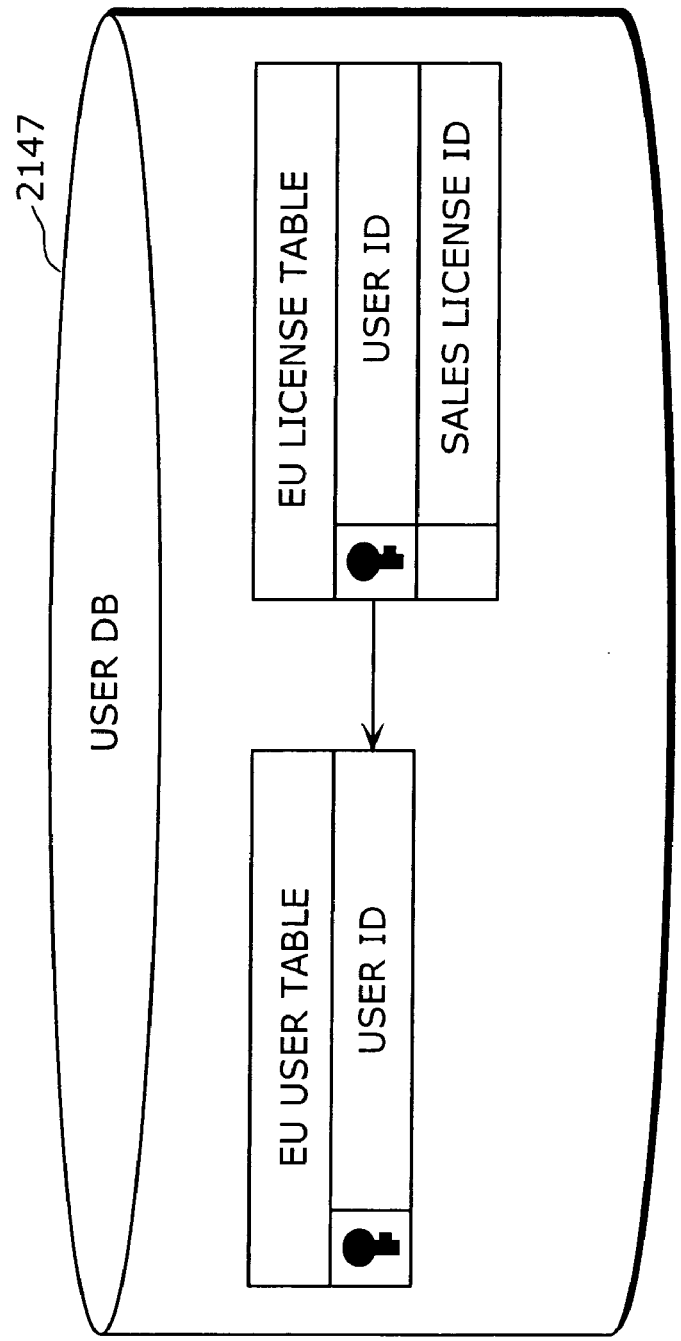
FIG. 21 is a diagram showing a table structure of a user DB shown in FIG. 19.

Here, the processing request I/F 2141 plays a role in receiving a sales license registration request and an original license obtainment request respectively from the sales license generation tool 211 and the SP terminal application program 212. The CP-side control unit 2142 is a module that controls the processing to be performed in response to the sales license registration request and the original license obtainment request received by the processing request I/F 2141. The CP-side communication processing unit 2143 is a module that issues a request for an original license obtainment to the CP license management server 114 in accordance with instructions from the CP-side control unit 2142. The content key insertion processing unit 2144 is a module that: compares the usage condition of the sales license (having no content key) received by the processing request I/F 2141 from the sales license generation tool 211 with the edit condition of the original license based on which the present sales license (having no content key) was generated; judges whether or not the usage condition is within the range of the edit condition; and only when judging that it is within the range, inserts the content key of the original license into the sales license (having no content key) to generate a sales license (having a content key) that includes the content key. The content key insertion processing unit 2144 is a tamper resistant module. The DB I/F 2145 is a module that manipulates the appropriate data stored in the license DB 2146 and the user DB 2147 in accordance with DB manipulation requests from the CP-side control unit 2142 and the EU-side control unit 2149. FIG. 20 is a diagram showing a table structure of the license DB shown in FIG. 19. The license DB 2146 is a DB that has the table structure as shown in FIG. 20 and manages the original license data corresponding to the original license ID and the sales license data corresponding to the sales license ID. FIG. 21 is a diagram showing a table structure of the user DB shown in FIG. 19. The user DB 2147 is a DB that has the table structure as shown in FIG. 21 and manages the user ID uniquely identifying the end user 31 and the sales license ID which the end user 31 purchased. The EU-side communication processing unit 2148 is a module that receives a license obtainment request from the end user 31 and returns a license obtainment response including the appropriate sales license (having a content key). The EU-side control unit 2149 is a module that controls the processing to be performed in response to the license obtainment request received by the EU-side communication processing unit 2148. Finally, the license processing unit 214A is a module that performs the processing to attach a signature of the SP license management server 214 to the sales license (having a content key) which is to be issued to the end user 31. The registration-purpose DB I/F 214B plays a role in receiving a sales license ID registration request for the purchased sales license and a user information registration request respectively from the SP license sales server 213 and the SP membership management server 215.

The explanation has been given in the present embodiment for a case where the content key insertion processing unit 2144 is a module that is included in the SP license management server 214 of the service provider 21. However, the SP license management server 214 and the CP license management server 114, as the modules included in the CP license management server 114 of the content provider 11, may carry out communication to play the above-mentioned role of the content key insertion processing unit 2144.

(Module Structure of SP Membership Management Server 215)

Figure 22:
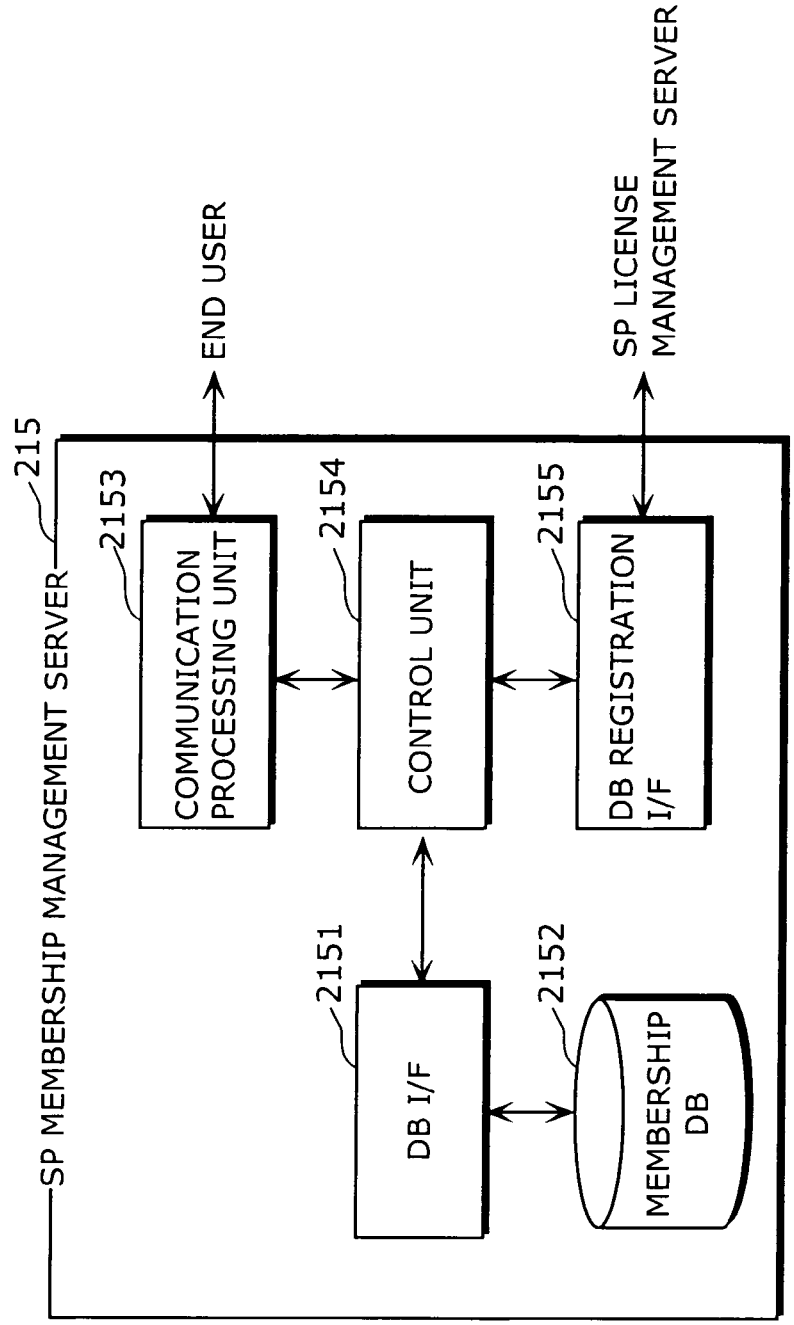
FIG. 22 is a diagram showing a module structure of an SP membership management server shown in FIG. 3.

FIG. 22 is a diagram showing the module structure of the SP membership management server 215. As shown in FIG. 22, the SP membership management server 215 is composed of a DB I/F 2151, a membership DB 2152, a communication processing unit 2153, a control unit 2154, and a DB registration I/F 2155.

Figure 23:
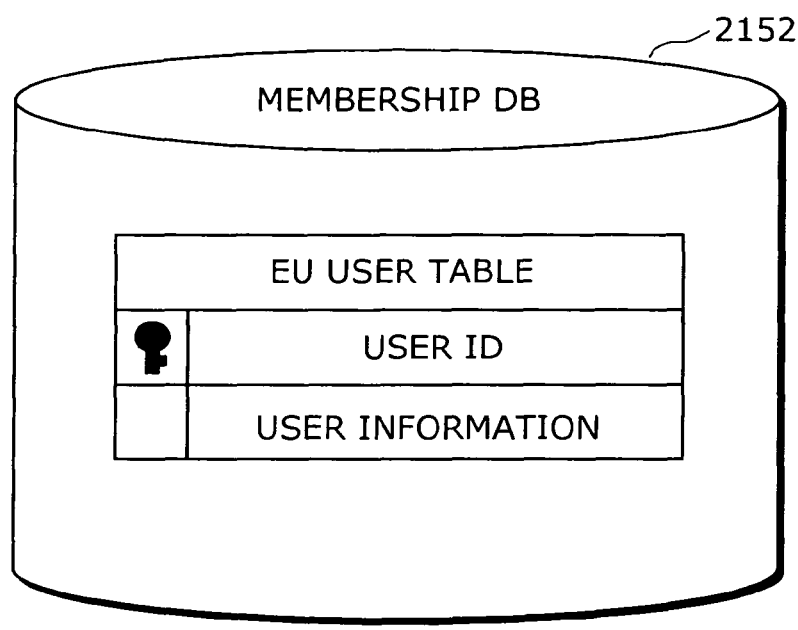
FIG. 23 is a diagram showing a table structure of a membership DB shown in FIG. 22.

Here, the DB I/F 2151 plays a role in manipulating the appropriate data stored in the membership DB 2152 in accordance with a DB manipulation request from the control unit 2154. FIG. 23 is a diagram showing a table structure of the membership DB shown in FIG. 22. The membership DB 2152 is a DB that has the table structure as shown in FIG. 23 and manages the user ID uniquely identifying the end user 31 and the associated user information. The communication processing unit 2153 is a module that receives a service sign-up request from the end user 31 and returns a service sign-up response. The control unit 2154 is a module that controls the processing to be performed in response to the service sign-up request received by the communication processing unit 2153. The DB registration I/F 2155 is a module that requests the user ID of the end user 31 who signed up for the service should be registered into the DB of the SP license management server 214.

(Module Structure of SP Content Distribution Server 216)

Figure 24:
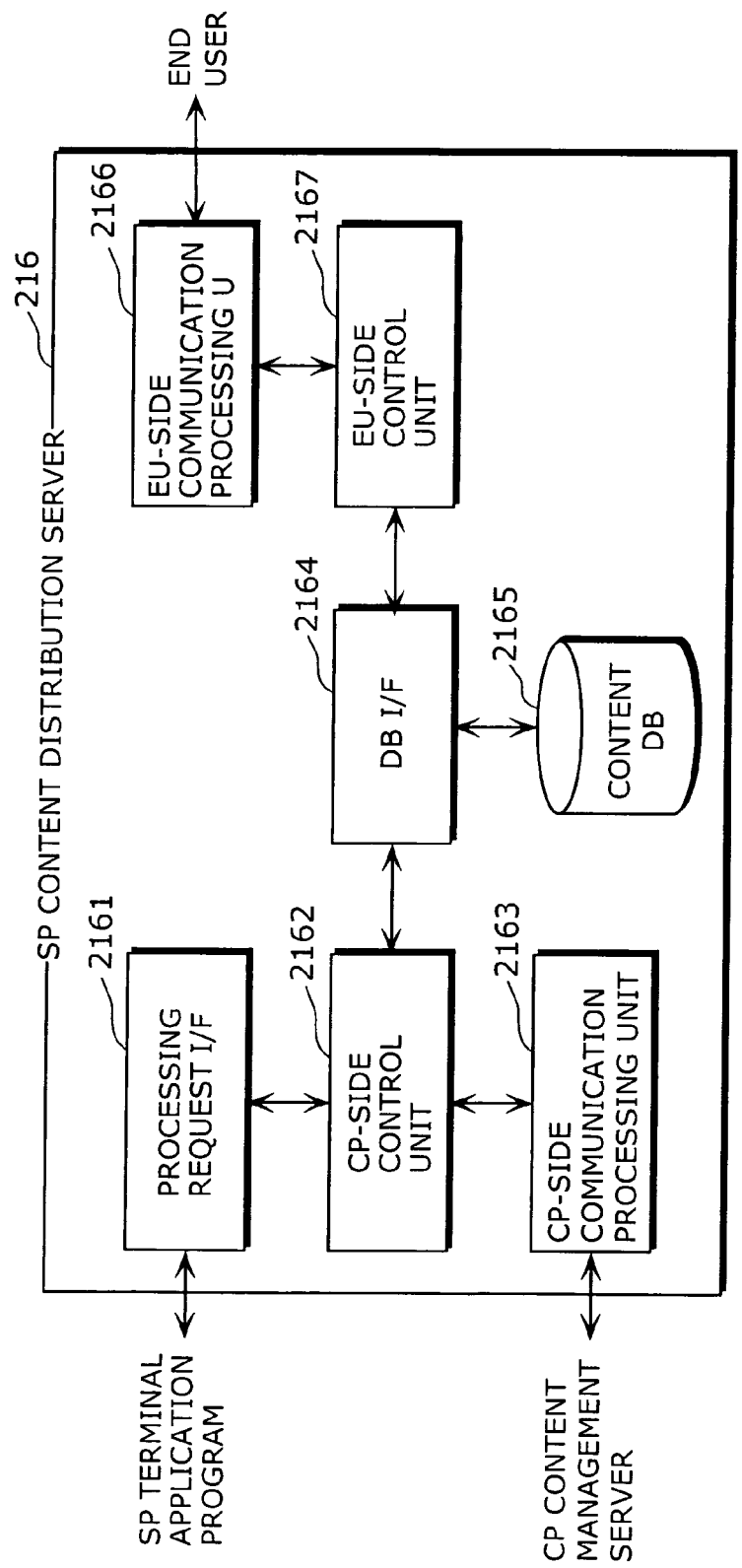
FIG. 24 is a diagram showing a module structure of an SP content distribution server shown in FIG. 3.

FIG. 24 is a diagram showing the module structure of the SP content distribution server 216. As shown in FIG. 24, the SP content distribution server 216 is composed of a processing request I/F 2161, a CP-side control unit 2162, a CP-side communication processing unit 2163, a DB I/F 2164, a content DB 2165, an EU-side communication processing unit 2166, and an EU-side control unit 2167.

Figure 25:
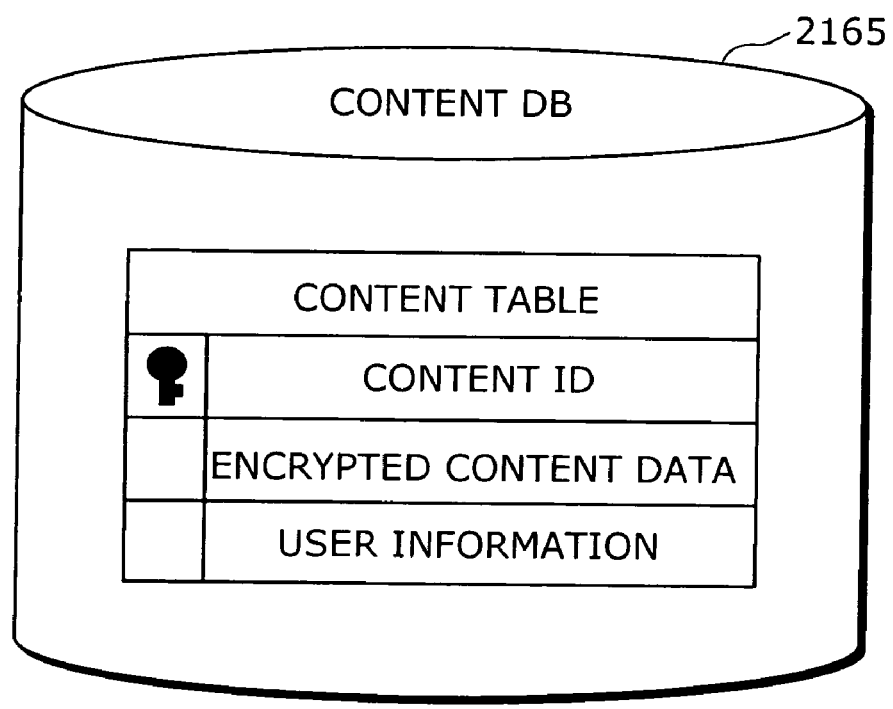
FIG. 25 is a diagram showing a table structure of a content DB shown in FIG. 24.

Here, the processing request I/F 2161 plays a role in receiving an encrypted content obtainment request from the SP terminal application program 212. The CP-side control unit 2162 is a module that controls the processing to be performed in response to the encrypted content obtainment request received by the processing request I/F 2161. The CP-side communication processing unit 2163 is a module that issues a request for an encrypted content obtainment to the CP content management server 116. The DB I/F 2164 is a module that manipulates the appropriate data stored in the content DB 2165 in accordance with DB manipulation requests from the CP-side control unit 2162 and the EU-side control unit 2167. FIG. 25 is a diagram showing a table structure of the content DB shown in FIG. 24. The content DB 2165 is a DB that has the table structure as shown in FIG. 25 and manages the content ID uniquely identifying the encrypted content, the encrypted content data, and the meta information showing a title of the content and so forth. The EU-side communication processing unit 2166 is a module that receives an encrypted content obtainment request from the end user 31 and returns an encrypted content obtainment response including the appropriate encrypted content. Finally, the EU-side control unit 2167 is a module that controls the processing to be performed in response to the encrypted content obtainment request received by the EU-side communication processing unit 2166.

(Explanations of Sequences and Data Structures)

The following are explanations of: each sequence of processing performed in the content provider 11; each sequence of processing performed in the service provider 21; and each sequence of processing performed between the content provider 11 and the service provider 21. Moreover, explanations will be given as to data structures of the original license and the sales license.

(Sequence of Content Encryption Processing)

Figure 26:
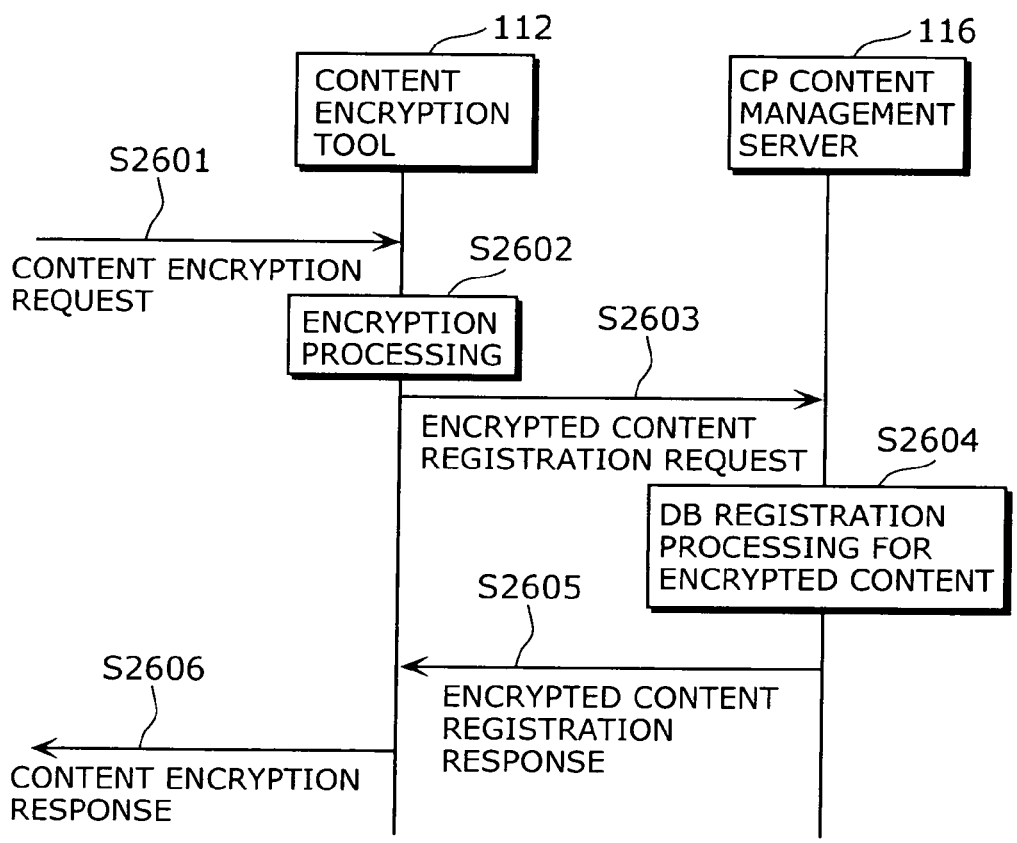
FIG. 26 is a sequence diagram for content encryption processing performed by the content encryption tool shown in FIG. 5.

First, FIG. 26 is a sequence diagram for the content encryption processing performed in the content provider 11. As shown in FIG. 26, the present processing is carried out by the content encryption tool 112 and the CP content management server 116. A detailed explanation is given as follows.

The content encryption tool 112 receives a content encryption request, from the user of the present tool, that includes non-encrypted content, a content key to be used in the encryption, and meta information regarding the content (S2601). Then, the content is encrypted using the content key, so that the encrypted content is generated (S2602). After this, the content key and the meta information received in S2601 and an encrypted content registration request S2603 including the encrypted content generated in S2602 are transmitted to the CP content management server 116. Receiving the encrypted content registration request S2603, the CP content management server 116 issues the content ID uniquely identifying the encrypted content and records the content key, the meta information, and the encrypted content into the DB in association with the present content ID (S2604). After completing the recording into the DB, the CP content management server 116 returns an encrypted content registration response S2605 including the result to the content encryption tool 112. Receiving the encrypted content registration response S2605, the content encryption tool 112 shows a content encryption response S2606 that shows the result of the present processing to the user.

(Sequence of Original License Generation Processing)

Figure 27:
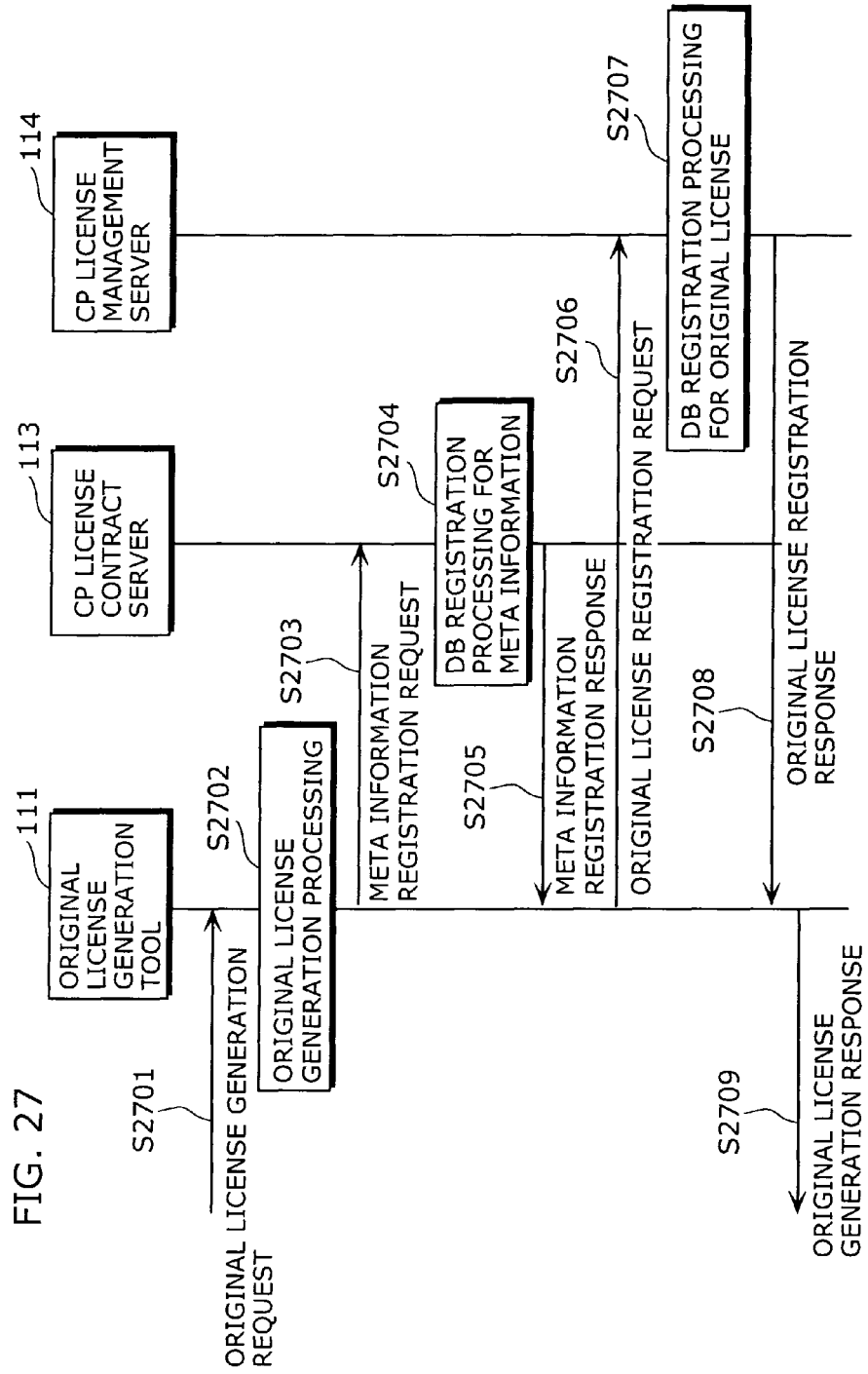
FIG. 27 is a sequence diagram for original license generation processing performed by the original license generation tool shown in FIG. 4.

FIG. 27 is a sequence diagram for the original license generation processing performed in the content provider 11. As shown in FIG. 27, the present processing is carried out by the original license generation tool 111, the CP license contract server 113, and the CP license management server 114. A detailed explanation is given as follows.

Figure 29:
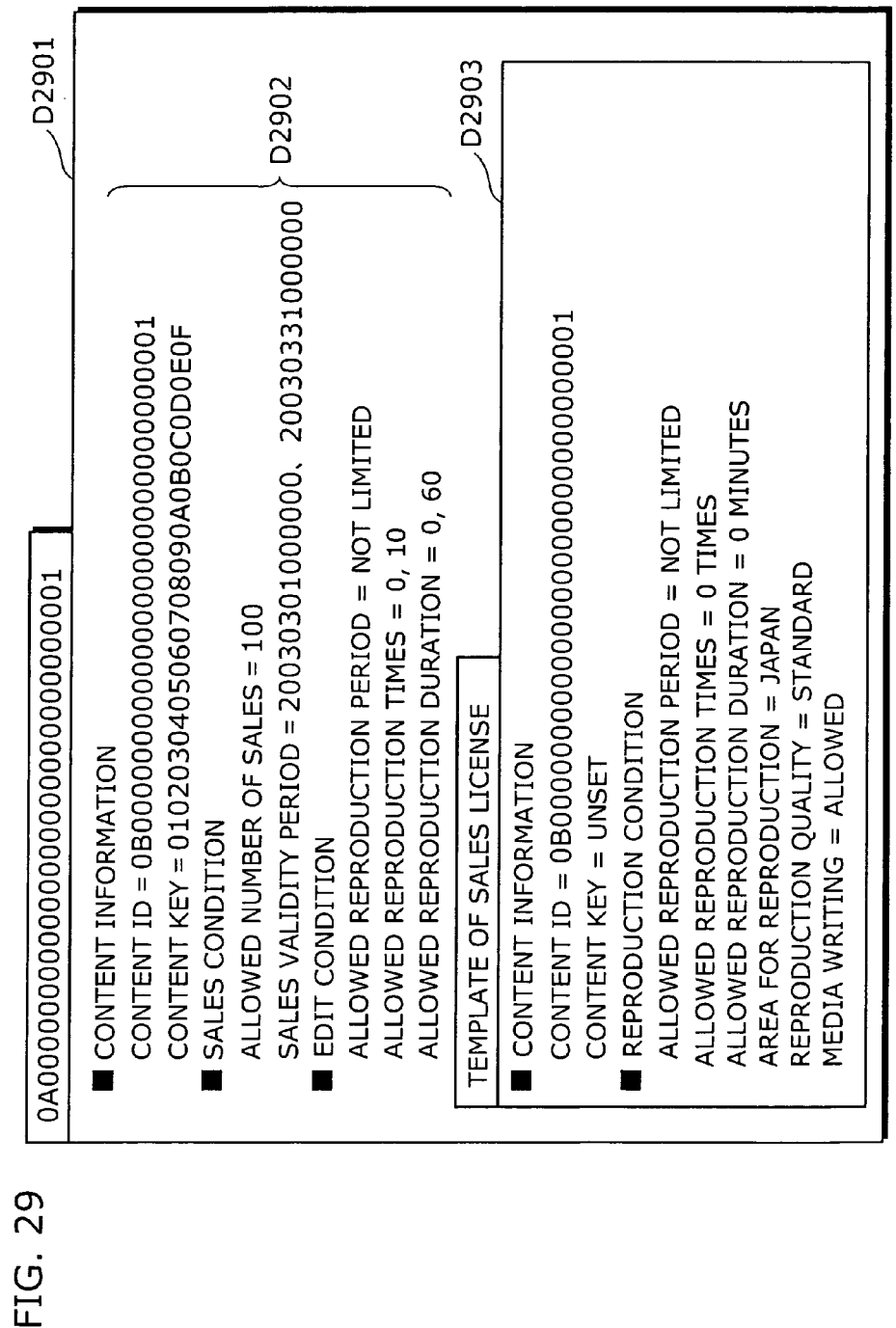
FIG. 29 is a diagram showing a data structure of an original license.

FIG. 28 shows an entry screen of the user entry I/F of the original license generation tool shown in FIG. 4. Through an entry screen D2801 as shown in FIG. 28, the original license generation tool 111 receives an original license generation request S2701 that includes an original license ID (D2802), a content ID (D2803), a content key (D2804), a sales condition (D2805), and an edit condition (D2806). In accordance with the received information, the original license is generated (S2702). FIG. 29 is a diagram showing a data structure of the original license. The original license generated in S2702 has the data structure as shown in FIG. 29. As shown in FIG. 29, the original license D2901 is data composed of: information D2902 that shows the content information, the sales condition, and the edit condition; and a template D2903 of the sales license. After generating the original license, the original license generation tool 111 requests the CP license contract server 113 to register the meta information showing the sales and edit conditions of the original license in association with the original license ID (S2703). Receiving the meta information registration request S2703, the CP license contract server 113 records the meta information into the DB in association with the original license ID (S2704). After completing the recording into the DB, the CP license contract server 113 returns a meta information registration response S2705 including the result to the original license generation tool 111. Next, receiving the meta information registration response S2705, the original license generation tool 111 requests the CP license management server 114 to register the original license in association with the original license ID (S2706).

Receiving the original license registration request S2706, the CP license management server 114 records the original license into the DB in association with the original license ID (S2707). After completing the recording into the DB, the CP license management server 114 returns an original license registration response S2708 including the result to the original license generation tool 111. Receiving the original license registration response S2708, the original license generation tool 111 shows the user an original license generation response S2709 that indicates the result of the present processing.

(Sequence of Service Sign-Up Processing)

Figure 30:
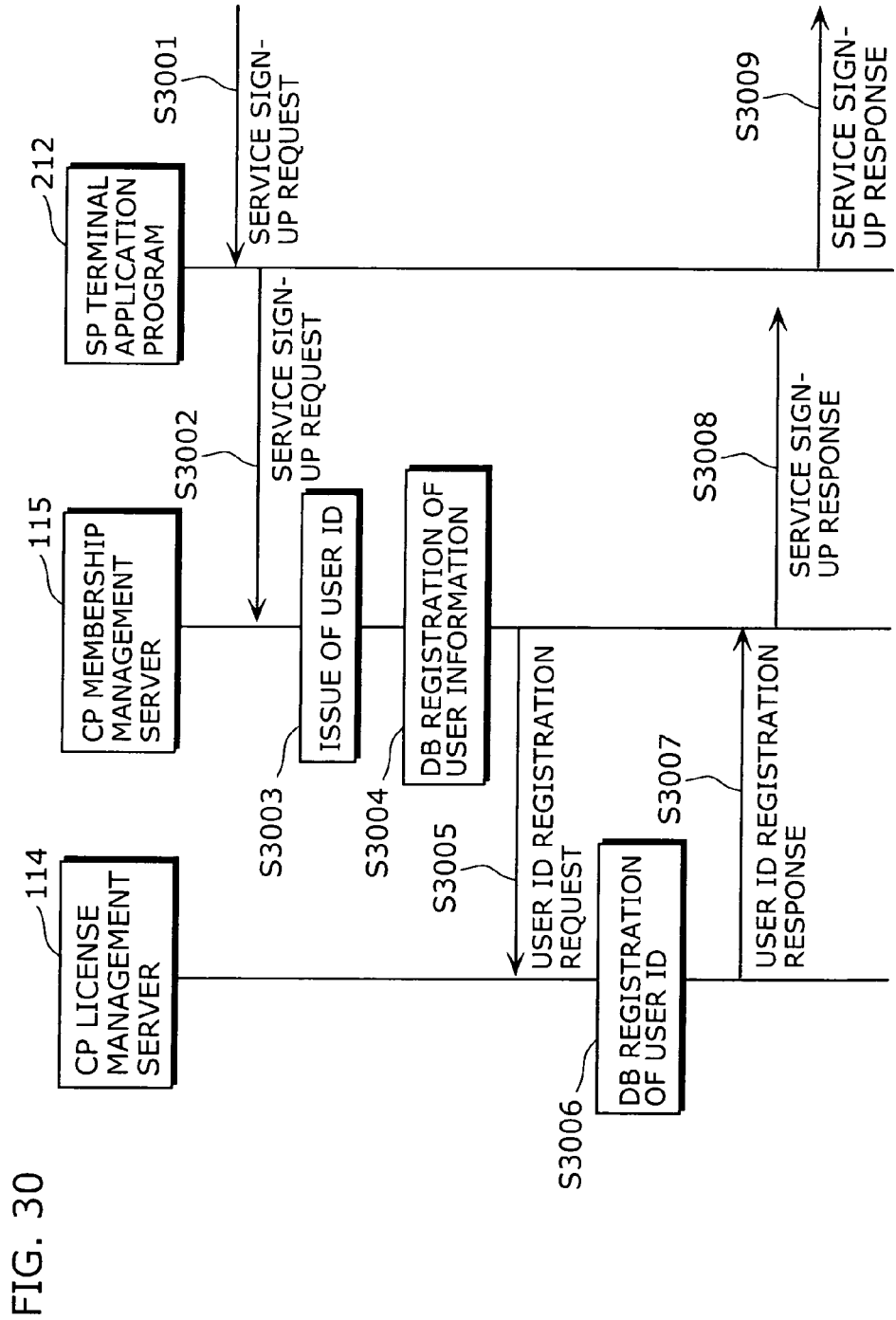
FIG. 30 is a sequence diagram for a communication procedure of service sign-up processing performed between the service provider and the content provider.

FIG. 30 is a sequence diagram for the service sign-up processing performed between the content provider 11 and the service provider 21. As shown in FIG. 30, the present processing is carried out by the CP license management server 114, the CP membership management server 115, and the SP terminal application program 212. It should be noted that the service sign-up described here refers to a sign-up which the service provider 21 places for the service provided by the content provider 11. A detailed explanation is given as follows.

The SP terminal application program 212 accesses a home page or the like of the CP membership management server 115 designated by the user and receives user information, such as an account ID, a password, and a name and an address of the service provider, that is required for the service sign-up (S3001). After this, the SP terminal application program 212 sends a service sign-up request S3002 including the entered user information to the CP membership management server 115. Receiving the service sign-up request (53002), the CP membership management server 115 issues the user ID uniquely identifying the service provider 21 (S3003) and records the issued user ID into the DB in association with the received user information (S3004). After completing the recording into the DB, the CP membership management server 115 requests the CP license management server 114 to register the issued user ID into the DB (S3005). Receiving the user ID registration request S3005, the CP license management server 114 records the specified user ID into the DB (S3006) and returns a user ID registration response S3007 including the result to the CP membership management server 115. After obtaining the user ID registration response S3007, the CP membership management server 115 sends a service sign-up response S3008 including the user ID to the SP terminal application program 212. Receiving the service sign-up response S3008, the SP terminal application program 212 shows the result of the service sign-up to the user (S3009).

(Sequence of License Contract Processing)

Figure 31:
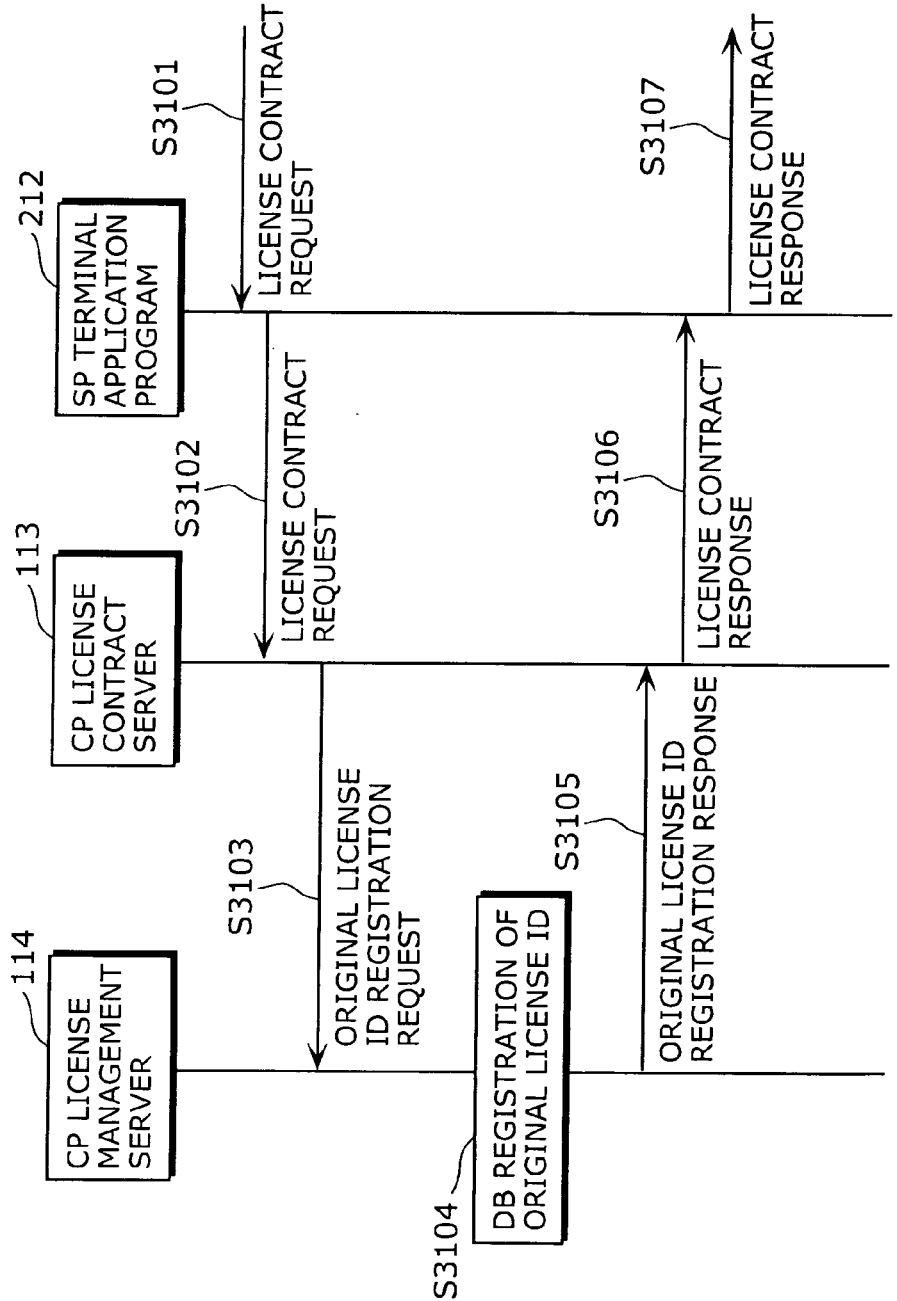
FIG. 31 is a sequence diagram for license contract processing.

FIG. 31 is a sequence diagram for the license contract processing performed between the content provider 11 and the service provider 21. As shown in FIG. 31, the present processing is carried out by the CP license contract server 113, the CP license management server 114, and the SP terminal application program 212. It should be noted that the license contract described here refers to a contract which is placed by the service provider 21 for an original license provided by the content provider 11. A detailed explanation is given as follows.

The SP terminal application program 212 accesses a home page or the like of the CP license contract server 113 designated by the user and receives a user ID and an original license ID which are required to place a license contract of the original license (S3101). Following this, the SP terminal application program 212 sends a license contract request S3102 including the entered user ID and original license ID to the CP license contract server 113. Receiving the license contract request S3102, the CP license contract server 113 requests the CP license management server 114 to register the original license ID specified corresponding to the user ID included in the present request (S3103). In accordance with the original license ID registration request S3103, the CP license management server 114 records the original license ID into the DB in association with the user ID (S3104). After completing the recording into the DB, the CP license management server 114 returns an original license ID registration response S3105 including the result to the CP license contract server 113. Obtaining the original license ID registration response S3105, the CP license contract server 113 sends the SP terminal application program 212 a license contract response S3106 including information regarding the CP license management server 114 from which the original license is obtained. Receiving the license contract response S3106, the SP terminal application program 212 shows the result of the license contract to the user (S3107).

Although the billing processing for the license contract is not described in the present embodiment, the billing processing may be performed for the license contract.

(Sequence of Original License Obtainment Processing)

Figure 32:
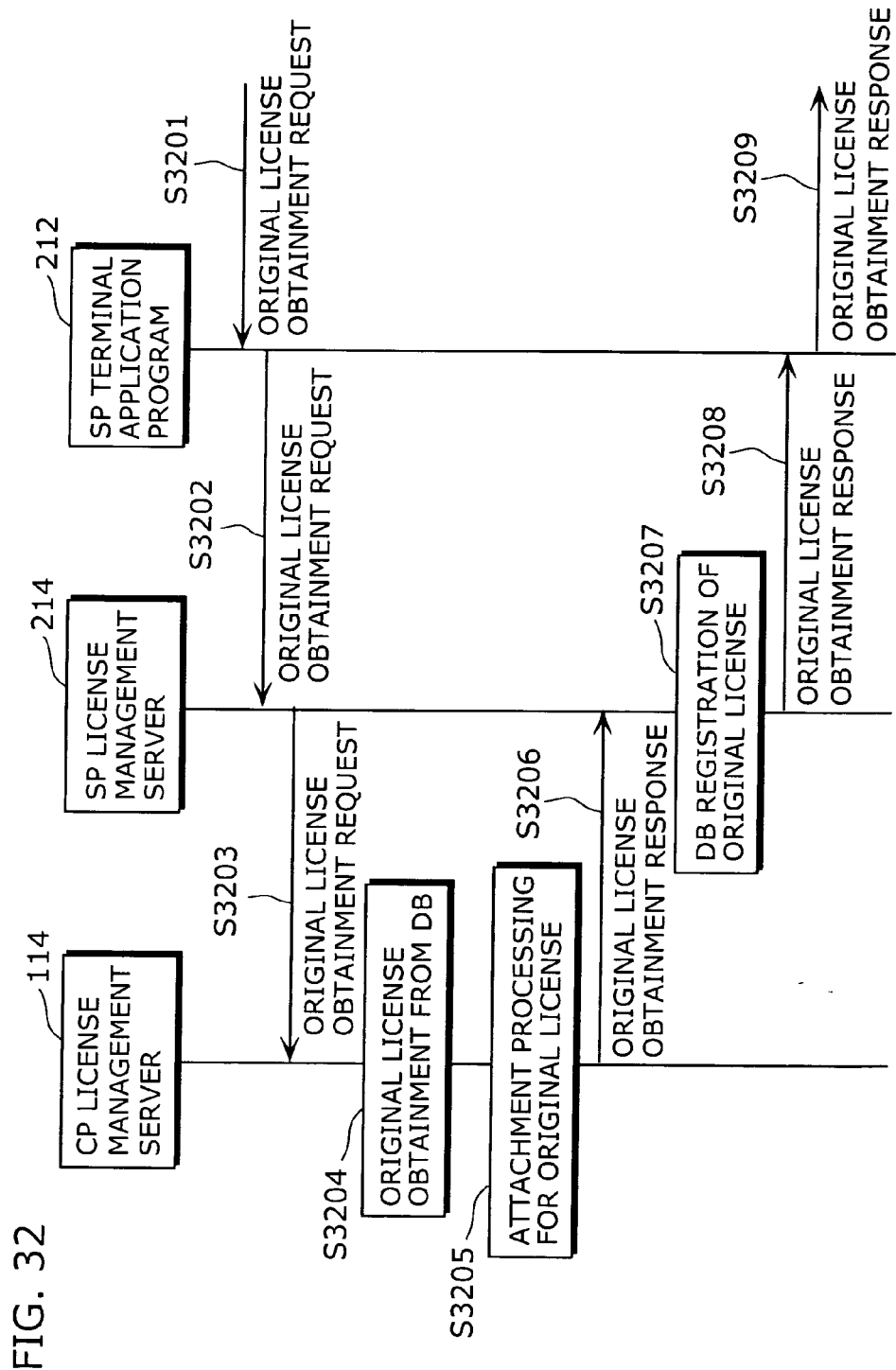
FIG. 32 is a sequence diagram for original license obtainment processing.

FIG. 32 is a sequence diagram for the original license obtainment processing performed between the content provider 11 and the service provider 21. As shown in FIG. 32, the present processing is carried out by the CP license management server 114, the SP terminal application program 212, and the SP license management server 214. It should be noted that the original license obtainment described here means that the service provider 21 obtains the original license, for which the contract was placed in the above license contract processing, from the content provider 11. A detailed explanation is given as follows.

Figure 33:
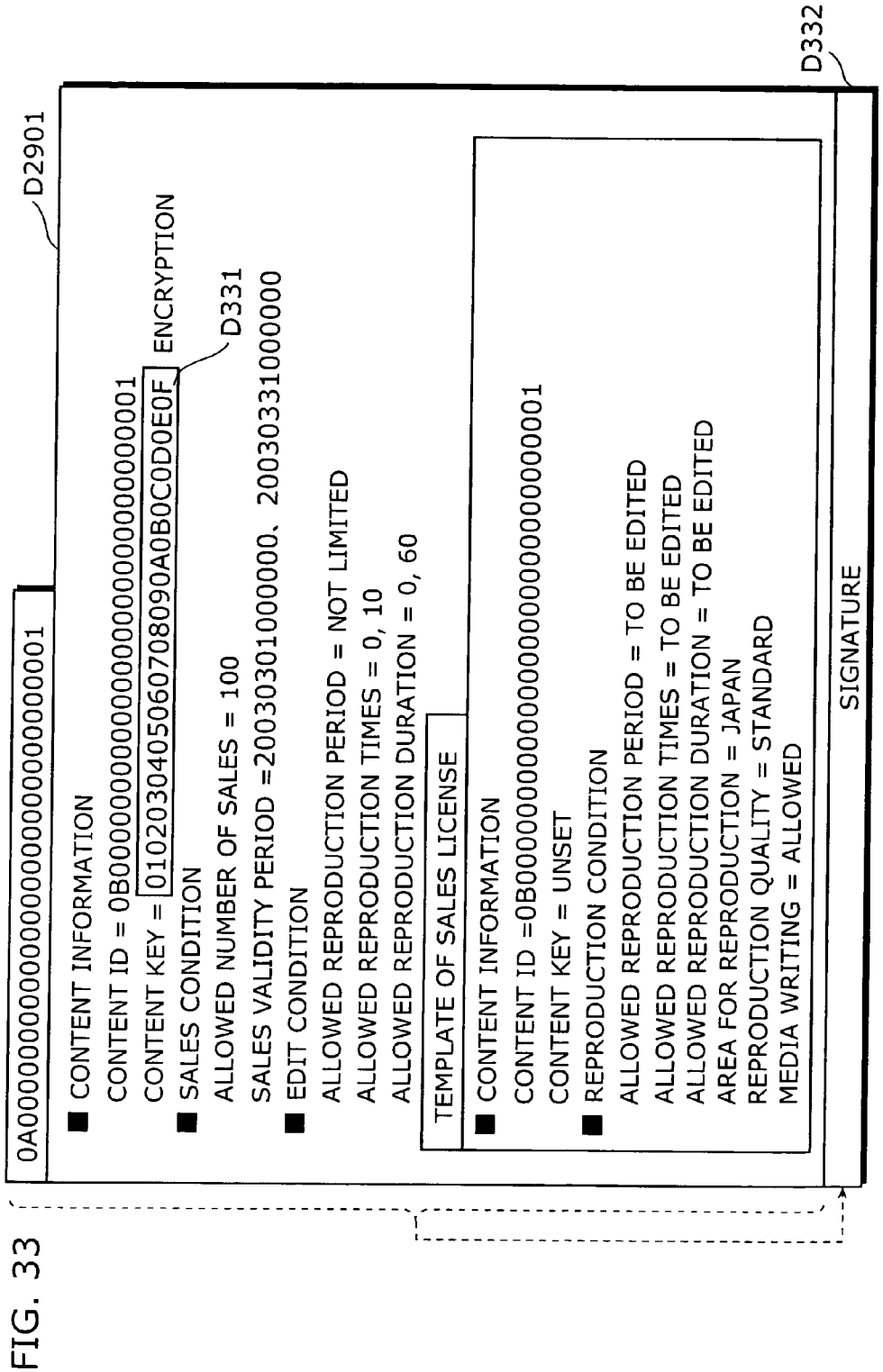
FIG. 33 is a diagram showing a data structure of the original license after the license processing shown in FIG. 32 was performed.

The SP terminal application program 212 receives, from the user, a user ID, an ID of an original license desired to be obtained, and information regarding the CP license management server 114 from which the original license is to be obtained (S3201). Following this, the SP terminal application program 212 sends an original license obtainment request S3202 including the entered user ID, original license ID, and information regarding the CP license management server 114 to the SP license management server 214. Receiving the original license obtainment request S3202, the SP license management server 214 sends an original license obtainment request S3203 including the user ID and the original license ID to the specified CP license management server 114. Receiving the original license obtainment request S3203, the CP license management server 114 checks to see whether or not the appropriate original license ID is registered in the DB in association with the specified user ID and, when it is registered, obtains data of the original license corresponding to the original license ID from the DB (S3204). When it is not registered, the CP license management server 114 sends an original license obtainment response S3206 which includes information indicating that it is not to the SP license management server 214. FIG. 33 is a diagram showing a data structure of the original license after the license processing shown in FIG. 32 was performed. As shown in FIG. 33, after the data of the original license is obtained from the DB, the part of the content key of the present original license data is encrypted using an encryption key that only the content key insertion processing unit 2144 of the SP license management server 214 can decrypt (D331), and signature data D332 of the CP license management server 114 is attached to the entire data of the original license (S3205). Following this, an original license obtainment response S3206, which includes the original license on which the attachment processing of S3205 was performed and the information regarding the CP content management server 116 from which the encrypted content is obtained, is sent to the CP license management server 214. Receiving the original license obtainment response S3206, the SP license management server 214 checks on the signature attached to the original license data and records the original license into the DB in association with the original license ID. After completing the recording into the DB, an original license obtainment response S3208 including the result of the original license obtainment processing is returned to the SP terminal application program 212. Receiving the original license obtainment response S3208, the SP terminal application program 212 shows the result of the original license obtainment processing to the user (S3209).

(Sequence of Encrypted Content Obtainment Processing)

Figure 34:
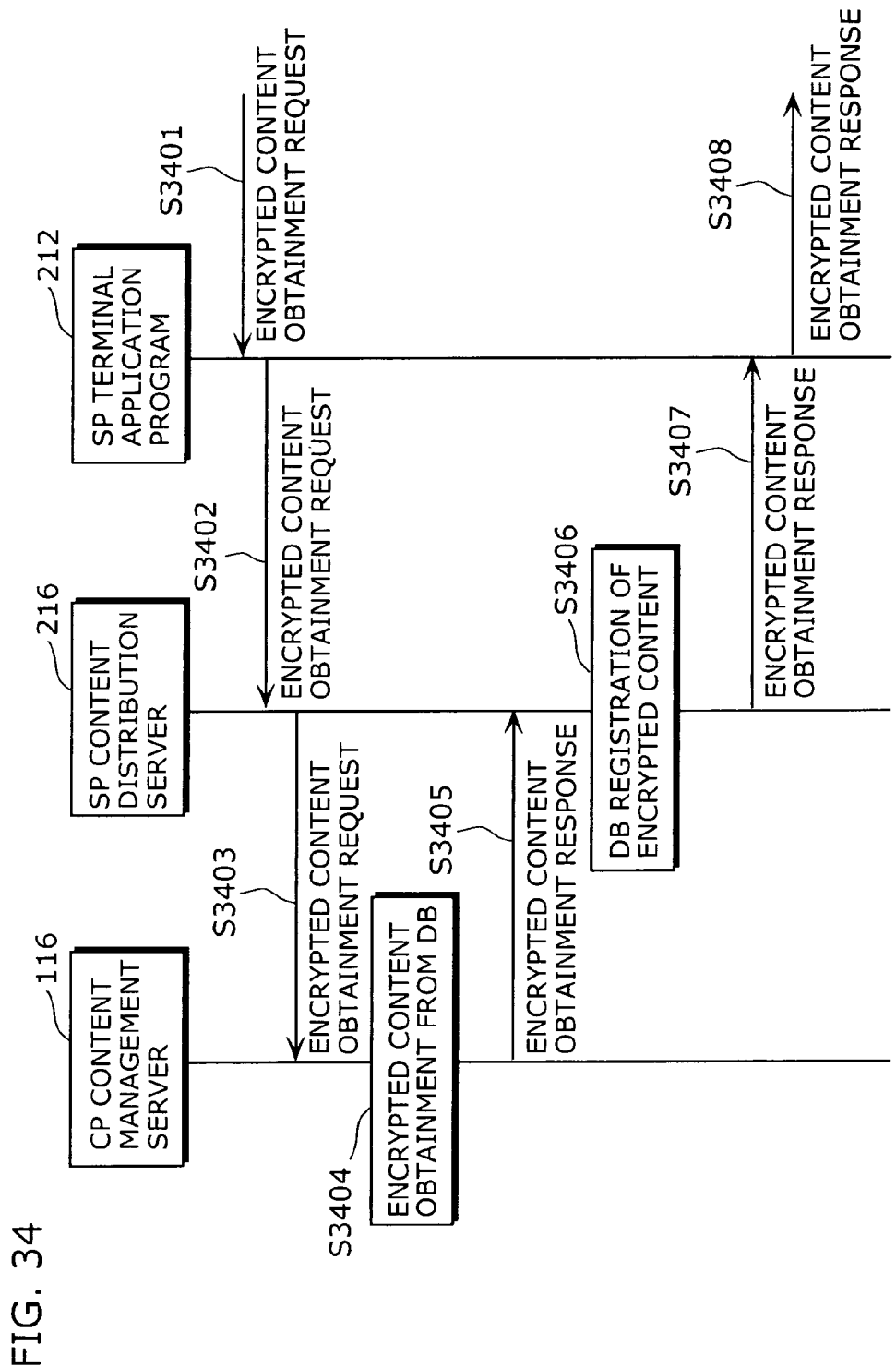
FIG. 34 is a sequence diagram for encrypted content obtainment processing.

FIG. 34 is a sequence diagram for the encrypted content obtainment processing performed between the content provider 11 and the service provider 21. As shown in FIG. 34, the present processing is carried out by the CP content management server 116, the SP terminal application program 212, and the SP content distribution server 216. It should be noted the encrypted content obtainment described here indicates that the service provider 21 obtains the encrypted content, from the content provider 11, corresponding to the original license obtained in the above original license obtainment processing. A detailed explanation is given as follows.

From the user, the SP terminal application program 212 receives an ID of the encrypted content which is to be obtained and information regarding the CP content management server 116 from which the encrypted content is to be obtained (S3401). After this, the SP terminal application program 212 sends an encrypted content obtainment request S3402 including the entered content ID and the information of the CP content management server 116 to the SP content distribution server 216. Receiving the encrypted content obtainment request S3402, the SP content distribution server 216 sends an encrypted content obtainment request S3403 including the content ID to the designated CP content management server 116. Receiving the encrypted content obtainment request S3403, the CP content management server 116 obtains data of the encrypted content and meta information corresponding to the content ID (S3404). Following this, the CP content management server 116 sends an encrypted content obtainment response S3405 including the obtained encrypted content data and meta information to the SP content distribution server 216. Receiving the encrypted content obtainment response S3405, the SP content distribution server 216 records the encrypted content data and meta information into the DB in association the content ID (S3406). After completing the recording into the DB, the SP content distribution server 216 sends an encrypted content obtainment response S3407 including the result of the encrypted content obtainment processing to the SP terminal application program 212. Receiving the encrypted content obtainment response S3407, the SP terminal application program 212 shows the result of the encrypted content obtainment processing to the user (S3408).

(Sequence of Original License Information Reference Processing)

Figure 35:
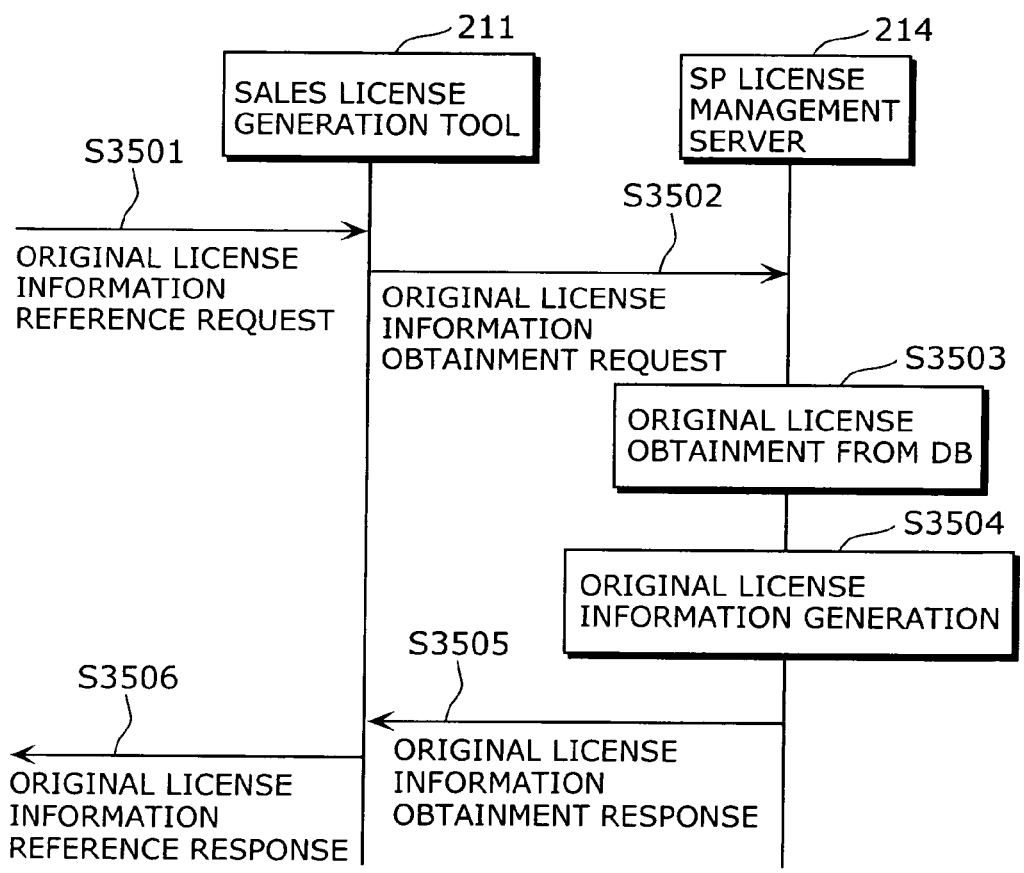
FIG. 35 is a sequence diagram for original license information reference processing.
Figure 36:
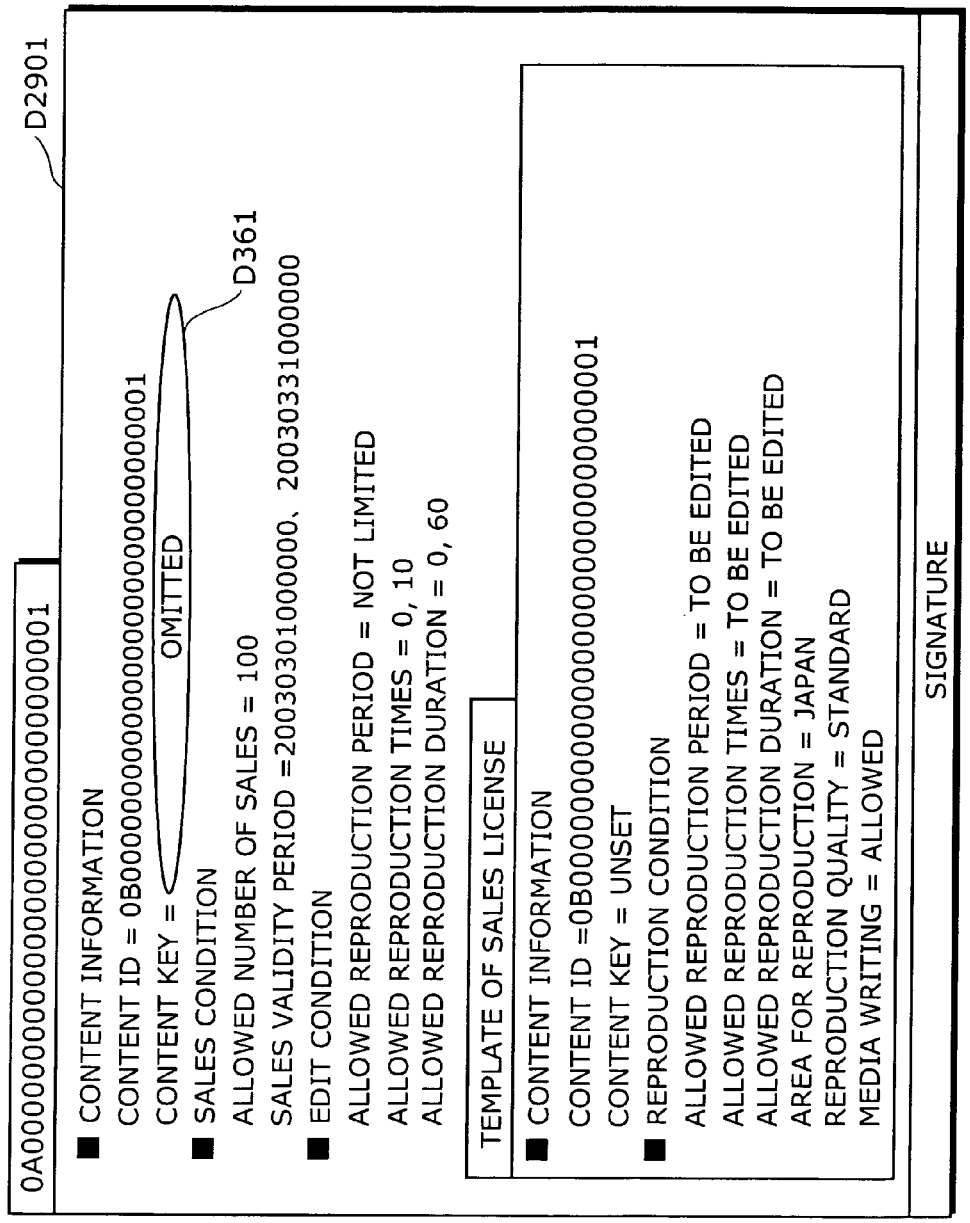
FIG. 36 is a diagram showing a data structure of original license information.

FIG. 35 is a sequence diagram for the original license information reference processing performed by the service provider 21. As shown in FIG. 35, the present processing is carried out by the sales license generation tool 211 and the SP license management server 214. FIG. 36 is a diagram showing a data structure of original license information. It should be noted that the original license information described here refers to an original license in which the part of the content key is omitted (D361) from the original license shown in FIG. 33. A detailed explanation is given as follows.

The sales license generation tool 211 receives, from the user, an ID of the original license to be referenced (S3501). Following this, the sales license generation tool 211 sends an original license information obtainment request S3502 including the original license ID to the SP license management server 214. Receiving the original license information obtainment request S3502, the SP license management server 214 obtains data of the original license corresponding to the original license ID from the DB (S3503). After the obtainment, the SP license management server 214 deletes the part of the content key to generate the original license information (S3504). Then, the SP license management server 214 sends an original license information obtainment response S3505 including the generated original license information to the sales license generation tool 211. FIG. 37 shows an entry screen of the sales license generation tool shown in FIG. 2. Receiving the original license information obtainment response S3503, the sales license generation tool 211 generates a screen as shown in FIG. 37 on the basis of the obtained original license information and presents it to the user (S3506).

(Sequence of Sales License Generation Processing)

Figure 38:
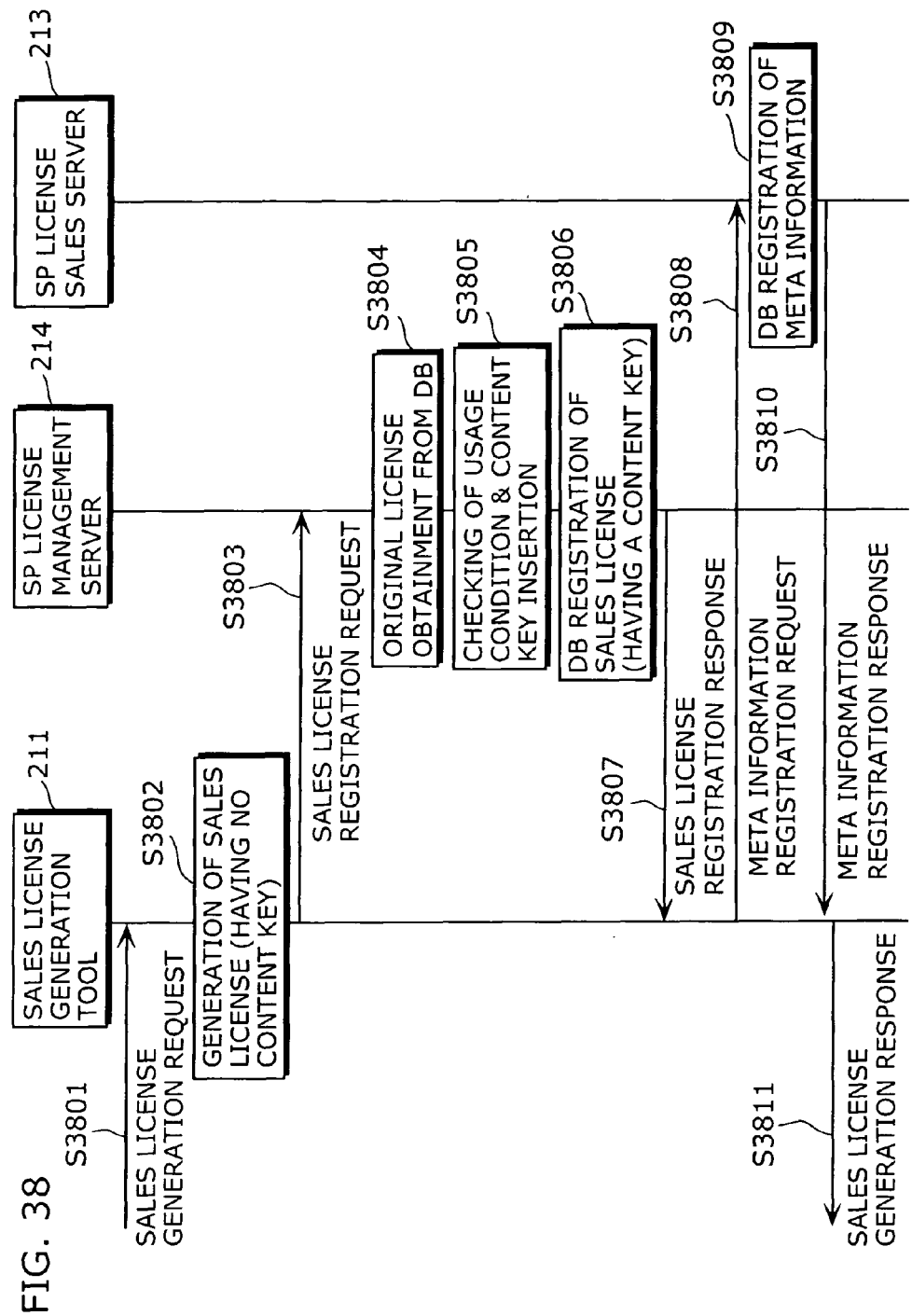
FIG. 38 is a sequence diagram for sales license generation processing.
Figure 40:
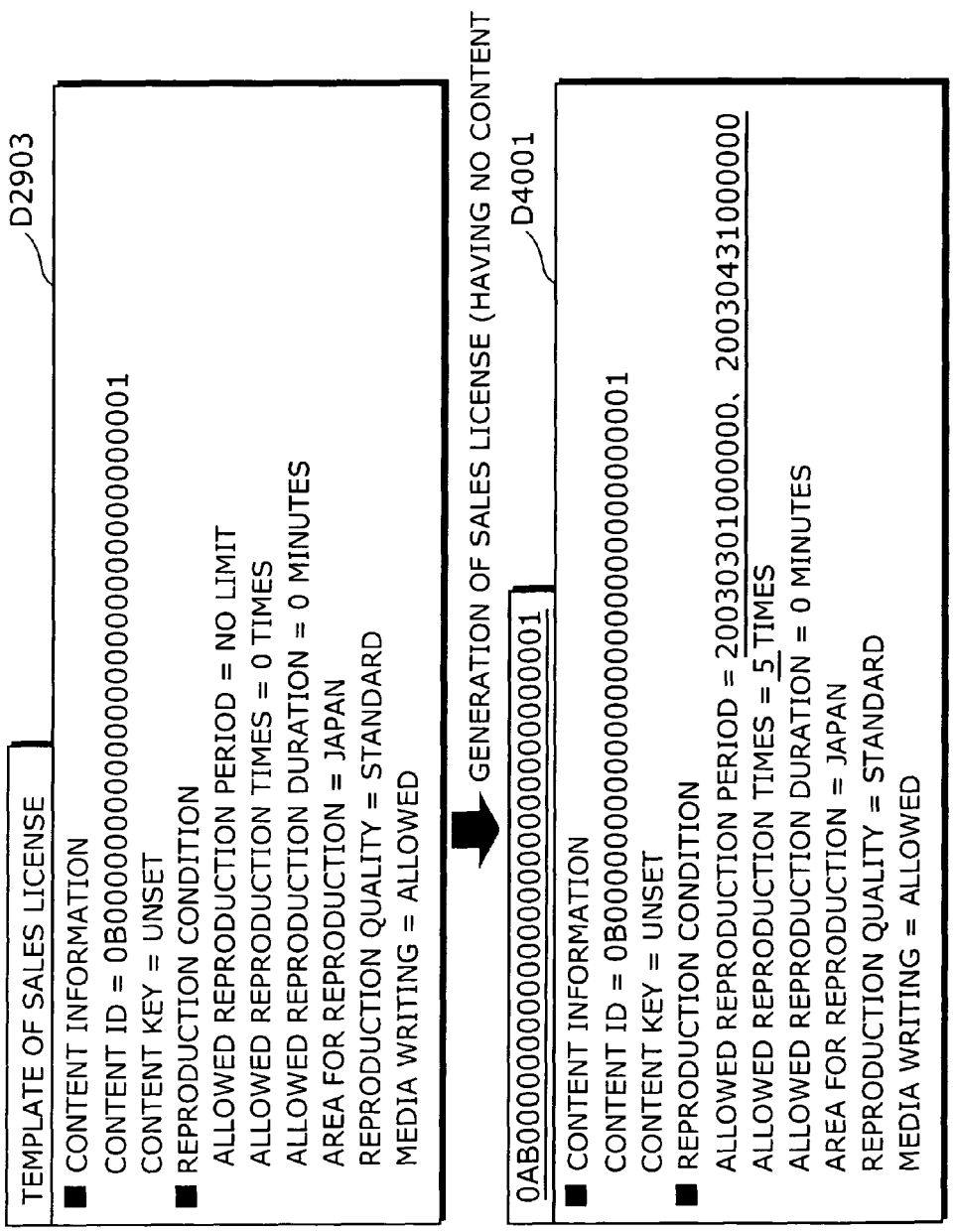
FIG. 40 is a diagram showing a data structure of a sales license (having no content key).

FIG. 38 is a sequence diagram for the sales license generation processing performed by the service provider 21. As shown in FIG. 38, the present processing is carried out by the sales license generation tool 211, the SP license sales server 213, and the SP license management server 214. FIG. 39 is a diagram showing a screen in which the edit condition is inputted in the entry screen of the sales license generation tool shown in FIG. 2. FIG. 40 is a diagram showing a data structure of the sales license (having no content key). A detailed explanation is given as follows.

Figure 41:
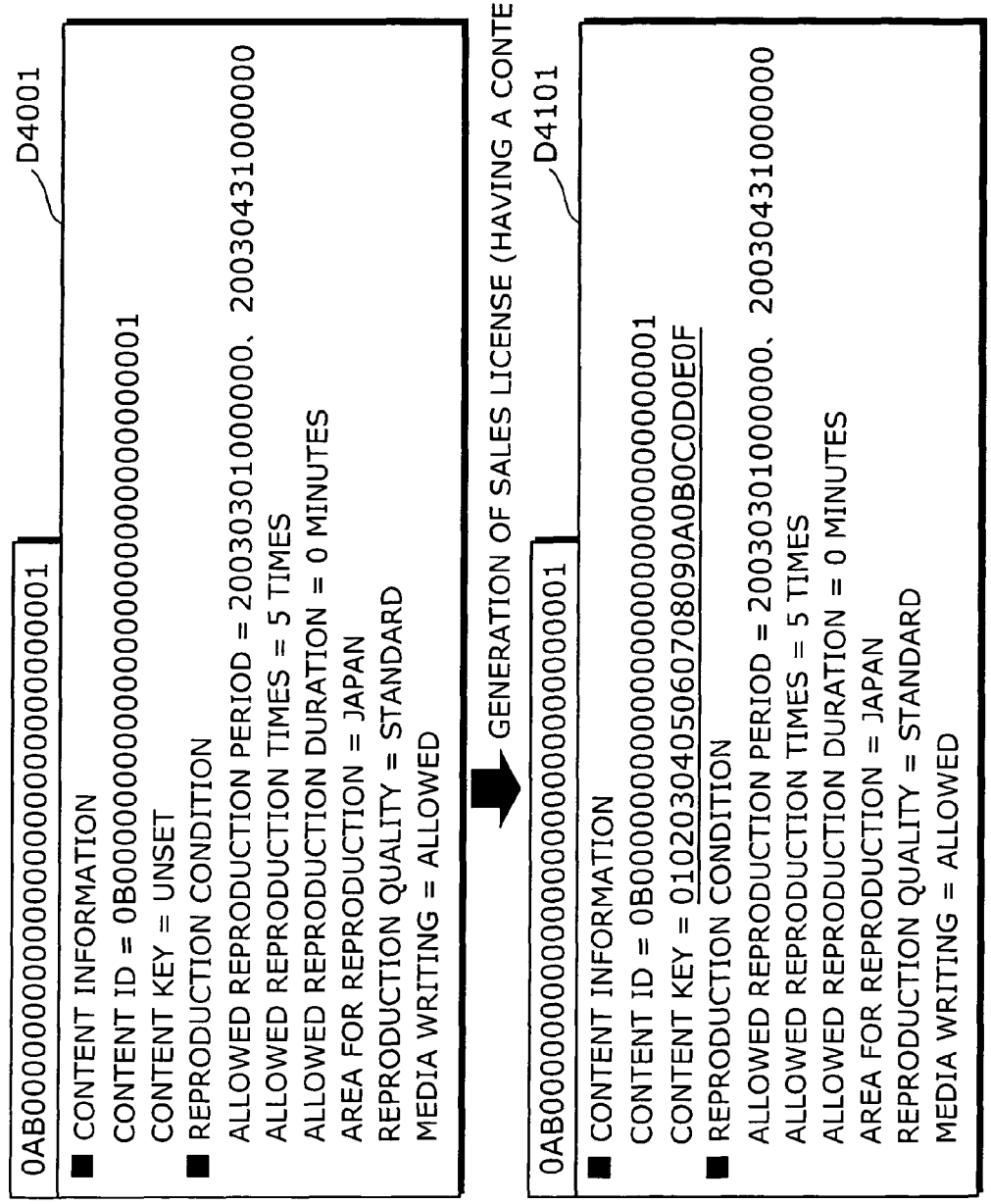
FIG. 41 is a diagram showing a data structure of a sales license (having a content key).

The user of the sales license generation tool 211 enters the edit condition of the sales license on the screen in FIG. 37 that is obtained after the execution of the above original license information obtainment processing, as shown by D3901 to D3904 in FIG. 39, and presses a sales license generation button D3905 (S3801). As shown in FIG. 40, the sales license generation tool 211 edits the template of the sales license included in the original license in accordance with the entered edit condition to generate a sales license (having no content key) that includes no content key (S3802). Then, the sales license generation tool 211 sends the SP license management server 214 a sales license registration request S3803 including the generated sales license (having no content key) and the ID of the original license based on which the present sales license (having no content key) was generated. Receiving the sales license registration request S3803, the SP license management server 214 obtains data of the original license corresponding to the received original license ID from the DB (S3804). Then, the SP license management server 214 compares the sales condition of the received sales license (having no content key) with the edit condition of the original license obtained from the DB and judges whether or not the usage condition is within the range of the edit condition. FIG. 41 is a diagram showing a data structure of the sales license (having a content key). Here, when it is within the range of the edit condition, the SP license management server 214 inserts the content key of the original license into the sales license (having no content key) to edit it into a sales license (having a content key) that includes a content key (S3805). Following this, the SP license management server 214 registers the generated sales license (having a content key) into the DB (S3806) and returns a sales license registration response S3807 that includes information showing a normal termination to the sales license generation tool 211. On the other hand, when it is not within the range of the edit condition, the SP license management server 214 returns a sales license registration response S3807 that includes information showing an abnormal termination to the sales license generation tool 211. Receiving the sales license registration response S3807 showing the normal termination, the sales license generation tool 211 requests the SP license sales server 213 to register the sales license ID and the meta information such as the usage condition (S3808). Receiving the meta information registration request S3808, the SP license sales server 213 records the meta information into the DB in association with the sales license ID (S3809). After completing the recording into the DB, the SP license sales server 213 returns a meta information registration response S3810 to the sales license generation tool 211. Receiving the meta information registration response S3810, the sales license generation tool 211 presents information showing the result of the sales license generation processing to the user (S3811)

As described so far, according to the present B2B2C system, unless the usage condition of the sales license that is to be sold to the end user 31 by the service provider 21 complies with the range of the edit condition of the original license set by the content provider 11, the sales license having the content key cannot be generated. To be more specific, using the present invention, it becomes possible for the content provider 11 to control the usage condition of the sales license generated by the service provider 21.

Figure 42:
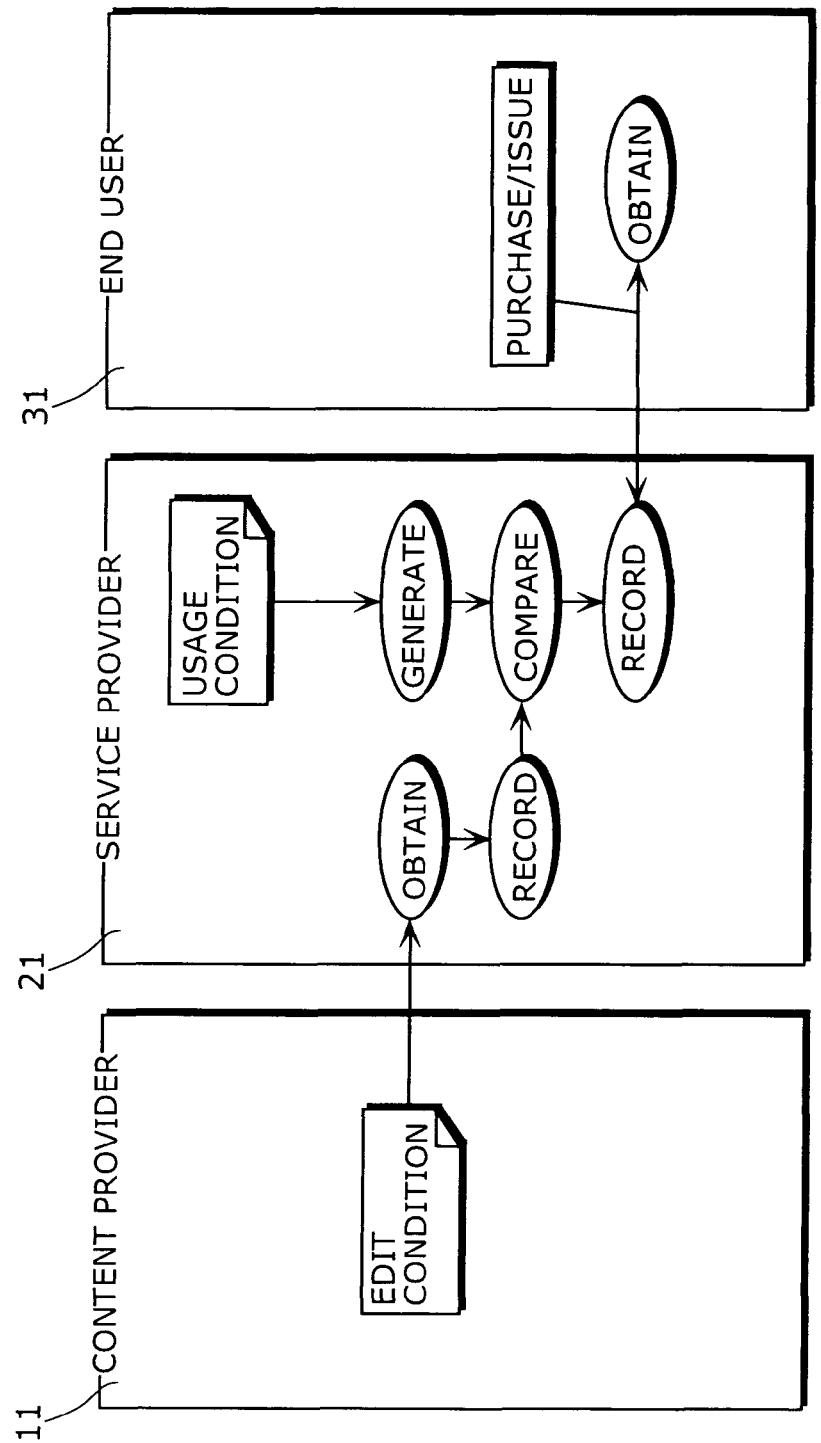
FIG. 42 is a diagram showing timing in comparing the usage condition and the edit condition.
Figure 43:
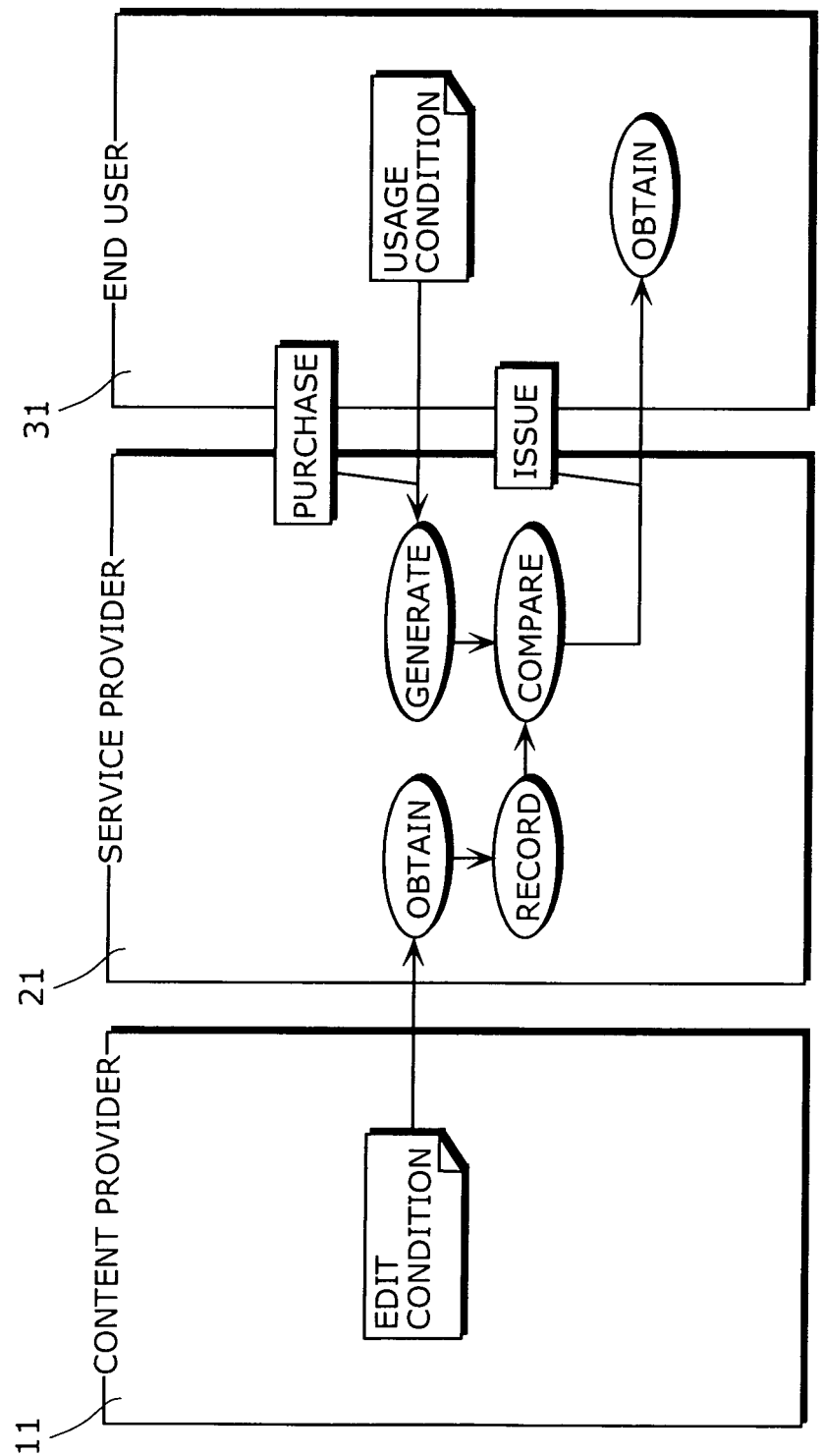
FIG. 43 is a diagram showing a case where the timing in comparing the usage condition and the edit condition is when the sales license is issued.

FIG. 42 is a diagram showing timing in comparing the usage condition and the edit condition. FIG. 43 is a diagram showing a case where the timing in comparing the usage condition and the edit condition is when the sales license is issued. In the present embodiment of the present invention, an example has been described for a case where the usage condition of the sales license to be sold and issued to the end user 31 is designated and set by the service provider 21 in advance of sale, as shown in FIG. 42. However, note that the case is not limited to this and the usage condition may be designated and set by the end user 31 at the point of sale as shown in FIG. 43.

In the embodiment of the present invention, an example has been described for a case where the comparison-judgment processing performed on the usage condition of the sales license and the edit condition of the original license is carried out in the subsystem of the service provider 21 when the sales license is registered into the database, as shown in FIG. 42. However, the case is not limited to this and the processing may be performed when the sales license is issued to the terminal device of the end user 31.

Figure 44:
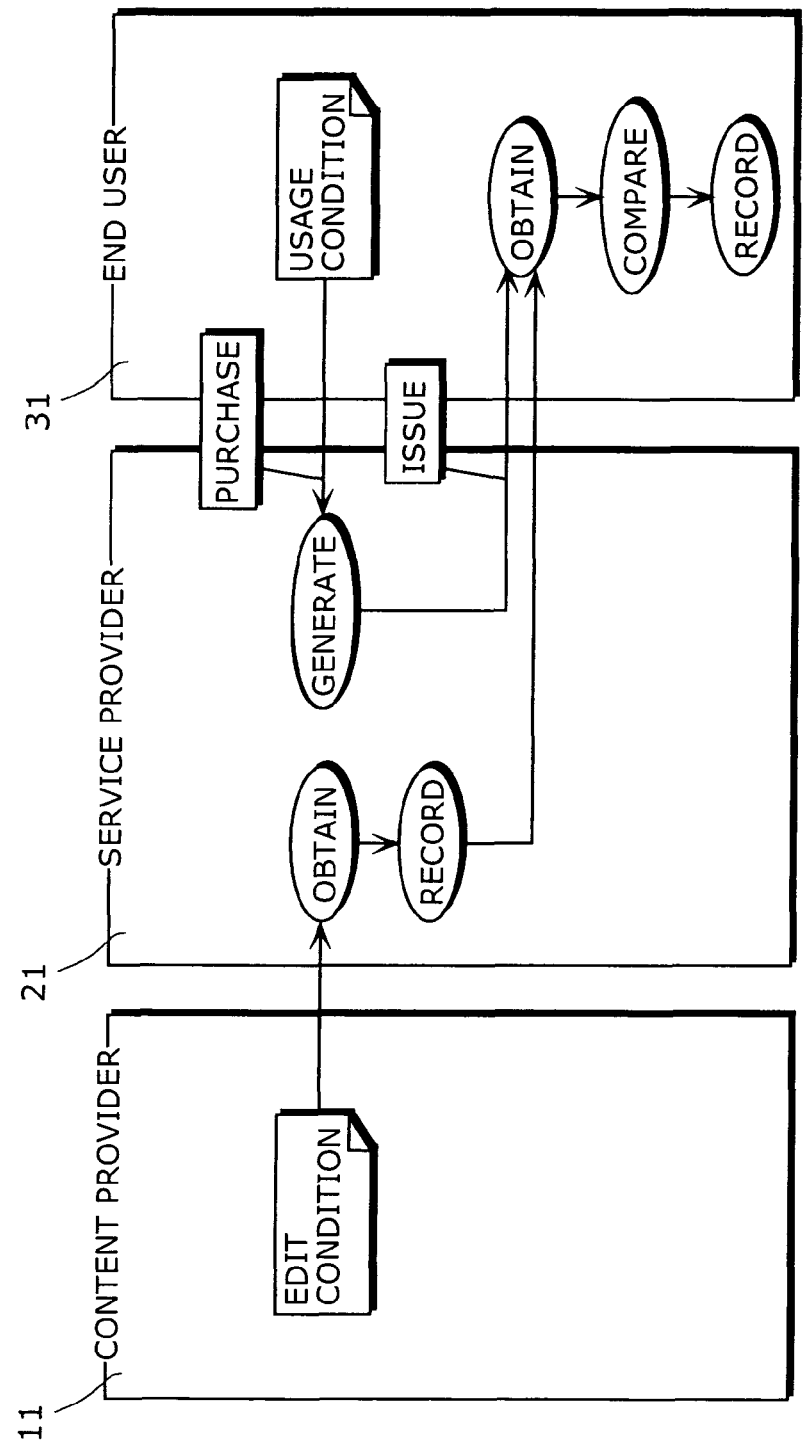
FIG. 44 is a diagram showing a case where the timing in comparing the usage condition and the edit condition is when the sales license is received.
Figure 45:
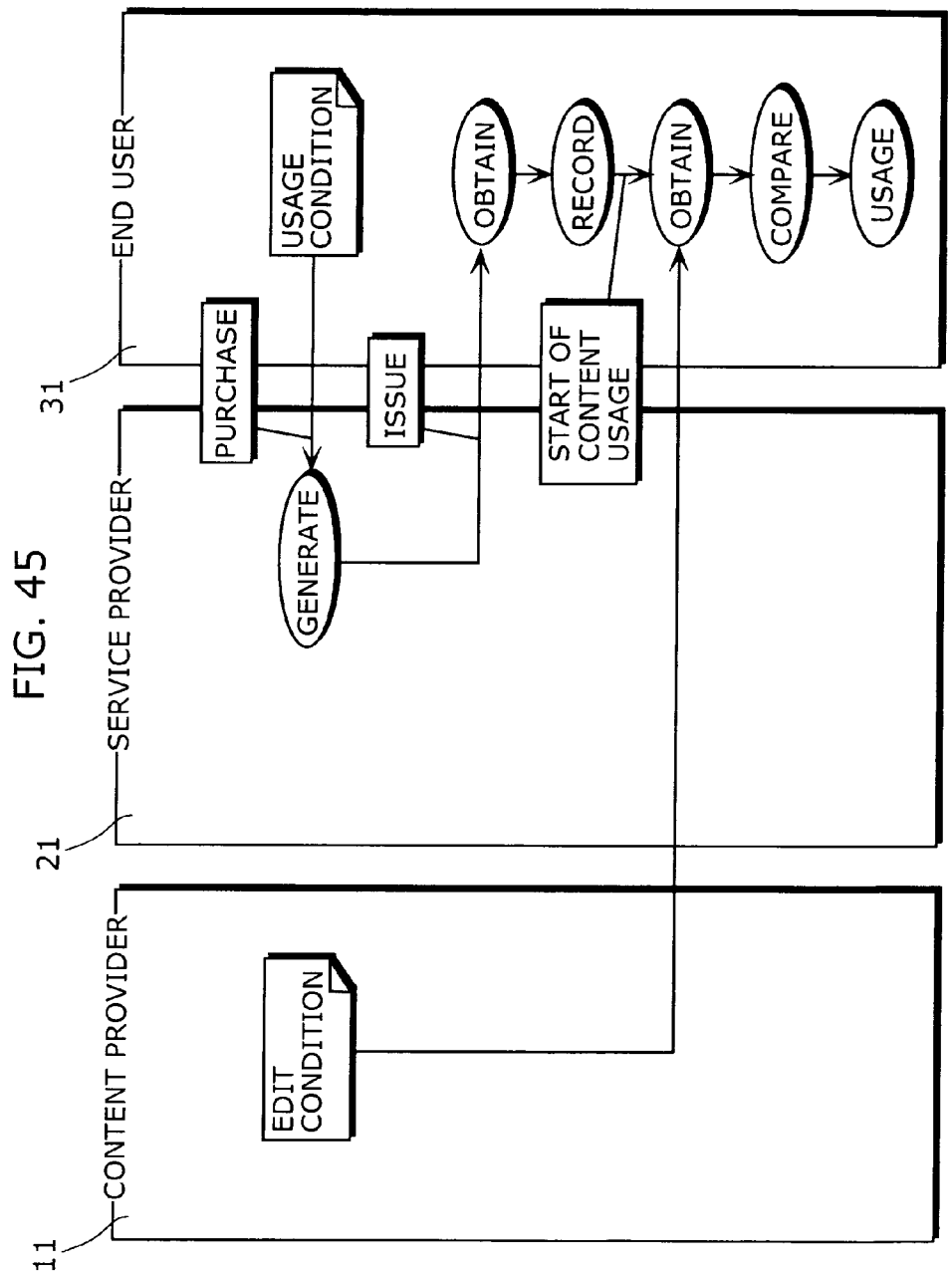
FIG. 45 is a diagram showing a case where the timing in comparing the usage condition and the edit condition is when the content is used.

FIG. 44 is a diagram showing a case where the timing in comparing the usage condition and the edit condition is when the sales license is received. FIG. 45 is a diagram showing a case where the timing in comparing the usage condition and the edit condition is when the content is used. The comparison-judgment processing is not limited to being performed in the subsystem of the service provider 21. As shown in FIGS. 44 and 45, the edit condition may be obtained from the subsystem of the service provider 21 or the content provider 11, and the processing may be performed by the terminal device of the end user 31 when the sales license is received or when the content is used.

Moreover, in the embodiment of the present invention, an example has been described for a case where the subsystem of the service provider 21 temporarily obtains the content key as data included in the original license from the subsystem of the content provider 11, then distributes the content key to the terminal of the end user 31 by including it in the sales license. However, the case is not limited to this, and the subsystem of the content provider 11 may distribute it to the terminal of the end user 31.

Furthermore, in the embodiment of the present invention, an example has been described for a case where the subsystem of the service provider 21 temporarily obtains the encrypted content from the subsystem of the content provider 11, then distributes it to the terminal of the end user 31. However, the case is not limited to this, and the subsystem of the content provider 11 may distribute it to the terminal of the end user 31.

(Case Where Edit Condition and Sales Condition are Tied)

Figure 46:
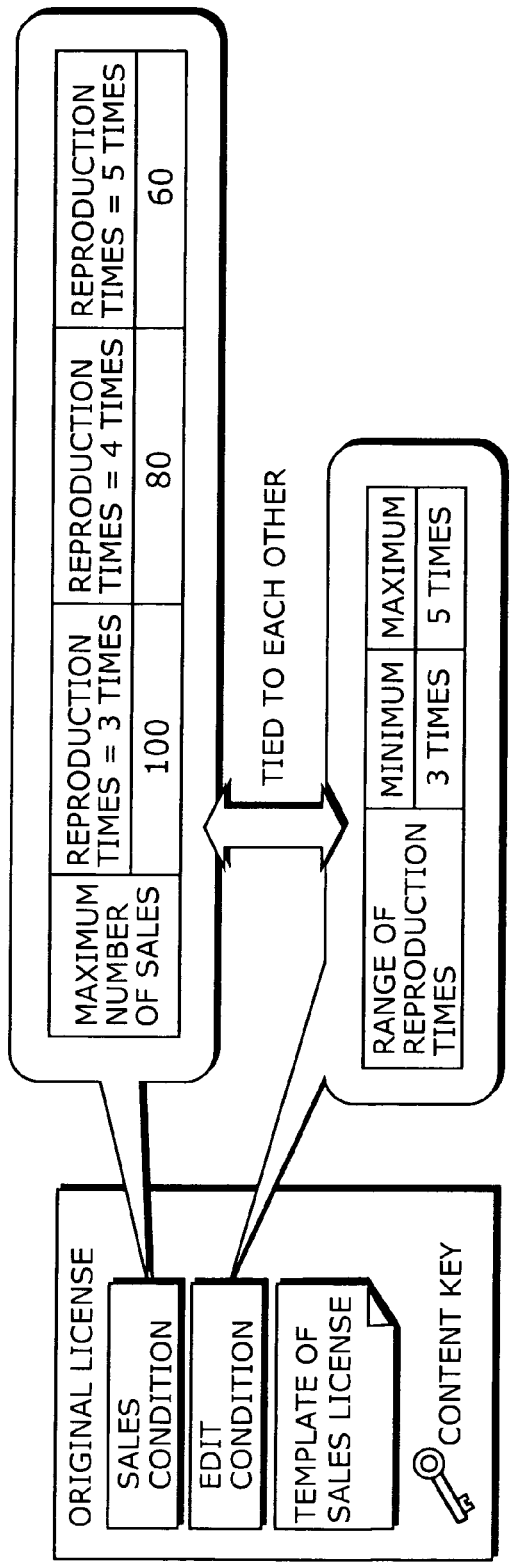
FIG. 46 is a diagram showing an example of a case where the number of sales licenses is limited in accordance with the edit result of the sales license.

In the above embodiment, the sales license is created on the basis of the edit condition, and the sale of the license is only limited under the common sales condition that all the sales licenses have to follow regardless of the edit condition. However, the present invention is not limited to this. FIG. 46 is a diagram showing an example of a case where the number of sales licenses is limited in accordance with the edit result of the sales license. As shown in this diagram, the editable usage condition and the maximum number of sales of the sales license corresponding to the present edit result are described as the sales condition of the original license. To be more specific: when the number of reproduction times after the edit is three, the licenses up to and including 100 can be sold; when the number of reproduction times after the edit is four, the licenses up to and including 80 can be sold; and the number of reproductions times after the edit is five, the licenses up to and including 60 can be sold. As the edit condition, the range of the editable usage condition, that is, the range of the number of reproduction times, is described to be editable between three times at the minimum and five times at the maximum. Thus, when the SP license management server 214 edits the number of reproduction times of the sales license as four times, for example, the allowed number of sales of the license is up to and including 80. The control unit 2134 of the SP license sales server 213 receives a notification of the sales condition and the edited condition of the generated sales license as shown in FIG. 46 from the sales license generation tool 211. The control unit 2134 of the SP license sales server 213 counts the number of sales every time the present sales license is sold and, when the number reaches the number of sales corresponding to the notified usage condition, terminates the sale of the sales license. It should be noted that, as a sales method of the sales license in this case, the SP license sales server 213 does not sell the license by receiving designation of the number of reproduction times as a usage condition from the end user, but sells a license whose number of reproduction times is uniform (three times, for example). An example has been described here for a case where the service provider 21 selects only one number of content reproduction times from the range shown as the edit condition and sells the end user 31 the sales license up to the number corresponding to the selected reproduction times. However, a sales method like this should be established through a contract between the content provider 11 and the service provider 21, and is not always limited to the example described here. For instance, it should be understood that the SP license management server 214 may sell the sales licenses whose respective allowed numbers of reproduction times are three, four, and five, with their number of sales respectively being up to 100, 80, and 60 which amounts to a total of 240 licenses. Moreover, in this case, the number of reproduction times can be designated by the end user 31 and the sales licenses corresponding to the designated number of reproduction times can be sold. Furthermore, when the number of sales licenses corresponding to the designated number has reached its maximum number of sales, the terminal device of the end user 31 may be informed so and the sales licenses that have not reached their maximum number of sales may be sold.

(Data Structure of Sales License in the Case of Double Checking)

Figure 47:
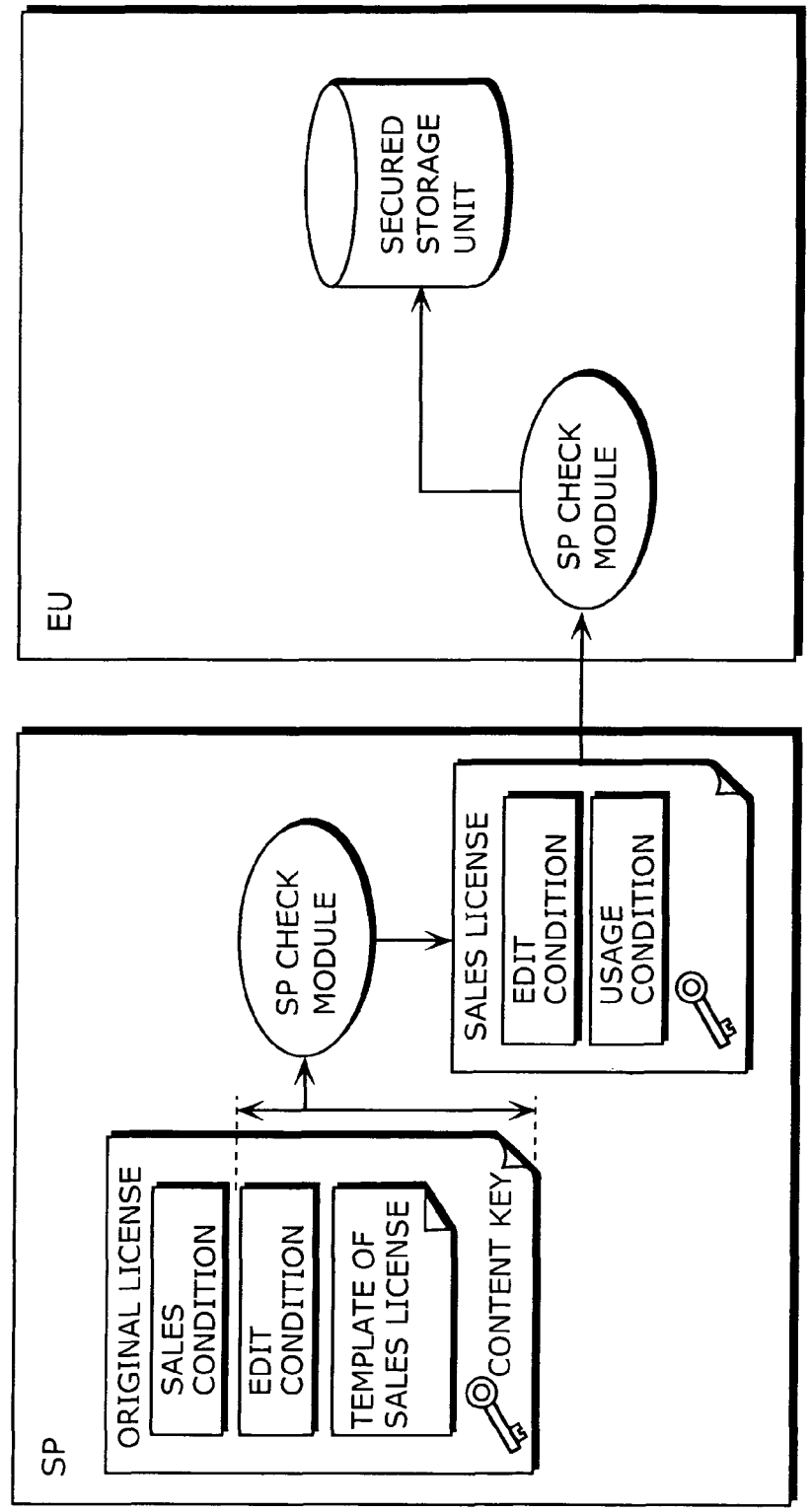
FIG. 47 is a diagram showing a data flow of a case where comparison-judgment processing is performed on the edit condition by both the SP and the EU.

In the above description, the comparison-judgment processing for the edit condition may be performed in the subsystem of the service provider 21 or may be performed by the terminal device of the end user 31 as shown in FIGS. 44 and 45. However, the case is not limited to that only one of the service provider 21 and the end user 31 performs the comparison-judgment processing. The processing may be performed by both the service provider 21 and the end user 31. FIG. 47 is a diagram showing a data flow of a case where the comparison-judgment processing is performed for the edit condition by both the SP and the EU. As shown in this diagram, in the case of the SP, the content key insertion processing unit 2144 serves as an SP check module, which compares the usage condition of the sales license (having no content key) received from the sales license generation tool 211 with the edit condition of the original license on which the sales license was based and judges whether or not the usage condition is within the range of the edit condition. Only when it is judged to be within the range of the edit condition, the content key included in the original license is inserted into the sales license (having no content key) so that a sales license (having a content key) is generated. In the above embodiment, the EU only uses the content by employing the sales license obtained from the SP. For this reason, the sales license to be generated did not need to include the edit condition. On the other hand, when the checking is conducted by both the SP check module and the terminal device of the EU, the edit condition is inserted into the sales license (having a content key) as shown in FIG. 47. The EU is composed of a check module which is a tamper resistant module provided by the CP. After obtaining the sales license from the SP, the check module of the EU compares the edit condition and the usage condition included in the sales license and judges whether or not the usage condition is within the range of the edit condition. As a result of the judgment, when the usage condition is within the range of the edit condition, the original license is stored into a secure storage unit. In other cases, the obtained original license is abandoned.

(Structure of EU Terminal Device Provided with a Function for Checking Sales License)

Figure 48:
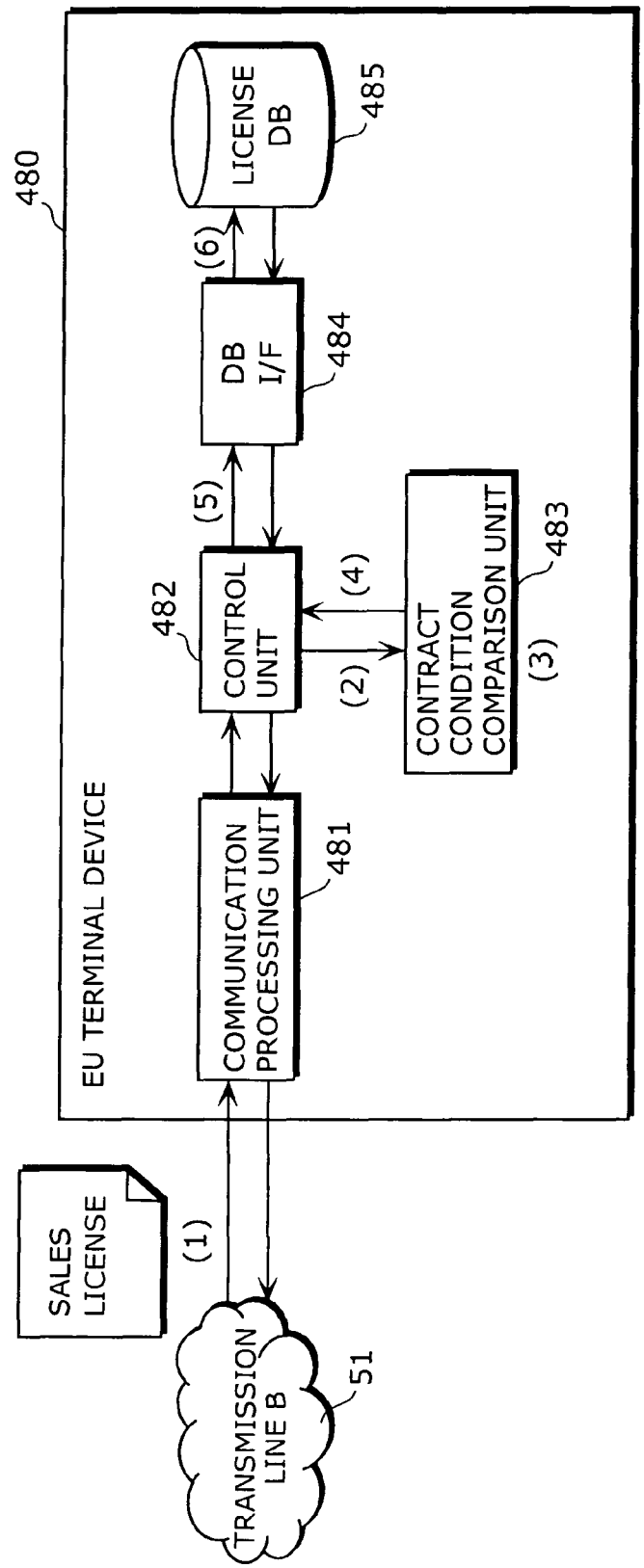
FIG. 48 is a block diagram showing a structure of a terminal device of the end user.

FIG. 48 is a block diagram showing the structure of an EU terminal device 480 that compares the edit condition and the usage condition included in the sales license in order to make a judgment. As shown in this diagram, the EU terminal device 480 is composed of a communication processing unit 481, a control unit 482, a contract condition comparison unit 483, a DB I/F 484, and a license DB 485. The communication processing unit 481 is a module which: transmits a license obtainment request from the user, that was received by a not-illustrated entry I/F, to the SP license management server 214 via the transmission line B51; and receives the appropriate sales license (having a content key) as a response. The control unit 482 is a module which controls the processing to be performed to compare the edit condition and the usage condition of the sales license received from the SP license management server 214. In accordance with the judgment result given by the contract condition comparison unit 483, the control unit 482 stores the sales license into the license DB 485 via the DB I/F 484 only when the usage condition of the sales license is within the range of the edit condition. In other cases, the received sales license is abandoned. The contract condition comparison unit 483 compares the edit condition and the usage condition of the received sales license to judge whether or not the usage condition is within the range of the edit condition, and notifies the control unit 482 of the judgment result. The DB I/F 484 is a module which stores/read data into/from the license DB 485 that is a secure storage unit. The DB I/F 484 stores the sales license obtained from the control unit 482 into the license DB 485. When the content is reproduced, the DB I/F 484 reads out the license stored in the license DB 485 and transmits it to the control unit 482 or a not-illustrated content reproduction unit, under the direction of the control unit 482.

Figure 49:
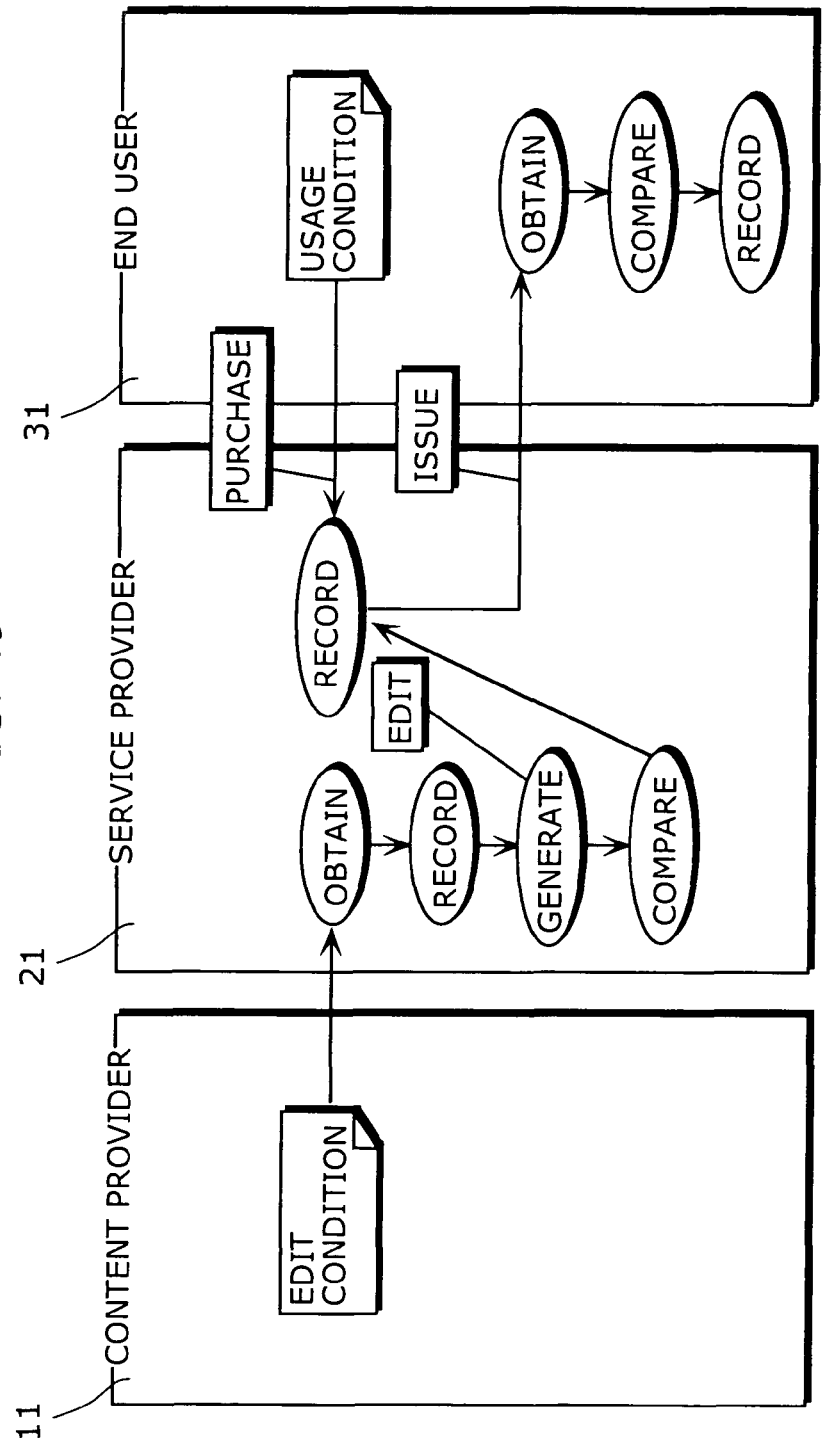
FIG. 49 is a diagram showing timing in comparing the usage condition and the edit condition.

FIG. 49 is a diagram showing another example of timing in comparing the usage condition and the edit condition included in the sales license. The following is an explanation of a processing procedure in a case where both the service provider 21 and the end user 31 perform checking, with reference to FIGS. 48 and 49. As shown in these figures, the content provider 11 transmits the original license including the edit condition to the service provider 21. The service provider 21 temporarily records the original license obtained from the content provider 11 into the license DB 2146. Then, the sales license generation tool 211 edits the template included in the original license, so that the sales license (having no content key) is generated. Next, the content key insertion processing unit 2144 compares the usage condition included in the sales license (having no content key) after the editing with the edit condition of the original license. When the usage condition after the editing is within the range of the edit condition, the content key is inserted into the sales license (having no content key). The sales license into which the content key was inserted is recorded into the license DB 2146. When the end user 31 is to purchase this sales license, the designated sales license is read out from the license DB 2146 and issued to the end user 31 after the signature is attached to it. In this case, the service provider 21 issues the sales license that allows the content designated by the end user 31 to be reproduced under a predetermined usage condition, and do not accept the designation of the usage condition from the end user 31. Moreover, the sales license issued here by the service provider 21 includes the edit condition. When the EU terminal device 480 of the end user 31 (1) obtains the sales license issued by the communication processing unit 481, (2) the obtained sales license is sent to the contract condition comparison unit 483 via the control unit 482. (3) The contract condition comparison unit 483 compares the edit condition and the usage condition included in the sales license sent from the control unit 482 and (4) returns it to the control unit 482 only when the usage condition is within the range of the edit condition. (5) (6) The control unit 482 records the sales license into the license DB 485 in the EU terminal device 480 via the DB I/F 484.

As described so far, according to the present B2B2C system, unless the usage condition of the sales license to be sold by the service provider 21 to the end user 31 complies with the edit condition of the original license set by the content provider 11, a sales license including a content key cannot be generated. In addition to this, the end user 31 also performs checking as to whether the usage condition of the sales license complies with the edit condition and abandons the sales license having the usage condition which does not comply with the edit condition. On the account of this, even if the service provider 21 generates a sales license which does not comply with the edit condition of the original license despite the intention of the content provider 11, the end user 31 cannot use the content. Therefore, the present invention allows the content provider 11 to more forcefully control the usage condition of the sales license generated by the service provider 21.

It should be noted that the service provider 21 of the present invention is not limited to a broadcast station or a provider that sells content on the Internet, and may be a provider that rents content recorded on a record medium, such as a DVD or a CD. In such a case, the service provider 21 may receive the edit condition and the sales condition of the sales license for each set of content from the content provider 11 via a communication network or the like. Alternatively, the edit condition and the sales condition may be recorded on the record medium such as a DVD that stores the content to be rented. In this case, the terminal device of the end user 31 reproduces the content in accordance with the sales license issued by the service provider 21. Here, the terminal device of the end user 31 may compare the usage condition included in the sales license with the edit condition recorded on the record medium that stores the content, and judge whether or not the usage condition included in the sales license is within the range of the edit condition recorded on the record medium. Only when the usage condition included in the sales license is within the range of the edit condition recorded on the record medium, the content may be reproduced. In other cases, the sales license may be abandoned.

Industrial Applicability

The right management device used in the B2B2C system of the present invention is useful as a right management device used in a system whereby, when a service provider generates a sales license to be sold to an end user, a content provider can control a usage condition of the sales license generated by the service provider with forcing that does not allow a content key to be inserted unless the usage condition of the sales license is set within the range of an edit condition of an original license set by the content provider.

The invention claimed is:

1. A right management system for managing license information that authorizes usage of content, the right management system comprising:
    a subsystem of a content provider;
    a subsystem of a service provider; and
    a terminal device,
    wherein the subsystem of the content provider includes a non-transitory content provider memory device storing a program executed by a content provider processing device, which causes the content provider processing device to perform the steps of:
    encrypting the produced content using a content key, and providing the encrypted content to the terminal device; and
    generating edit condition information indicating a designated range of a usage condition which the subsystem of the service provider is allowed to set in the sales license information, the usage condition authorizing the end user to use the content, and
    generating original license information including the edit condition information, the content key, and a template, so that the subsystem of the service provider obtains the edit condition information and the template, the template indicating the content key used for encrypting the content and a data structure of the sales license information,
    wherein the subsystem of the service provider includes a non-transitory service provider memory device storing a program executed by a service provider processing device, which causes the service provider processing device to perform the steps of:
    obtaining the original license information from the subsystem of the content provider and editing the template included in the obtained original license information to generate the sales license information to include a usage condition for authorizing usage of the content;
    obtaining, from the original license information, the content key used for encrypting the content, inserting the obtained edit condition information into the sales license information,
    obtaining, for the generated sales license information, the edit condition information generated by the subsystem of the content provider, from the original license information,
    judging whether or not the usage condition included in the generated sales license information is within the range designated in the edit condition information, and
    inserting the content key into the sales license information when the usage condition is judged to be within the range, and not inserting the content key into the sales license information when the usage condition is judged not to be within the range; and
    transmitting, to the terminal device of the end user, the sales license information into which the content key has been or not been inserted, and
    wherein the terminal device includes a non-transitory terminal device memory storing a program executed by a terminal device processor, which causes the terminal device processor to perform the steps of:
    receiving the sales license information from the subsystem of the service provider;
    obtaining the edit condition information which is generated by the subsystem of the content provider and is included in the sales license information and
    judging whether or not the usage condition included in the sales license information received from the subsystem of the service provider is within the range designated in the obtained edit condition information; and
    validating the received sales license information and decrypting the content using the content key included in the sales license information when the usage condition is judged to be within the range, and
    abandoning the received sales license information when the usage condition is judged not to be within the range.

2. The right management system according to claim 1, wherein the subsystem of the service provider comprises a database and is configured to store in the database the original license information obtained from the subsystem of the content provider,
    the subsystem for the service provider edits the template included in the original license information to generate sales license information that includes no content key,
    the subsystem for the service provider extracts the edit condition information from the original license information stored in the database,
    judges whether or not the usage condition included in the generated sales license information is within the range designated in the extracted edit condition information,
    only when the usage condition is judged to be within the range, inserts the content key included in the original license information into the sales license information to generate sales license information that includes the content key, and
    stores the generated sales license information in the database, and
    in response to a content obtainment request from the terminal device, the license management server is configured to read out appropriate sales license information from the database and transmits the appropriate sales license information to the terminal device.

3. The right management system according to claim 1, wherein the original license information includes, for each content, sales condition information describing an editable usage condition and a maximum number of sales of the sales license information corresponding to an editing result of the usage condition, the subsystem of the service provider comprises a license sales server configured to sell the sales license information to the terminal device, and the license sales server includes a control unit configured to (i) obtain, from the sales condition information, the maximum number of sales of the sales license information corresponding to the edited usage condition, (ii) increment the number of sales of the sales license information every time the license sales server sells the sales license information, (iii) judge whether or not the number of sales of the sales license information has reached the maximum number of sales, and (iv) sell the sales license information to the terminal device until when the number of sales of the sales license information is judged to have reached the maximum number of sales, and terminate the sale of the sales license information when the number of sales of the sales license information is judged to have reached the maximum number of sales.

4. A right management system for managing license information that allows usage of content, the right management system comprising:

a subsystem of a service provider; and a terminal device, wherein the subsystem of the service provider includes a non-transitory service provider memory device storing a program executed by a service provider processing device, which causes the service provider processing device to perform the steps of:

obtaining original license information from a subsystem of a content provider and edit a template included in the obtained original license information to generate sales license information to include a usage condition for authorizing usage of the content; and obtaining from original license information, a content key used for encrypting the content inserting obtained edit condition information into the sales license information obtaining, for the generated sales license information, the edit condition information generated by the subsystem of the content provider, from the original license information, judging whether or not the usage condition included in the generated sales information is within a range designated in the edit condition information, and inserting the content key into the sales license information when the usage condition is judged to be within the range, and not insert the content key into the sales license information when the usage condition is judged not to be within the range, and wherein the terminal device includes a non-transitory terminal device memory storing a program executed by a terminal device processor, which causes the terminal device processor to perform the steps of:

receiving the sales license information from the subsystem of the service provider;

obtaining the edit condition information which is generated by the subsystem of the content provider and is included in the sales license information and judging whether or not the usage condition included in the sales license information received from the subsystem of the service provider is within the range designated in the obtained edit condition information; and validating the received sales license information and decrypting the content using the content key included in the sales license information when the usage condition is judged to be within the range, and abandoning the received sales license information when the usage condition is judged not to be within the range.

5. The right management device according to claim 4, wherein:

the subsystem of the service provider receives a designated time period during which the content is allowed to be used, as the usage condition, judges whether or not the time period, included in the generated sales license information, during which the content is allowed to be used, is within the range designated in the edit condition information, and validates the sales license information only when the time period, during which the content is allowed to be used, is within the designated range.

6. The right management device according to claim 4, wherein:

the subsystem of the service provider receives edit condition information indicating designation of a range of a total number of times the content is allowed to be used, as the usage condition, judges whether or not the range, designated in the edit condition information, of the total number of times the content is allowed to be used, which is included in the generated sales license information, is within the designated range, and validates the sales license information only when the range of the total number of times the content is allowed to be used, is within the designated range.

7. The right management device according to claim 4, wherein:

the subsystem of the service provider receives edit condition information indicating designation of a range of a total time length for which the content is allowed to be used, as the usage condition, judges whether or not the range, designated in the edit condition information, of the total time length, which is included in the generated sales license information, is within the designated range, and validates the sales license information only when the range of the total time length is within the designated range.

8. The right management device according to claim 4, wherein:

the subsystem of the service provider receives edit condition information indicating designation of a continuous time length during which the content is allowed to be continuously used, judges whether or not the continuous time length, included in the generated sales license information, is within the range designated in the edit condition information, and validates the sales license information only when the continuous time length is within the designated range.

9. The right management device according to claim 4, wherein the subsystem of the service provided includes a tamper resistant module.

10. The right management device according to claim 4, wherein
the subsystem of the service provider receives information indicating designation of a condition regarding an issue of sales license information for each content,
issues the sales license information corresponding to the content to a terminal device of an end user, and
judges whether or not the issue of the sales license information satisfies the designated condition,
wherein the sales license information is issued to the end user only when the issue of the sales license information is judged to satisfy the designated condition.

11. The right management device according to claim 10, wherein the subsystem of the service provider receives designation of a total number of sets of the sales license information which are allowed to be issued,
counts a total number of sets of the sales license information to be issued, for each content, and
judges whether or not the counted total number of sets satisfies the designated condition,
wherein the sales license information is issued only when the total number of issues is judged to satisfy the condition.

12. The right management device according to claim 10, wherein
the subsystem of the service provider receives designation of an issue period during which the sales license information is allowed to be issued,
judges whether or not a current time of day satisfies the designated issue period, and
issues the sales license information only when the current time of day is judged to satisfy the designated issue period.

13. The right management device according to claim 4, wherein
the subsystem for the service provider receives designation of a condition regarding an issue of the sales license information, corresponding to each usage condition within the designated range, and
issues to an end user the sales license information satisfying the issue condition corresponding to the usage condition only when the usage condition is judged to be within the range.

14. The right management device according to claim 13, wherein when the usage condition is a total number of times the content is allowed to be used and the condition regarding the issue of the sales license information is the number of issues of the sales license information, the sales license information is issued so that each total number of times the content is allowed to be used is substantially the same, in accordance with the issue condition corresponding to the usage condition.

15. A right management method for managing license information that allows usage of content in a right management system which includes a subsystem of a content provider that is configured to produce content, a subsystem for a service provider configured to issue sales license information that authorizes usage of content to an end user, and a terminal device of the end user configured to use the content, the right management method comprising:
in the subsystem of the service provider,
obtaining, by a service provider processor, original license information from a subsystem of the content provider and
editing, by the service provider processor, a template included in the obtained original license information;
generating, by the service provider processor, sales license information to includes a usage condition for authorizing usage of the content;
obtaining, from the original license information and by the service provider processor, a content key used for encrypting the content, and
inserting, by the service provider processor, obtained edit condition information into the sales license information;
obtaining, for the generated sales license information and by the service provider processor, edit condition information generated by the subsystem of the content provider, from the original license information;
judging, by the service provider processor, whether or not the usage condition included in the generated sales license information is within a range designated in the edit condition information,
inserting, by the service provider processor, the content key into the sales license information when the usage condition is judged to be within the range, and not inserting, by the service provider processor, the content key into the sales license information when the usage condition is judged not to be within the range; and
transmitting, to the terminal device of the end user and by the service provider processor, the sales license information into which the content key has been or not been inserted, and
in the terminal device,
receiving, by a terminal device processor, the sales license information from the subsystem of the service provider;
obtaining, by the terminal device processor, the edit condition information which is generated by the subsystem of the content provider and is included in the sales license information, and
judging, by the terminal device processor, whether or not the usage condition included in the sales license information received from the subsystem of the service provider is within the range designated in the obtained edit condition information; and
validating, by the terminal device processor, the received sales license information and
decrypting, by the terminal device processor, the content by the content key included in the sales license information when the usage condition is judged to be within the range, and
abandoning, by the terminal device processor, the received sales license information when the usage condition is judged not to be within the range.

16. A non-transitory computer-readable storage media having stored thereon computer programs for a right management system, including a subsystem for a service provider and a terminal device, which manages license information that allows usage of content,
in the subsystem for the service provider, the subsystem of the service provider includes a non-transitory service provider memory device storing a program executed by a service provider processing device, which causes the service provider processing device to perform the steps of:
generating sales license information that includes a usage condition authorizing the usage of content;
receiving edit condition information indicating a range designation of the usage condition from a subsystem of a content provider that produces the content;
obtaining a content key, used for encrypting the content, from the subsystem of the content provider;

judging whether or not the usage condition included in the generated sales license information is within the range designated in the edit condition information; and validating the sales license information and inserting the content key into the sales license information when the usage condition is judged to be within the range and not to inserting the content key into the sales license information when the usage condition is judged not to be within the range, and in the terminal device, the terminal device includes a non-transitory terminal device memory storing a program executed by a terminal device processor, which causes the terminal device processor to perform the steps of:

requesting sales license information used for reproducing a specific content from a subsystem of a service provider;

obtaining, in response to the request for sales license information, the sales license information including a usage condition that indicates a condition for allowing the usage of the content, and edit condition information designating a range of the usage condition;

judging whether or not the usage condition included in the obtained sales license information is within the range designated in the edit condition information;

validating the received sales license information and decrypting the content using a content key included in the sales license information when the usage condition is judged to be within the range; and abandoning the obtained sales license information when the usage condition is judged not to be within the range designated in the edit condition information.

17. Non-transitory computer-readable recording media having stored thereon-a computer programs for a right management system, including a subsystem for a service provider and a terminal device, which manages license information that allows usage of content, in the subsystem for the service provider, the subsystem of the service provider includes a non-transitory service provider memory device storing a program executed by a service provider processing device, which causes the service provider processing device to perform the steps of:

storing a content key used for decrypting encrypted content;

storing edit condition information designating a range of a usage condition that indicates a condition for allowing usage of the content;

generating the sales license information to include the usage condition;

receiving the edit condition information from a subsystem of a content provider unit that produces the content;

obtaining the content key from the subsystem of the content provider that produces the content;

judging whether or not the usage condition included in the generated sales license information is within the range designated in the edit condition information; and validating the generated sales license information and inserting the content key into the sales license information when the usage condition is judged to be within the range and not to insert the content key into the sales license information when the usage condition is judged not to be within the range, and in the terminal device, the terminal device includes a non-transitory terminal device memory storing a program executed by a terminal device processor, which causes the terminal device processor to perform the steps of:

requesting sales license information used for reproducing a specific content from a subsystem of a service provider;

obtaining, in response to the request for sales license information, the sales license information including a usage condition that indicates a condition for allowing the usage of the content, and edit condition information designating a range of the usage condition;

judging whether or not the usage condition included in the obtained sales license information is within the range designated in the edit condition information;

validating the received sales license information and decrypting the content using a content key included in the sales license information when the usage condition is judged to be within the range; and abandoning the obtained sales license information when the usage condition is judged not to be within the range designated in the edit condition information.

18. Non-transitory computer-readable storage media having stored thereon computer programs for a right management system, including a subsystem for a service provider and a terminal device, which manages license information that allows usage of content, in the subsystem for the service provider, the subsystem of the service provider includes a non-transitory service provider memory device storing a program executed by a service provider processing device, which causes the service provider processing device to perform the steps of:

storing a content key used for decrypting encrypted content;

storing edit condition information designating a range of a usage condition that indicates a condition for allowing usage of the content;

storing a condition regarding an issue of sales license information that allows the usage of the content under the usage condition;

generating the sales license information to include the usage condition;

receiving the edit condition information from a subsystem of a content provider that produces the content;

obtaining the content key from the subsystem of the content provider that produces the content;

judging whether or not the usage condition included in the generated sales license information is within the range designated in the edit condition information; and validating the sales license information and inserting a content key into the sales license information when the usage condition is judged to be within the range and not to insert the content key into the sales license information when the usage condition is judged not to be within the range, and in the terminal device, the terminal device includes a non-transitory terminal device memory storing a program executed by a terminal device processor, which causes the terminal device processor to perform the steps of:

requesting sales license information used for reproducing a specific content from a subsystem of a service provider;

obtaining, in response to the request for sales license information, the sales license information including a usage condition that indicates a condition for allowing the usage of the content, and edit condition information designating a range of the usage condition;

judging whether or not the usage condition included in the obtained sales license information is within the range designated in the edit condition information;

validating the received sales license information and decrypting the content using a content key included in the sales license information when the usage condition is judged to be within the range; and abandoning the obtained sales license information when the usage condition is judged not to be within the range designated in the edit condition information.

* * * * *